United States Patent
Maher et al.

(10) Patent No.: US 10,776,831 B2
(45) Date of Patent: *Sep. 15, 2020

(54) CONTENT DELIVERY SYSTEMS AND METHODS

(71) Applicant: Intertrust Technologies Corporation, Sunnyvale, CA (US)

(72) Inventors: David P. Maher, Livermore, CA (US); Prasad Khambete, Cupertino, CA (US); Prasad Sanagavarapu, Santa Clara, CA (US); Sanjeev Tenneti, Milpitas, CA (US); Laurent Grandhomme, Mountain View, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/206,457

(22) Filed: Nov. 30, 2018

(65) Prior Publication Data

US 2019/0108556 A1    Apr. 11, 2019

Related U.S. Application Data

(63) Continuation of application No. 12/785,406, filed on May 21, 2010, now Pat. No. 10,191,972, which is a (Continued)

(51) Int. Cl.
*G06Q 30/02* (2012.01)
*G06F 16/335* (2019.01)
*G06F 16/9535* (2019.01)

(52) U.S. Cl.
CPC ....... *G06Q 30/0273* (2013.01); *G06F 16/335* (2019.01); *G06F 16/337* (2019.01);
(Continued)

(58) Field of Classification Search
None
See application file for complete search history.

(56) References Cited

U.S. PATENT DOCUMENTS 5,399,874 A    3/1995  Gonsalves et al.
5,668,897 A    9/1997  Stolfo
(Continued)

FOREIGN PATENT DOCUMENTS

EP    1139198 A2    10/2001
EP    1477879 A2    11/2004
(Continued)

OTHER PUBLICATIONS

International Search Report and International Written Opinion dated Jul. 2, 2009 for application No. PCT/2009/02703.
(Continued)

*Primary Examiner* — David J Stoltenberg
(74) *Attorney, Agent, or Firm* — Finnegan, Henderson, Farabow, Garrett & Dunner, LLP

(57) ABSTRACT

A method for distributing an electronic content item for consumption with advertisements is provided. In one embodiment, a content provider creates a license identifying one or more slots within an electronic content item at which advertisements are to be inserted. The license specifies one or more types of advertisements that are not permitted to be inserted into the slots, and also specifies criteria for dynamically selecting advertisements to insert into the one or more slots. The content provider securely associates the electronic license with the electronic content item and distributes the electronic content item and the electronic license to a third party for consumption or subsequent transfer to an end user.

17 Claims, 17 Drawing Sheets

Related U.S. Application Data continuation-in-part of application No. 12/433,881, filed on Apr. 30, 2009, now Pat. No. 8,660,539.

(60) Provisional application No. 61/180,359, filed on May 21, 2009, provisional application No. 61/049,030, filed on Apr. 30, 2008, provisional application No. 61/075,304, filed on Jun. 24, 2008, provisional application No. 61/074,995, filed on Jun. 23, 2008.

(52) U.S. Cl.
CPC ......... *G06F 16/9535* (2019.01); *G06Q 30/02* (2013.01); *G06Q 30/0247* (2013.01); *G06Q 30/0251* (2013.01)

(56) References Cited

U.S. PATENT DOCUMENTS

| | | | |
|---|---|---|---|
| 5,710,884 A | 1/1998 | Dedrick | |
| 5,724,521 A | 3/1998 | Dedrick | |
| 5,785,353 A | 7/1998 | Diamond | |
| 5,892,900 A | 4/1999 | Ginter et al. | |
| 5,915,019 A * | 6/1999 | Ginter | G06F 21/10 348/E5.006 |
| 5,974,548 A | 10/1999 | Adams | |
| 6,144,944 A | 11/2000 | Kurtzman et al. | |
| 6,233,684 B1 | 5/2001 | Stefik et al. | |
| 6,269,361 B1 | 7/2001 | Davis et al. | |
| 6,314,521 B1 | 11/2001 | Debry | |
| 6,351,815 B1 | 2/2002 | Adams | |
| 6,363,488 B1 * | 3/2002 | Ginter | G06F 21/10 348/E5.006 |
| 6,389,402 B1 * | 5/2002 | Ginter | G06F 21/10 348/E5.006 |
| 6,421,733 B1 | 7/2002 | Tso et al. | |
| 6,442,529 B1 | 8/2002 | Krishan et al. | |
| 6,487,301 B1 | 11/2002 | Zhao | |
| 6,510,453 B1 | 1/2003 | Apfel et al. | |
| 6,513,052 B1 | 1/2003 | Binder | |
| 6,567,530 B1 | 5/2003 | Keronen et al. | |
| 6,571,279 B1 | 5/2003 | Herz et al. | |
| 6,584,613 B1 | 6/2003 | Dunn et al. | |
| 6,785,815 B1 | 8/2004 | Serret-Avila et al. | |
| 6,847,969 B1 | 1/2005 | Mathal et al. | |
| 6,862,583 B1 | 3/2005 | Mazzagatte et al. | |
| 6,957,062 B2 | 10/2005 | Castrogiovanni et al. | |
| 7,152,047 B1 | 12/2006 | Nagel | |
| 7,206,849 B1 | 4/2007 | Gernert et al. | |
| 7,215,832 B1 | 5/2007 | Yamaguchi | |
| 7,236,610 B1 | 6/2007 | Luo et al. | |
| 7,383,441 B2 | 6/2008 | Vorbruggen et al. | |
| 7,430,585 B2 | 9/2008 | Sibert | |
| 7,814,521 B2 | 10/2010 | Ou et al. | |
| 7,877,460 B1 | 1/2011 | Brouwer et al. | |
| 7,912,971 B1 | 3/2011 | Dunn | |
| 7,917,468 B2 | 3/2011 | Ariel et al. | |
| 8,055,536 B1 | 11/2011 | Olaiya et al. | |
| 8,069,166 B2 | 11/2011 | Alvarado et al. | |
| 8,234,387 B2 | 7/2012 | Bradley et al. | |
| 8,321,278 B2 | 11/2012 | Haveliwala et al. | |
| 8,660,899 B2 | 2/2014 | Sarma et al. | |
| 8,776,216 B2 | 7/2014 | Boccon-Gibod et al. | |
| 9,118,462 B2 | 8/2015 | Khambete | |
| 9,355,157 B2 | 5/2016 | Mohammed et al. | |
| 10,191,972 B2 * | 1/2019 | Maher | G06Q 30/02 |
| 2001/0049620 A1 | 12/2001 | Blasko | |
| 2001/0051559 A1 | 12/2001 | Cohen et al. | |
| 2001/0051920 A1 | 12/2001 | Joao et al. | |
| 2001/0051925 A1 * | 12/2001 | kang | G06Q 30/02 705/51 |
| 2001/0054001 A1 | 12/2001 | Robinson | |
| 2002/0024714 A1 | 2/2002 | Sandstrom et al. | |
| 2002/0042884 A1 | 4/2002 | Wu et al. | |
| 2002/0083441 A1 | 6/2002 | Flickinger et al. | |
| 2002/0124182 A1 | 9/2002 | Bacso et al. | |
| 2002/0152169 A1 | 10/2002 | Dutta et al. | |
| 2002/0156677 A1 | 10/2002 | Peters et al. | |
| 2002/0173971 A1 | 11/2002 | Stirpe | |
| 2002/0174073 A1 | 11/2002 | Nordman | |
| 2003/0028432 A1 | 2/2003 | Troyansky et al. | |
| 2003/0037010 A1 * | 2/2003 | Schmelzer | G06Q 50/184 705/67 |
| 2003/0110497 A1 | 6/2003 | Yassin et al. | |
| 2003/0182246 A1 | 9/2003 | Johnson et al. | |
| 2003/0196110 A1 | 10/2003 | Lampson et al. | |
| 2004/0022444 A1 | 2/2004 | Rhoads | |
| 2004/0039707 A9 | 2/2004 | Ricci | |
| 2004/0117627 A1 | 6/2004 | Brewington | |
| 2004/0249709 A1 | 12/2004 | Donovan et al. | |
| 2004/0260574 A1 | 12/2004 | Gross | |
| 2005/0021398 A1 * | 1/2005 | McCleskey | H04L 67/1082 705/14.47 |
| 2005/0027871 A1 | 2/2005 | Bradley et al. | |
| 2005/0138357 A1 | 6/2005 | Swenson et al. | |
| 2005/0144065 A1 | 6/2005 | Calabria et al. | |
| 2005/0198510 A1 | 9/2005 | Robert et al. | |
| 2005/0203796 A1 | 9/2005 | Anand et al. | |
| 2005/0215238 A1 | 9/2005 | Macaluso | |
| 2006/0174326 A1 * | 8/2006 | Ginter | G06F 21/6209 726/3 |
| 2006/0212722 A1 * | 9/2006 | Ginter | G06F 21/71 713/193 |
| 2006/0224903 A1 * | 10/2006 | Ginter | G06Q 20/24 713/193 |
| 2007/0028106 A1 | 2/2007 | Lauter et al. | |
| 2007/0033397 A1 | 2/2007 | Phillips, II et al. | |
| 2007/0038931 A1 * | 2/2007 | Allaire | G06Q 30/0239 715/206 |
| 2007/0078775 A1 | 4/2007 | Huapaya et al. | |
| 2007/0088609 A1 | 4/2007 | Reller et al. | |
| 2007/0118425 A1 | 5/2007 | Yruski et al. | |
| 2007/0123275 A1 | 5/2007 | Faraz | |
| 2007/0136761 A1 | 6/2007 | Basmajian et al. | |
| 2007/0156838 A1 * | 7/2007 | Kocho | G06Q 30/0241 709/217 |
| 2007/0174490 A1 | 7/2007 | Choi et al. | |
| 2007/0180519 A1 | 8/2007 | Boccon-Gibod | |
| 2007/0226365 A1 | 9/2007 | Hildreth et al. | |
| 2007/0233857 A1 | 10/2007 | Cheng et al. | |
| 2007/0250383 A1 | 10/2007 | Tollinger et al. | |
| 2007/0288518 A1 | 12/2007 | Crigler et al. | |
| 2007/0296805 A1 | 12/2007 | Tedenvall et al. | |
| 2008/0007567 A1 | 1/2008 | Clatworthy et al. | |
| 2008/0015878 A1 | 1/2008 | Feng et al. | |
| 2008/0046758 A1 | 2/2008 | Cha et al. | |
| 2008/0052153 A1 | 2/2008 | Cook | |
| 2008/0059362 A1 | 3/2008 | Roth et al. | |
| 2008/0059631 A1 | 3/2008 | Bergstrom et al. | |
| 2008/0071617 A1 | 3/2008 | Ware | |
| 2008/0092239 A1 | 4/2008 | Sitrick et al. | |
| 2008/0103977 A1 | 5/2008 | Khosravy et al. | |
| 2008/0133311 A1 | 6/2008 | Madriz Ottolina | |
| 2008/0149702 A1 | 6/2008 | Trappeniers | |
| 2008/0155589 A1 | 6/2008 | McKinnon et al. | |
| 2008/0162329 A1 | 7/2008 | Knapp et al. | |
| 2008/0187279 A1 | 8/2008 | Gilley et al. | |
| 2008/0228578 A1 | 9/2008 | Mashinsky | |
| 2008/0262922 A1 | 10/2008 | Ahn et al. | |
| 2008/0268876 A1 | 10/2008 | Gelfand et al. | |
| 2008/0301224 A1 | 12/2008 | Papageorgiou | |
| 2008/0307454 A1 | 12/2008 | Ahanger et al. | |
| 2008/0319851 A1 | 12/2008 | Grigorovitch et al. | |
| 2009/0024452 A1 | 1/2009 | Martinez et al. | |
| 2009/0029718 A1 | 1/2009 | Nilsson | |
| 2009/0031431 A1 | 1/2009 | Boccon-Gibod | |
| 2009/0037949 A1 | 2/2009 | Birch | |
| 2009/0075696 A1 | 3/2009 | Kanapur et al. | |
| 2009/0083147 A1 | 3/2009 | Paila et al. | |
| 2009/0146505 A1 | 6/2009 | Powell et al. | |
| 2009/0160658 A1 | 6/2009 | Armstrong et al. | |
| 2009/0187593 A1 | 7/2009 | Chen et al. | |
| 2009/0198542 A1 | 8/2009 | D'Amore et al. | |
| 2009/0234923 A1 | 9/2009 | Hunter | |

(56) References Cited

U.S. PATENT DOCUMENTS

| | | | |
|---|---|---|---|
| 2009/0292692 | A1 | 11/2009 | Kaihotsu |
| 2009/0298480 | A1 | 12/2009 | Khambete et al. |
| 2010/0036737 | A1 | 2/2010 | Shenfield et al. |
| 2010/0223249 | A1 | 9/2010 | Steelberg et al. |
| 2010/0293049 | A1 | 11/2010 | Maher et al. |
| 2010/0293050 | A1 | 11/2010 | Maher et al. |
| 2010/0293057 | A1 | 11/2010 | Haveliwala et al. |
| 2010/0293058 | A1 | 11/2010 | Maher et al. |
| 2010/0299522 | A1 | 11/2010 | Khambete |
| 2010/0323716 | A1 | 12/2010 | Jaffri |
| 2011/0040736 | A1 | 2/2011 | Kalaboukis |
| 2011/0070863 | A1 | 3/2011 | Ma et al. |
| 2011/0231296 | A1 | 9/2011 | Gross |
| 2011/0282898 | A1 | 11/2011 | Schiffman et al. |
| 2011/0313857 | A1 | 12/2011 | Nice et al. |
| 2012/0102050 | A1 | 4/2012 | Button et al. |
| 2012/0166452 | A1 | 6/2012 | Tseng |
| 2012/0303452 | A1 | 11/2012 | Xue et al. |
| 2013/0018954 | A1 | 1/2013 | Cheng |
| 2013/0066876 | A1 | 3/2013 | Raskino et al. |
| 2013/0159103 | A1 | 6/2013 | Foroughi et al. |
| 2013/0262371 | A1 | 10/2013 | Nolan |
| 2013/0332987 | A1 | 12/2013 | Tenneti et al. |
| 2014/0024392 | A1 | 1/2014 | Su et al. |
| 2014/0025660 | A1 | 1/2014 | Mohammed et al. |
| 2014/0128105 | A1 | 5/2014 | Su et al. |
| 2014/0156733 | A1 | 6/2014 | Goranson |
| 2015/0081443 | A1 | 3/2015 | Davis et al. |
| 2019/0108556 | A1* | 4/2019 | Maher .................... G06Q 30/02 |

FOREIGN PATENT DOCUMENTS

| | | | |
|---|---|---|---|
| EP | 2169854 | A1 | 3/2010 |
| EP | 2400408 | A1 | 12/2011 |
| EP | 2433256 | | 3/2012 |
| JP | 2001-297159 | | 10/2001 |
| JP | 2002-063474 | | 2/2002 |
| JP | 2002-175333 | A | 6/2002 |
| JP | 2002-518946 | | 6/2002 |
| JP | 2002-236846 | A1 | 8/2002 |
| JP | 2002-334104 | A1 | 11/2002 |
| JP | 2004-185456 | | 7/2004 |
| JP | 2005-512437 | | 4/2005 |
| JP | 2006-012149 | | 1/2006 |
| JP | 2008-059479 | A | 6/2007 |
| JP | 2007286832 | | 11/2007 |
| JP | 2008-059444 | A | 3/2008 |
| JP | 2008-077173 | A | 4/2008 |
| JP | 2008-125102 | A | 5/2008 |
| JP | 2010-535438 | | 11/2010 |
| JP | 2011-507464 | A1 | 3/2011 |
| KR | 2008-0027040 | A | 3/2008 |
| KR | 2009-0010468 | | 1/2009 |
| KR | 2009-0021514 | A | 3/2009 |
| KR | 10-2010-0060130 | | 6/2010 |
| KR | 10-2010-0113199 | | 10/2010 |
| KR | 10-1007336 | | 1/2011 |
| KR | 2011-0125484 | A | 11/2011 |
| RU | 2192049 | | 10/2002 |
| RU | 2322702 | | 4/2008 |
| WO | WO 2007/082190 | | 7/2007 |
| WO | WO2007/130150 | | 11/2007 |
| WO | WO 2009/008484 | A1 | 1/2009 |
| WO | WO 2010/135001 | | 11/2010 |

OTHER PUBLICATIONS

International Search Report and International Written Opinion dated Dec. 29, 2010 for application No. PCT/2010/001500.
International Search Report and International Written Opinion dated Dec. 14, 2010 for application No. PCT/2010/001509.
International Search Report and International Written Opinion dated Dec. 14, 2010 for application No. PCT/2010/001510.
International Search Report and International Written Opinion dated Dec. 14, 2010 for application No. PCT/2010/001511.
Office Action dated Oct. 13, 2011, in U.S. Appl. No. 12/433,881.
Office Action dated Feb. 17, 2012, in U.S. Appl. No. 12/433,881.
Office Action dated Jan. 4, 2012, in U.S. Appl. No. 12/785,406.
Office Action dated Mar. 19, 2012, in U.S. Appl. No. 12/785,409.
Office Action dated Mar. 27, 2012, in U.S. Appl. No. 12/785,412.
Office Action dated Jul. 12, 2012, in U.S. Appl. No. 12/785,406.
Office Action dated Aug. 9, 2012, in U.S. Appl. No. 12/784,290.
Final Office Action dated Oct. 11, 2012, in U.S. Appl. No. 12/785,409.
Final Office Action dated Oct. 31, 2012, in U.S. Appl. No. 12/785,412.
Extended Search Report dated Nov. 27, 2012 in Application No. 09739235.1.
English translation of First Office Action dated Dec. 10, 2012, in Chinese Patent Application No. 200980124975.2.
Office Action dated Apr. 11, 2013, in U.S. Appl. No. 12/433,881.
Office Action dated Apr. 23, 2013, in U.S. Appl. No. 12/785,406.
Office Action dated May 9, 2013, in U.S. Appl. No. 12/784,290.
English translation of First Office Action dated May 21, 2013 in Japanese Patent Application No. 2011-507464.
Non-Final Office Action dated Jun. 21, 2013, in U.S. Appl. No. 12/785,412.
English translation of Second Office Action dated Jun. 24, 2013 in Chinese Patent Application No. 200980124975.2.
Final Office Action dated Jul. 18, 2013, in U.S. Appl. No. 12/433,881.
Non-Final Office Action dated Jul. 23, 2013, in U.S. Appl. No. 12/785,406.
English translation of First Office Action dated Jul. 30, 2013 in Japanese Patent Application No. 2012-511827.
First Office Action dated Oct. 18, 2013 in Australian Patent Application No. 2009241759.
Final Office Action dated Feb. 20, 2014, in U.S. Appl. No. 12/785,412.
Non-Final Office Action dated Mar. 12, 2014 in U.S. Appl. No. 12/785,409.
English translation of Final Office Action dated Feb. 8, 2014 in Chinese Patent Application No. 200980124975.2.
English translation of Final Office Action dated Apr. 8, 2014, in Japanese Patent Application No. 2011-507464.
English translation of Final Office Action dated Apr. 8, 2014, in Japanese Patent Application No. 2012-511827.
Office Action (and English translation) dated Apr. 2, 2014, in Russian Patent Application No. 2011151998.
English translation of First Office Action dated Feb. 17, 2014, in Chinese Patent Application No. 201080033709.1.
Non-Final Office Action dated May 21, 2014 in U.S. Appl. No. 12/785,406.
First Office Action dated Mar. 25, 2014, in Australian Patent Application No. 2010250042.
English translation of Decision on Patent Grant dated Nov. 17, 2014, in Russian Patent Application 2011151998.
Office Action dated Dec. 30, 2014 in U.S. Appl. No. 12/785,409.
English translation of Second Office Action dated Dec. 31, 2014, in Chinese Patent Application No. 201080033709.1.
Non-Final Office Action dated Mar. 18, 2015 in U.S. Appl. No. 12/785,412.
Final Office Action dated May 28, 2015 in U.S. Appl. No. 12/785,409.
English translation of Third Office Action dated Jul. 10, 2015, in Chinese Patent Application No. 201080033709.1.
Israeli Office Action dated Jul. 20, 2015, in Israeli Patent Application No. 216469.
Non-Final Office Action dated Jul. 7, 2014 in U.S. Appl. No. 12/784,290.
Notice of Allowance dated Dec. 5, 2014 in U.S. Appl. No. 12/784,290.
Office Action (and English translation) dated Jul. 23, 2015, in Japanese Patent Application No. 2012-511827.
English translation of Reexamination Notice dated Aug. 5, 2015 in Chinese Patent Application No. 200980124975.2.
Office Action (and English translation) dated Aug. 25, 2015, in Japanese Patent Application No. 2014-162868.
Non-Final Office Action dated Oct. 1, 2015 in U.S. Appl. No. 12/785,406.
Final Office Action dated Oct. 7, 2015 in U.S. Appl. No. 12/785,412.

(56) References Cited

OTHER PUBLICATIONS

Non-Final Office Action dated Oct. 26, 2015 in U.S. Appl. No. 14/177,823.
Office Action (and English translation) dated Oct. 13, 2015, in Japanese Patent Application No. 2014-207356.
Office Action (and English translation) dated Apr. 12, 2016, in Japanese Patent Application No. 2012-511827.
Office Action (and English translation) dated May 23, 2016, in Korean Patent Application No. 2011-7030532.
Final Office Action dated May 25, 2016 in U.S. Appl. No. 12/785,406.
Office Action dated Jun. 6, 2016 in Canadian Application No. 2,762,967.
Office Action (and English translation) dated Jul. 26, 2016, in Japanese Patent Application No. 2014-162868.
Office Action dated Jul. 28, 2016 in U.S. Appl. No. 12/785,409.
Extended European Search Report dated Sep. 9, 2016 in Application No. 10778060.3.
PCT Patent Application US/2013/045023 filed Jun. 10, 2013; International Search Report and Written Opinion dated Nov. 25, 2013.
Clarke et al.; "Freenet: A Distributed Anonymous Information Storage and Retrieval System"; Anonymity 2000; LNCS 2009; pp. 46-66; 2001.
EP Patent Application 13803972.2 filed Nov. 17, 2014; Extended European Search Report dated Jan. 5, 2016.
International Search Report and International Written Opinion dated Nov. 8, 2013 for application No. PCT/2013/051377.
Extended European Search Report dated Jun. 26, 2015 for Application No. 13820094.4.
Naudet, et al.; "An Ontoogy-Based Profiling and Recommending System for Mobile TV"; IEEE Third International Workshop on Semantic Media Adaptation and Personalization; Piscataway, NJ; Dec. 15, 2008; pp. 94-99.
Woerndl et al.; "Individual and Social Recommendations for Mobile Semantic Personal Information Management"; International Journal on Advances in Internet Technology; vol. 2, No. 2&3; Dec. 1, 2009; pp. 215-226.
Office Action dated Oct. 13, 2016 in U.S. Appl. No. 12/785,412.
Office Action (and English translation) dated Dec. 9, 2016, in Korean Patent Application No. 2011-7030532.
Office Action (and English translation) dated Nov. 15, 2016, in Israeli Patent Application No. 216469.
Final Office Action dated Feb. 15, 2017 in U.S. Appl. No. 12/785,409.
Office Action dated May 10, 2017, in Canadian Patent Application No. 2,762,967.
Office Action dated Jan. 9, 2018, in Japanese Patent Application No. 2016-229014.
Office Action dated Aug. 28, 2017 in U.S. Appl. No. 12/785,406.
Final Office Action dated Feb. 14, 2018 in U.S. Appl. No. 12/785,406.
Notice of Allowance dated Sep. 6, 2018 in U.S. Appl. No. 12/785,406.
Agarwal, S., "Intelligent content caching for mobile devices", Deutsche Telekom AG Laboratories, Berlin, Germany, 2006.
Kowalczyk et al., "Integrating Mobile and Intelligent Agents in Advanced E-commerce: A Survey", Agent Technology Workshops 2002; pp. 295-313 (2003).

\* cited by examiner

CONTENT DELIVERY SYSTEMS AND METHODS

CROSS REFERENCE TO RELATED APPLICATIONS

This application is a Continuation of U.S. application Ser. No. 12/785,406, filed May 21, 2010, and entitled "CONTENT DELIVERY SYSTEMS AND METHODS," which claims the benefit of priority of Provisional Application No. 61/180,359, filed May 21, 2009, and is a continuation-in-part of U.S. application Ser. No. 12/433,881 (now U.S. Pat. No. 8,660,539), filed Apr. 30, 2009 ("the '881 application"), which claims the benefit of priority of Provisional Application Nos. 61/049,030, filed Apr. 30, 2008, 61/075,304, filed Jun. 24, 2008, and 61/074,995, filed Jun. 23, 2008, all of which are hereby incorporated by reference.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

As the electronic communications infrastructure improves worldwide, the distribution of digital content is being rapidly transformed, aided by efficient digital media formats, the economies of digital storage technologies, and peer-to-peer and group-oriented social networking. For example, while Internet TV and mobile TV provide new distribution capabilities for video, perhaps the most important aspect of both of these technologies is the ability to link to numerous other Internet-based services. In preferred embodiments of the present body of work, content distribution technologies are linked to advertising services to support the distribution of digital content.

Ad-based content distribution systems offer the hope that ads can fund not only the production of content, but also the services that distribute the content and the devices upon which the content is rendered. However, despite the average consumer's capacity to consume prodigious amounts of content, if ads are to fund a full distribution chain, the ads need to be efficiently delivered and well-matched to the consumer in a highly reliable and measurable way. That is, each opportunity for an ad impression should be optimized to ensure that the ad is well-matched to the current interests of the consumer and that the overhead for delivering the ad and making the match is minimized.

Embodiments of the systems and methods described herein enable the monetization of content distribution by efficiently matching user-targeted ads at the time and/or point of content consumption. Content items and advertisements can be independently super-distributed, or distributed via conventional commercial methods. Efficient mechanisms are employed to ensure that when a consumer uses content, online or offline, that this usage event is funded by advertising that is well-targeted to that consumer, and that the event optimally compensates the content provider or distributor, as well as other stakeholders who participate in adding value to the system. Preferred embodiments provide highly efficient automation, and the ability to scale for use by many content distribution services, ad services, rendering applications, and device types. In some embodiments, efficient feedback mechanisms can be used to allow for optimization of the targeting, real-time matching, and auctioning mechanisms.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
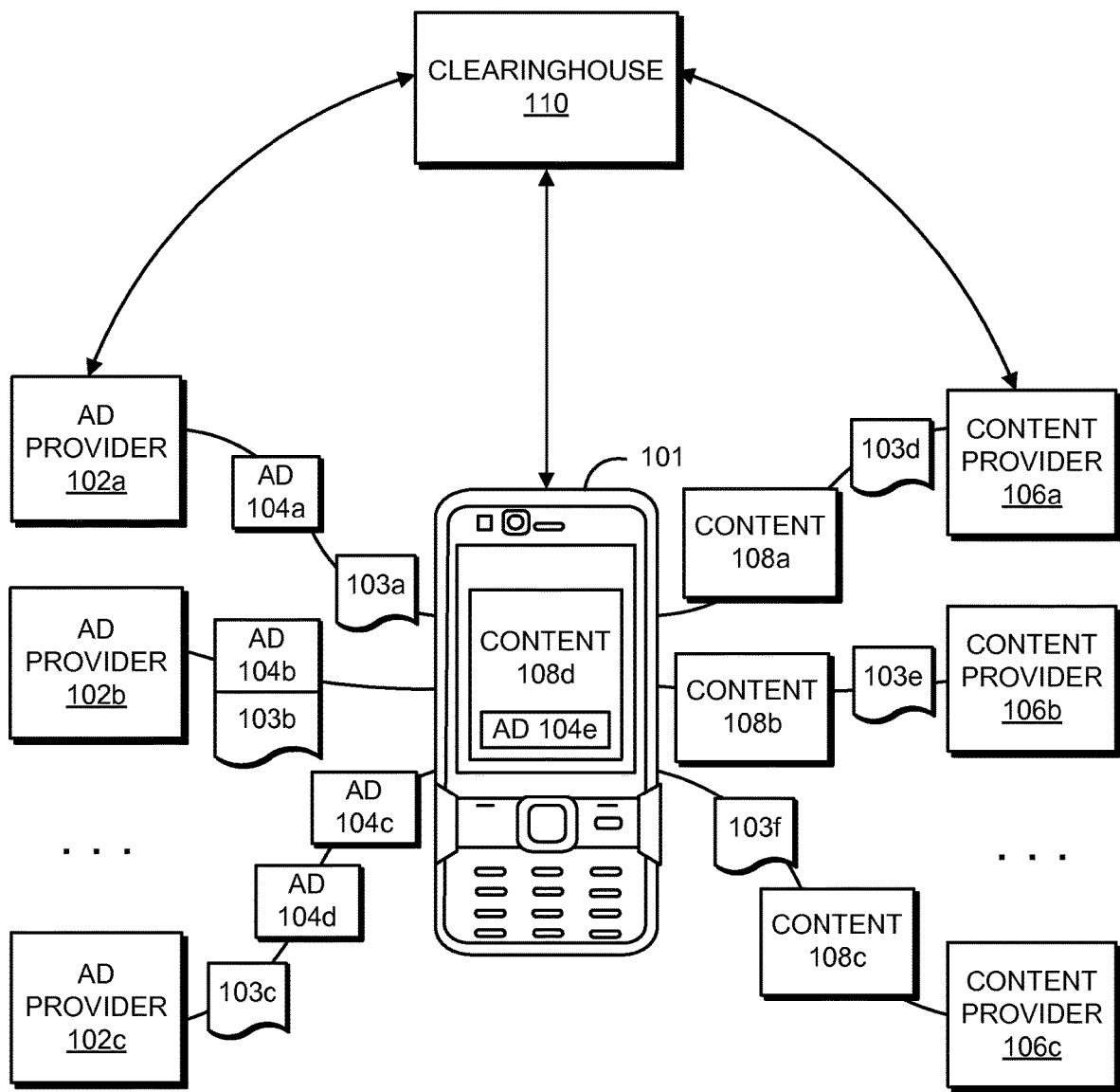
FIG. 1 shows an example of a system for distributing advertisements and content in accordance with certain embodiments.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

Systems and methods for facilitating the delivery of electronic content are described herein, including inter alia systems and methods for rules-based media advertising using a digital rights management ("DRM") engine such as that described in commonly assigned U.S. patent application Ser. No. 11/583,693 (Publication No. 2007/0180519 A1) ("the '693 application"), the dynamic media zone technology described in commonly assigned U.S. patent application Ser. No. 12/178,543 (Publication No. 2009/0031431 A1) ("the '543 application"), the advertisement targeting technology described in the '881 application, and/or the DRM and service orchestration technology described in commonly assigned U.S. patent application Ser. No. 10/863,551 (Publication No. 2005/0027871)("the '551 application"), to manage the provision of advertisements or other content to end users (the contents of the '693 application, '543 application, and the '551 application are hereby incorporated herein by reference in their entirety). It will be appreciated that these systems and methods are novel, as are many of the components, systems, and methods employed therein.

Preferred embodiments can provide some or all of the following features:

Provide high return on investment ("ROI") for advertisers by offering an efficient market for ads by using effective mechanisms for targeted ad distribution, and by matching ads to users who have relevant attributes, thereby avoiding the waste of inappropriate impressions.

Maximize revenue and minimize distribution costs for content providers by providing an automated market for content distribution and peer-to-peer ("P2P") superdistribution to many different devices through many different services, and by ensuring that ad slots required by the content are filled at the time and/or place of rendering by ads that provide the most value to the content provider/distributor.

Provide two tiers of user targeting, where the first tier matches ad content to a consumer when the ad content is delivered to a device or other user-accessible delivery point, and the second tier uses more finely grained information about the consumer (e.g., information about the time, place, environment, interests, usage data, demographics, recent history, and/or the like) to select a particular ad for presentation at the time of content rendering.

Provide near real-time statistics on ad campaign effectiveness with suggestions for increasing effectiveness.

Provide incentives for service providers to distribute ads, content, and rendering technology.

Provide incentives to services that aid in securely and privately associating consumers with relevant attributes which can be used to optimize ad selection.

Ensure consumer privacy by using ad matching mechanisms on a consumer's device or on a trusted web-based proxy for a user's device that does not divulge the consumer's private attribute information.

In a preferred embodiment, a scalable platform is provided for targeted advertising. The platform is compatible with, and amplifies, conventional ad-matching technologies by extending their usage beyond Internet advertising. Similarly, the platform is designed to work seamlessly with existing content distribution and ad distribution networks, and to provide an effective feedback mechanism from the client, thereby enabling an optimal payoff for all stakeholders.

FIG. 1 shows an example of a system for distributing advertisements 104 and content 108 in accordance with certain embodiments of the inventive body of work. As shown in FIG. 1, a user's system 101 receives a variety of advertisements 104a, 104b, 104c, 104d, 104e from a variety of advertisement providers 102a, 102b, 102c. The user's system 101 also receives a variety of content items 108a, 108b, 108c, 108d from a variety of content providers 106a, 106b, 106c. When the user makes use of a piece of content 108d, the user's system dynamically chooses an optimal advertisement 104e from the advertisements 104a-104e that it previously received, and presents that advertisement 104e to the user along with the piece of content 108d. Information about the user, the user's device, and the user's content preferences and content usage habits can be used in the advertisement selection process. In addition, information about which advertisements were rendered can be collected and sent to a clearinghouse (e.g., clearinghouse 110 or another clearinghouse) to facilitate the provision of payment or other compensation from advertisers 102 to content owners 106. Alternatively, or in addition, such information could be sent directly from the user's device to the content provider 106 and/or advertisement provider 102.

Content provider 106 may comprise a content owner, creator, or distributor, such as a musician, movie studio, publishing house, software company, author, mobile service provider, Internet content download or subscription service, cable or satellite television provider, an employee of a corporation, or the like, or an entity acting on behalf thereof, and content 108 may comprise any electronic content, such as digital video, audio, or textual content, a movie, a song, a video game, a piece of software, an email message, a text message, a word processing document, a web page, a report, an electronic book or periodical, or any other entertainment, enterprise, or other content.

In the example shown in FIG. 1, entities 102 and 106 associate licenses 103 with content 108 and/or advertisements 104. A license 103 is based on the policies or other wishes of an entity 102, 106, and specifies permitted and/or prohibited uses of the associated content or advertisement, and/or one or more conditions that must be satisfied in order to make use of the content or advertisement, or that must be satisfied as a condition or consequence of use. In one embodiment, a license 103a may specify whether a recipient of content item 108a is required to view advertisements, and, if so, the criteria that an advertisement must satisfy in order to be selected. Similarly, a license 103a associated with a particular advertisement 104a, or a group or category of advertisements, may specify the types of content with which the advertisement may be played or otherwise integrated, and/or the remuneration or other compensation that entity 102a is willing to provide if advertisement 104a is integrated with a particular type of content 108.

Content 108, advertisements 104, and/or licenses 103 may be secured by one or more cryptographic mechanisms, such as encryption or digital signature techniques or any other security protections dictated by the digital rights management system (if any) being used, and a trust authority 110 may provide appropriate cryptographic keys, certificates, and/or the like.

Content 108, advertisements 104, and licenses 103 can be provided to end users 101 by any suitable means, such as via a network like the Internet, a local area network, a wireless network, a virtual private network, a wide area network, and/or the like; via cable, satellite, broadcast, or cellular communication; and/or via recordable media such as a compact disc (CD), digital versatile disk (DVD), Blu-ray Disc, a flash memory card (e.g., a Secure Digital (SD) card), and/or the like. Content 108 can be delivered to the user together with a license 103 in a single package or transmission, or in separate packages or transmissions received from the same or different sources.

The end user's system 101 (e.g., a personal computer, a mobile telephone, a television and/or television set-top box, a portable audio and/or video player, an electronic book reader, and/or the like) contains application software, hardware, and/or special-purpose logic that is operable to retrieve and render content 108. The user's system also preferably includes software and/or hardware, referred to herein as a digital rights management engine, for evaluating the licenses 103 associated with content 108 and/or advertisements 104 and enforcing the terms thereof (and/or enabling the content rendering application to enforce such terms), and software and/or hardware for selecting appropriate advertisements to render in connection with use of content 108, and gathering and reporting information related thereto, as described in more detail below.

The digital rights management engine and/or the ad matching engine may be structurally or functionally integrated each other, and/or with a content rendering application, or may comprise separate pieces of software and/or hardware. Alternatively, or in addition, a user's system may communicate with a remote system (e.g., a server, another device in the user's network of devices, such as a personal computer or television set-top box, and/or the like) that uses a digital rights management engine and/or ad matching engine to make a determination as to whether to grant the user access to content previously obtained or requested by the user, and whether and which advertisements to render in connection therewith.

The digital rights management engine, and/or other software or hardware on the user's system, or in remote communication therewith, may also record information regarding the user's access to or other use of protected content and/or advertisements. In some embodiments, some or all of this information might be communicated, potentially in anonymous form, to a remote party (e.g., a clearinghouse 110, the content creator, owner, or provider 106, the user's manager, an entity acting on behalf thereof, and/or the like), e.g., for use in allocating revenue (such as royalties, advertisement-based revenue, etc.), determining user preferences, enforcing system policies (e.g., monitoring how and when confidential information is used), and/or the like.

As shown in FIG. 1, content 108 need not be distributed together with advertisements 104 (or licenses 103). Advertisements 104 can be separately provided, and integrated with content 108 dynamically by the user's system 101. As described in more detail below, this integration is preferably done in accordance with rules encoded in the licenses 103 associated with the content 108, the advertisements 104, and/or the user or system regarding the type and quantity of advertisements that may or must be integrated with the content, and/or the types of content with which an advertisement may be rendered. In a preferred embodiment, the system attempts to optimize the matching of ads with content by using demographic information about the user (e.g., age, gender, etc.), the usage history and preferences of the user, and/or other information about the user or the user's environment (e.g., time of day, global positioning system (GPS) coordinates, etc.). Because, in one embodiment, the matching is done locally, this user and environmental information can be maintained on the user's system, and need not be transmitted to third parties, thus protecting the user's privacy while enabling very accurate targeting of advertisements. As previously indicated, in some embodiments anonymous versions of some user and/or environmental information are sent to a clearinghouse 110 for redistribution to content providers and/or ad providers to facilitate the future provision of content and ads of potential interest to the user.

It will be appreciated that a number of variations can be made to the architecture and relationships presented in connection with FIG. 1 within the scope of the inventive body of work. For example, without limitation, in some systems, some or all of the content may be delivered together with some advertisements, the content and advertisements may be delivered to the user's system from a single source (e.g., a television service provider), and/or a piece of content may be integrated with multiple advertisements. In some embodiments, the determination of which advertisement(s) to present in connection with a piece of content can be performed by a remote system, and/or the integration of the advertisements and the content can be performed remotely, and the integrated content and advertisements then transmitted to the user's system for display or other rendering. Thus it will be appreciated that FIG. 1 is provided for purposes of illustration and explanation, and not limitation.

Figure 2:
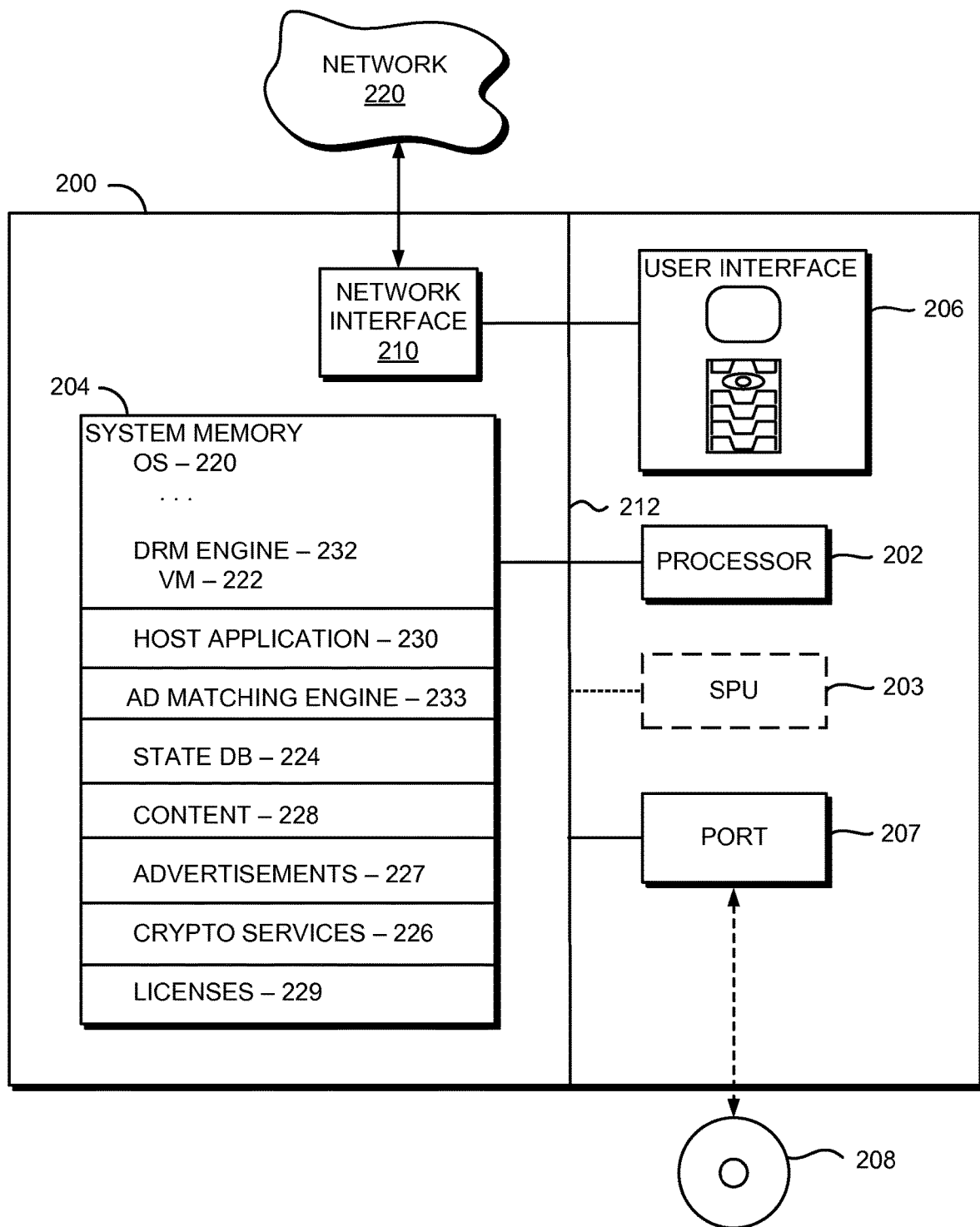
FIG. 2 shows a more detailed example of a computer system that could be used to practice certain embodiments.

FIG. 2 shows an example of a system 200 that could be used to practice embodiments of the inventive body of work. For example, system 200 might comprise an embodiment of an end user's device 101, an advertisement provider's computing system 102, a content provider's system 106, and/or the like. For example, system 200 may comprise a general-purpose computing device such as a personal computer or network server, or a specialized computing device such as a cellular telephone, personal digital assistant, portable audio or video player, electronic book reader, tablet, television set-top box, kiosk, gaming system, or the like. System 200 will typically include a processor 202, memory (i.e., a computer-readable medium) 204, a user interface 206, a port 207 for accepting removable memory 208, a network interface 210, and one or more buses 212 for connecting the aforementioned elements. The operation of system 200 will typically be controlled by processor 202 operating under the guidance of programs stored in memory 204. Memory 204 will generally include both high-speed random-access memory (RAM) and non-volatile memory such as a magnetic disk and/or flash EEPROM. Some portions of memory 204 may be restricted, such that they cannot be read from or written to by other components of the system 200. Port 207 may comprise a disk drive or memory slot for accepting computer-readable media 208 such as USB dongles, CD-ROMs, DVDs, memory cards, SD cards, diskettes, other magnetic or optical media, and/or the like. Network interface 210 is typically operable to provide a connection between system 200 and other computing devices (and/or networks of computing devices) via a network 220 such as the Internet or an intranet (e.g., a LAN, WAN, VPN, etc.), and may employ one or more communications technologies to physically make such connection (e.g., wireless, Ethernet, and/or the like). In some embodiments, system 200 might also include a processing unit 203 that is protected from tampering by a user of system 200 or other entities. Such a secure processing unit can enhance the security of sensitive operations such as key management, signature verification, and other aspects of the rule enforcement process.

As shown in FIG. 2, memory 204 of computing device 200 may include a variety of programs or modules, which, when executed by processor 202 (and/or 203), can control the operation of computing device 200. For example, memory 204 will typically include an operating system 220 for managing the execution of applications, peripherals, and the like; a host application 230 for rendering protected electronic content; an ad matching engine or module 233 for performing aspects of the ad selection and matching functionality described herein, and a DRM engine 232 for implementing some or all of the rights management functionality described herein. In some embodiments, DRM engine 232 may comprise, interoperate with, and/or control a variety of other modules, such as a virtual machine 222 for executing control programs, and a state database 224 for storing state information for use by virtual machine 222, and/or one or more cryptographic modules 226 for performing cryptographic operations such as encrypting and/or decrypting content, computing hash functions and message authentication codes, evaluating digital signatures, and/or the like. Memory 204 will also typically include protected content 228, advertisements 227, and associated licenses 229, as well as cryptographic keys, certificates, and the like (not shown).

One of ordinary skill in the art will appreciate that the systems and methods described herein can be practiced with computing devices similar or identical to that illustrated in FIG. 2, or with virtually any other suitable computing device, including computing devices that do not possess some of the components shown in FIG. 2 and/or computing devices that possess other components that are not shown. Thus it should be appreciated that FIG. 2 is provided for purposes of illustration and not limitation.

The discussion herein refers to the enforcement of license restrictions relating to content and advertisements, with the assumption that if the system (including, e.g., the DRM engine, ad matching engine, and host application) operates as intended, the terms of the licenses will be enforced. In practical applications of the systems and methods described herein, protection of the system (e.g., the software and the hardware with which it interacts) from malicious tampering or modification can be accomplished using any suitable combination of security techniques. For example, cryptographic mechanisms such as encryption, digital signatures, digital certificates, message authentication codes, and the like can be employed, e.g., as described in the '693 application, to protect the DRM engine, host application, and/or other system software or hardware from tampering and/or other attack, as could structural and/or tactical security measures such as software obfuscation, self-checking, customization, watermarking, anti-debugging, and/or other mechanisms. Representative examples of such techniques can be found, for example, in U.S. Pat. No. 6,668,325 B1, Obfuscation Techniques for Enhancing Software Security, and in commonly assigned U.S. patent application Ser. No. 11/102,306 (Publication No. 2005/0183072 A1), Software Self-Defense Systems and Methods; U.S. patent application Ser. No. 11/737,428 (Publication No. 2008/0028474 A1), Systems and Methods for Watermarking Software and Other Media; U.S. patent application Ser. No. 10/172,682 (Publication No. 2003/0023856 A1), Software Self-Checking Systems and Methods; U.S. patent application Ser. No. 11/338,187 (Publication No. 2006/0123249 A1), Trusted Storage Systems and Methods; and U.S. Pat. No. 7,124,170 B1, Secure Processing Unit Systems and Methods, each of which is hereby incorporated by reference in its entirety. Alternatively, or in addition, physical security techniques (e.g., the use of relatively inaccessible memory, secure processors, secure memory management units, hardware-protected operating system modes, and/or the like) can be used to further enhance security. In addition, a number of commercial products can be used to protect applications from tampering, any suitable one or more of which could be used.

Yet another form of security can be provided by the institutional design and operation of the system, and by the legal and social regulation of the participants therein. For example, entities in the system may be required to contractually agree to adhere with system specifications and requirements, or may need to submit to a certification process during which an entity's compliance with system requirements could be verified, and/or the like. For example, a device or application may be required to implement the DRM engine in a way that is compatible with other implementations in the environment, and/or may be required to provide a certain type or level of tamper resistance or other security. Digital certificates could be issued that attested to a device's or other entity's compliance with such requirements, and these certificates could be verified before allowing the device or entity to participate in the system, or as a condition of allowing continued participation.

Such security techniques will be well-known to one of ordinary skill in the art, and it will be appreciated that any suitable combination of some, none, or all of these techniques could be used depending on the desired level of protection and/or the details of the particular application at hand. It will also be appreciated that while certain security mechanisms are described herein in connection with certain embodiments, use of these techniques is not required in all embodiments. Additional, non-limiting information on security techniques that can be used in connection with the inventive body of work is set forth in the '693 application.

In preferred embodiments, the security policies for specific deployments are considered on a case-by-case basis. If a specific system has complete control over the content and ad distribution mechanisms, then the security policy around these aspects could be relaxed. However, the security policy would typically need to be stricter if the content and ad distribution mechanisms are completely uncontrolled. As yet another example, on some platforms the client may be inherently more secure, therefore a relaxed security policy may be sufficient. Whereas, on platforms prone to malicious attack, the security policy would typically need to be stricter. The security policy that is chosen will also typically depend on the value of the content and ads and the incentives of different parties to break the system.

Figure 3:
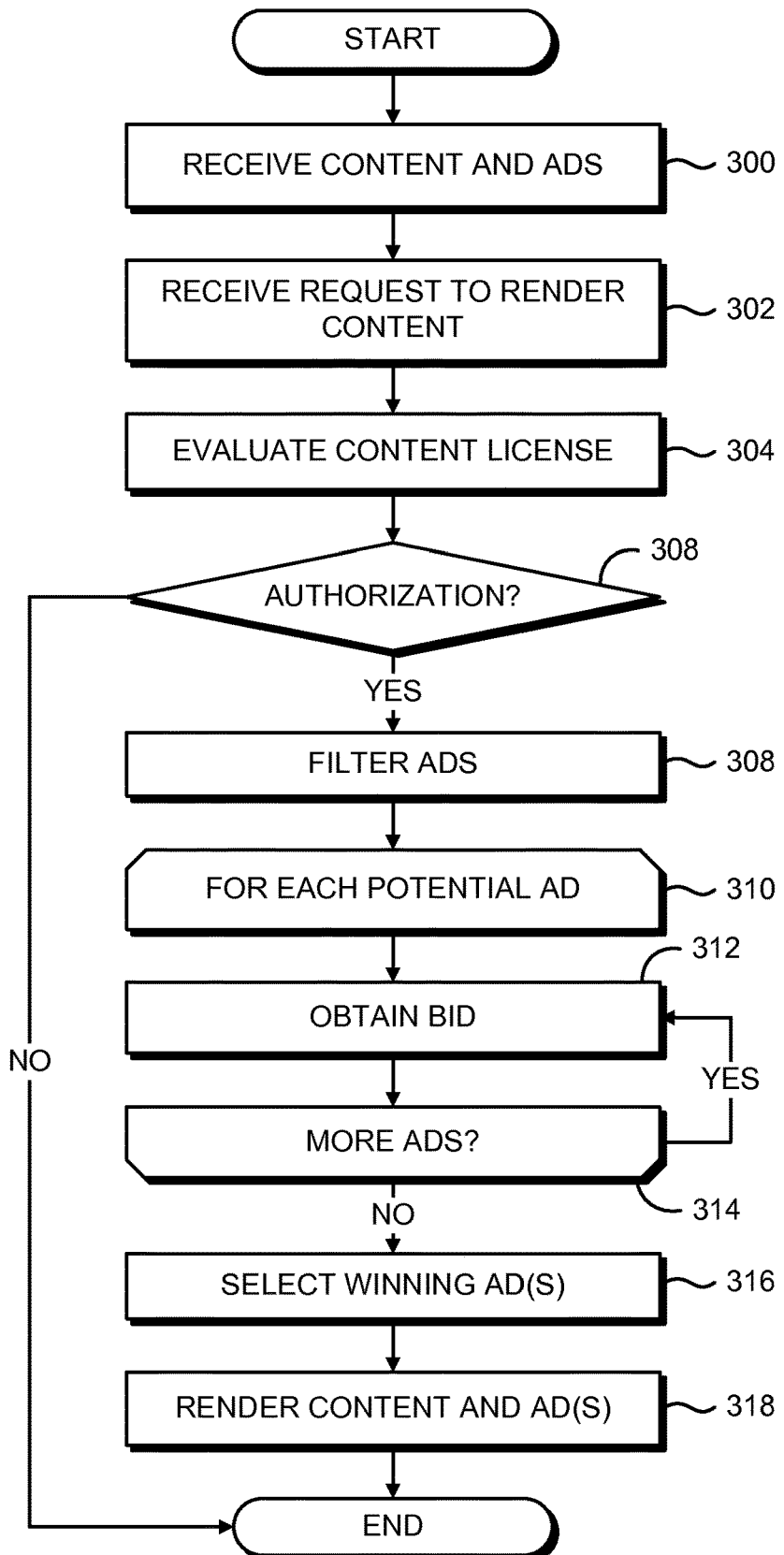
FIG. 3 shows an example of a method for delivering, selecting, and presenting advertisements.

FIG. 3 shows an example of a method for delivering, selecting, and presenting advertisements in accordance with one embodiment. As shown in FIG. 3, a consumer's device receives content and advertisements (300). As described above, the consumer's device could receive the content and advertisements via any suitable means. The content and advertisements can be delivered together or separately, at different times, and/or from different sources. Upon receiving a request from the consumer to render (e.g., view, play, run, etc.) the content (302), the user's system evaluates a license associated with the content (304) to determine if the requested use is authorized or otherwise permitted (306). If the request is authorized (i.e., a "yes" exit from block 306), and the license further requires that one or more advertisements be presented when the content is rendered, the user's system optionally filters its set of ads to exclude any ads that the content and/or ad licenses prohibit from being displayed with the requested content (308). The licenses associated with each of the remaining ads are then evaluated to obtain a bid from each advertisement for the privilege of being selected for rendering with the content item (blocks 310-314). As described in more detail elsewhere herein, in some embodiments the value of each advertisement's bid may be based in part on characteristics of the consumer, the content, the consumer's system, and/or the like, which the ad matching and/or DRM engine may retrieve from local storage and use when evaluating the rules associated with a particular ad. Once bids from all of the relevant ads have been obtained, one or more winning ads can be selected (316), and the content item can be rendered along with the winning ad(s) (318). It will be appreciated that FIG. 3 has been provided for purposes of explanation and illustration, and that in other embodiments, some of the actions shown in FIG. 3 might be omitted, performed in a different order, combined, or supplemented with additional actions that are not shown.

Figure 4:
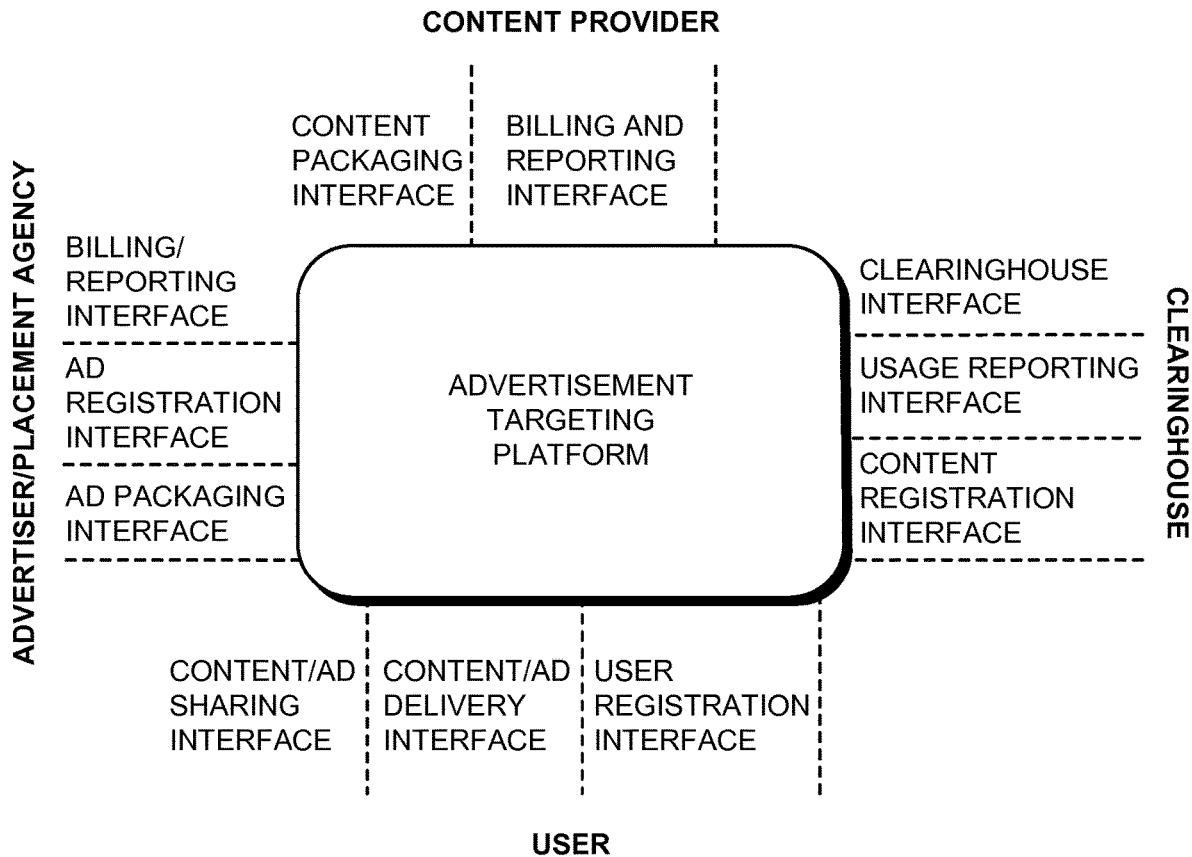
FIG. 4 is a high-level illustration of various players in a preferred embodiment, and the interfaces provided to them.

A more detailed description of an illustrative framework for performing ad matching is provided below in connection with FIG. 4. FIG. 4 is a relatively high-level conceptual illustration of a platform for performing ad matching, showing the various players involved, and the interfaces provided to them, in some embodiments. While preferred embodiments of the platform shown in FIG. 4 support a variety of powerful features, many of these features may be purposely suppressed (or, in other embodiments, eliminated) in order to optimize a given business model. For example, a content provider may not want to make use of incentives for highly fluid super-distribution of content, instead favoring more traditional, manual contract-based distribution approaches. But that content provider might still want to make use of the ad-slot auctioning mechanisms. Thus, it will be appreciated that many of the features shown in FIG. 4 and/or described elsewhere herein are designed to be optional or deployed independently and in accordance with the needs of a given content distribution business model. This inherent flexibility allows for customized deployments employing only some of the functions and features presented herein. In addition, while, for ease of explanation, FIG. 4 shows a single advertisement targeting platform, it will be appreciated that in practice the functionality of this platform will typically be distributed over multiple devices and systems. For example, while in some embodiments substantially all of the functionality shown in FIG. 4 could be provided by a web site or service, in other embodiments some parts of the functionality will be performed separately by an advertiser's system, a content owner and/or distributor's system, a clearinghouse, an end user's system, and the like.

As previously indicated, in preferred embodiments both content and advertisements can be (but need not be) independently super-distributed using multiple distribution means. One of the highlights of certain preferred embodiments is the separation of content delivery from ad delivery. Ads and content can be delivered through entirely different distribution mechanisms. The choice of what advertisements are displayed when content is rendered can be made independently of the content, and, for example, can be negotiated at the time of content rendering on the basis of the best payoff for rendering the advertisement. Advertisements can be targeted to the user through the distribution means, and can be optimally matched for rendering based on local data stored on, or only available to, the rendering device.

In preferred embodiments, and as described in more detail below, a DRM engine, such as that described in the '693 application, can be used to evaluate the controls associated with pieces of content and advertisements in order to determine which advertisements to render (e.g., display) with a piece of content. Such a DRM engine is flexible, and the rules which can be expressed for each content item and for each ad are very open. In one embodiment, the rules can be expressed by the content provider or the advertiser in a simple text, such as XML. In some embodiments, these rules can later be converted into the type of objects supported by the DRM engine (e.g., using a tool for generating code for the DRM engine's virtual machine) and can be associated with the content or ad. In other embodiments, the DRM engine or ad matching engine is able to interpret the rules in the same form as originally expressed by the content provider or advertiser, such that a conversion step is unnecessary.

A simple example of a rule that might be associated with an ad is one that indicates that an advertiser is willing to pay 10 cents for each ad impression, but is willing to pay 5 additional cents when the ad is shown to a targeted demographic and at a certain time of day. Similar rules can be associated with a piece of content.

Content Deployment

As shown in FIG. 4, in one embodiment content providers and content aggregators deploy their content by packaging content items with rules (e.g., rules of the type enforced by a DRM engine) that require rendering applications to optimally choose ads that fill content ad-slots identified within the content (e.g., using the technology described in the '543 application) at the time the content is rendered (e.g., played, viewed, executed, in the case of software, etc.). Additional rules can be optionally specified that describe how much ad revenue will be shared with a lower tier content distributor. All of the rules can be instantiated in one or more control objects that are bound to and packaged (or otherwise associated) with the content item. In some embodiments, the platform may provide services to content providers enabling them to revoke a particular piece of content.

Figure 5:
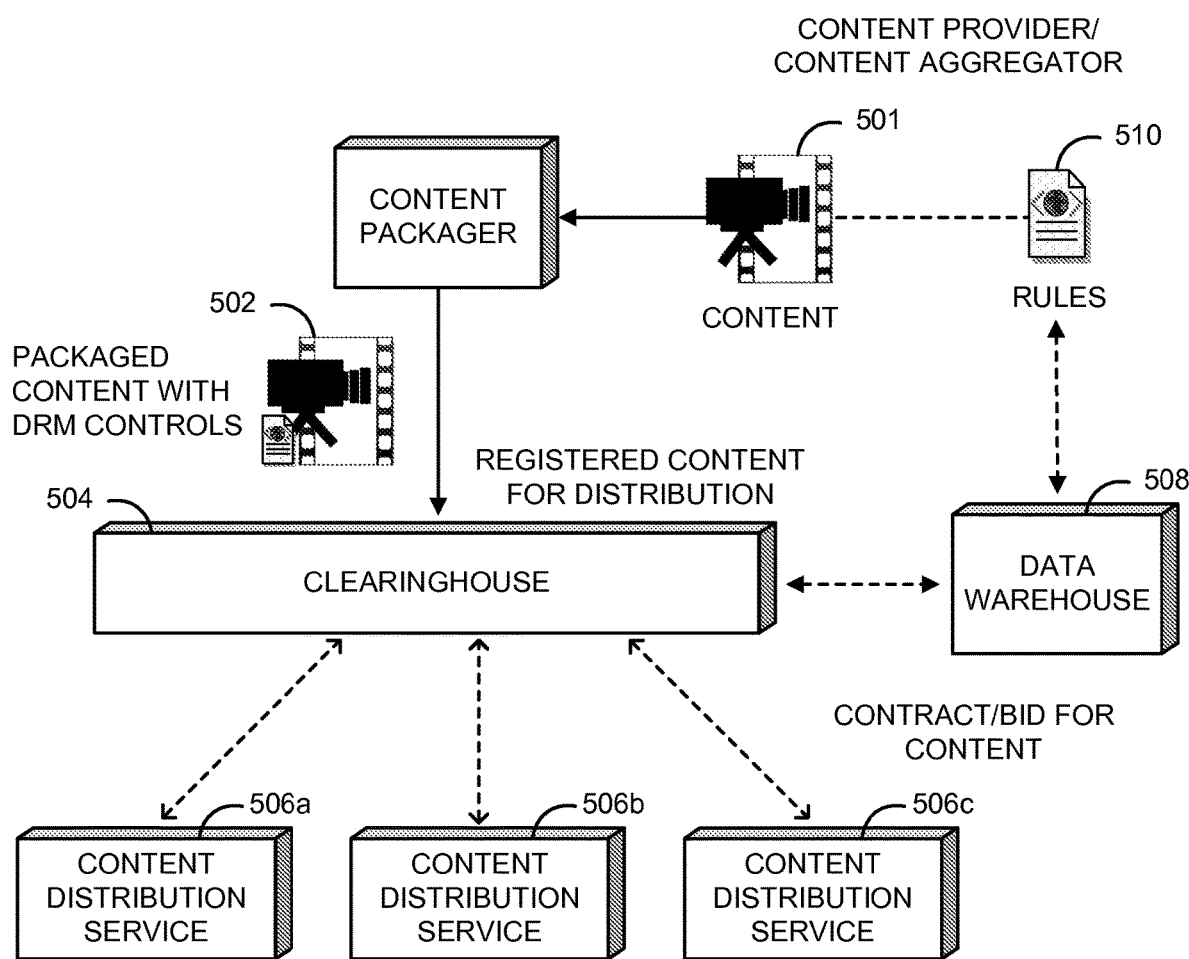
FIG. 5 illustrates a content deployment scheme in one embodiment.

FIG. 5 is a more detailed illustration of a content deployment scheme in one embodiment. As shown in FIG. 5, packaged content 502 is registered with a clearinghouse 504 and is then made available to various content distribution services 506a, 506b, 506c (collectively referred to as distribution services 506). These distribution services 506 can use traditional contract mechanisms for obtaining content 502, and/or they may bid for content 502 in terms of a percentage of the content ad-revenue share and/or other factors that predict return on investment for distribution rights. Content providers may have an incentive to accept bids from distributors who charge more per impression for distribution when they consider statistics that show how effective the distributor is in hawking content. In one embodiment, such statistics are available from clearinghouse 504 and/or data warehouse 508.

In one embodiment, content providers can get real-time (or close to real-time) feedback on the performance of their content. Based on statistics provided by data warehouse 508, content providers can modify the rules 510 associated with their content items 501. In one embodiment, the updated rules (e.g., expressed as control objects enforceable by a DRM engine) are delivered to clients and/or distribution service providers in an opportunistic manner.

Referring once again to FIG. 4, in one embodiment advertisers or placement agencies deploy their ads through an ad registration service, packaging ads with rules that describe what the advertiser will pay, under specified conditions, when an ad is rendered. These conditions can include, for example, the consumer's demographic and other attributes, time of day, geographic location, number of times the ad was previously rendered on the device, etc. Different rates can be associated with different conditions. The rules may also specify how much is to be paid to an ad distribution service whose purpose is to make the ads available to consumers on their rendering devices, optimally targeting the ads at the time of distribution to users based on user attributes that may be available at the time of distribution. In one embodiment, these rules are instantiated as a control of the type described in the '693 application, that is bound to or otherwise associated with the ad.

Figure 6:
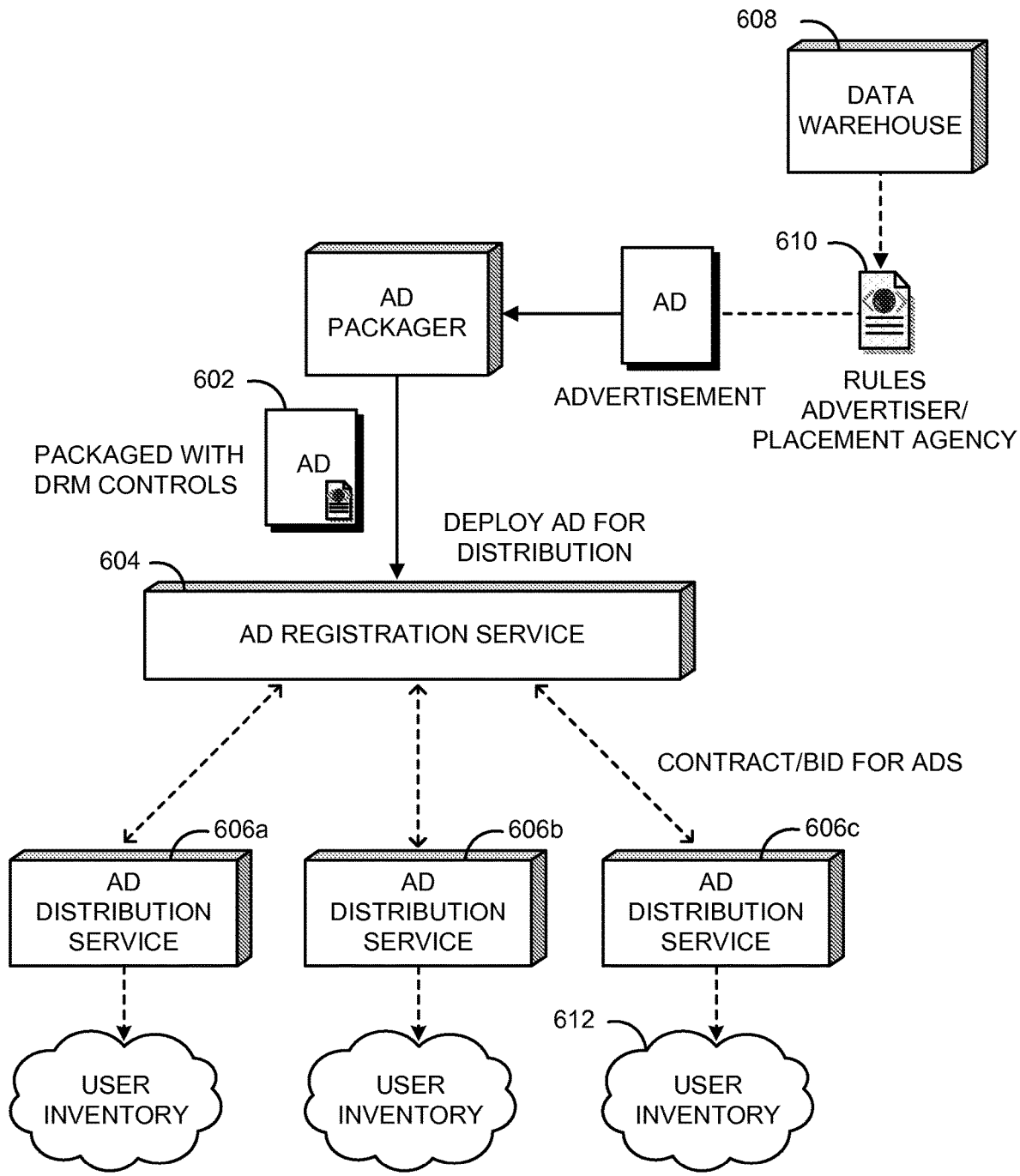
FIG. 6 illustrates an ad deployment scheme in accordance with one embodiment.

FIG. 6 is a more detailed illustration of an ad deployment scheme in accordance with one embodiment. In the example shown in FIG. 6, advertisers can get real-time (or close to real-time) feedback on their ad-campaigns from data warehouse 608 and/or ad registration service 604. Advertisers can examine statistics that show the effectiveness of ad distributors 606, and accept higher bids from the ad distributors 606 who are more effective at making ads 602 available to different consumer types. Updated rules 610 (e.g., expressed as controls objects), associated with advertisers or advertisements, can be delivered to end-user client devices in an opportunistic manner. In some embodiments, an ad distributor 606c might adopt a push and/or a pull model to distribute ads 602 to its user inventory 612. Some of ad distributors 606 could be conventional ad networks that have a user/device inventory to which they currently feed ads. Preferred embodiments are flexible, and allow an advertiser to send out actual ads to a consumer's device, and/or to send out references to remote ads. In preferred embodiments, in each of these scenarios, rules are sent to the client for performing optimal ad matching.

Ads are typically targeted to a user. Alternatively, or in addition, in some embodiments the advertiser may choose to pay extra money when the ad is displayed during the rendering of content matching certain criteria. A simple example might be an advertiser that is willing to pay 10 cents regularly, but is also willing to pay 12 cents when the ad is displayed along with content that falls under the content genre "Sports" or "Adventure". This exemplifies the affinity between the content and the ad. In some embodiments, there may be a default policy associated with ad matching. One such ad matching policy could be based on the rating of the content and/or the ad. For example, a situation where such policy might be applicable is when an adult using a mobile player could be showing children's content to a child. In this situation, such policy could disallow an ad targeted to adult consumers, when content appropriate for children is being rendered.

In some embodiments, ad delivery services can operate through push and/or pull models, through social networking sites, or through web search applications. The push model can work well when operated by a service provider who has more intimate knowledge of the consumer. Preferred embodiments also provide services to advertisers to revoke a particular advertisement.

Referring once again to FIG. 4, in one embodiment consumers may receive content and/or ads through any suitable distribution service, including, without limitation, media web stores, social networking sites, and peer-to-peer delivery mechanisms. Preferred embodiments can be designed to be compatible with virtually any content or ad distribution approach. Consumers may receive ads pushed to them by various ad delivery services (such as a service that provide the rendering application or device), or pulled from various web sites that they visit. In each of these cases there are relatively primitive ways of targeting ads to the consumer (e.g., such as by using information volunteered in questionnaires, knowledge of search terms used by the consumer, or an analysis of the type of content on specialized websites such as blogs or websites associated with special interest groups). Ads can be collected in a cache stored on the consumer's local device and possibly shared with other devices that are part of the consumer's personal network.

In some embodiments, consumers may also store certified attributes on their devices that they acquired from services that are in a position to vouch for these attributes (e.g., attributes relating to age, gender, education, club membership, employer, frequent flyer or frequent buyer status, credit rating, etc.). In order to ensure privacy, this attribute information is preferably not shared, except possibly with other devices or entities that the consumer owns or trusts. In one embodiment, the information is only used locally on the device, as explained below. An exception to this may be made when trusted services are used to access these attributes in order to refine them or derive new attributes from them, or to use them to screen ads as part of a trusted service the consumer subscribes to (e.g., by opting in). Finally, devices may collect other attributes from various user events, which can, for example, include metrics or attributes derivable from the user's history of interactivity with ads, purchasing history, browsing history, content rendering history, etc. In addition, a variety of environmental attributes may also be available, such as time of day, geographic location, etc. In some embodiments, this information is not made available outside of the device, except that trusted services may be used to analyze the raw information and derive attributes that can be used for ad matching.

In some embodiments, attributes and/or groups of attributes are bound to a user (e.g., using a link object of the type described in the '693 application), and user nodes are bound to devices (e.g., using another link object). This potentially makes user information and attributes available to a number of different devices, but in a controlled manner with an infrastructure that helps ensure integrity.

Figure 7:
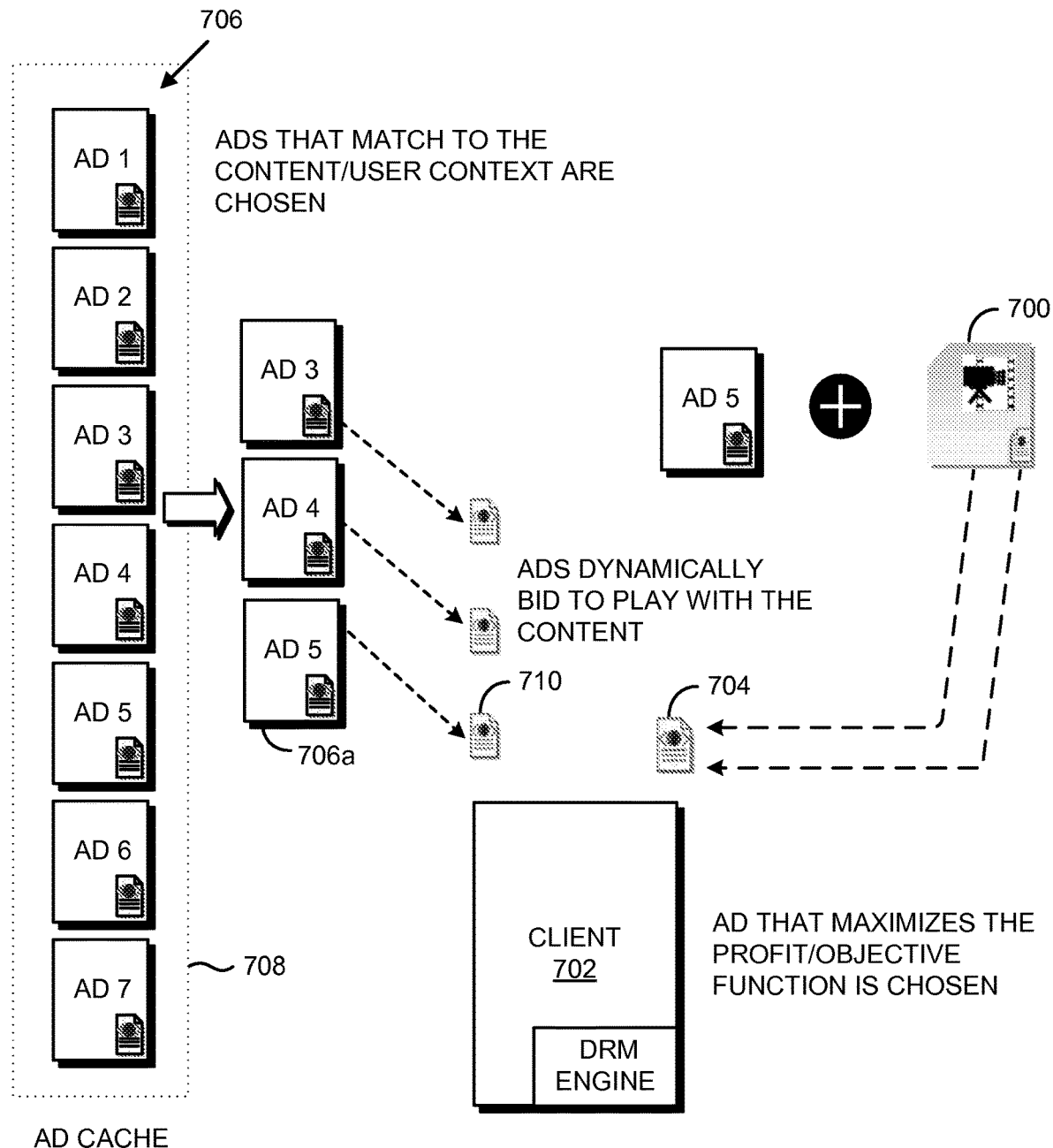
FIG. 7 illustrates the dynamic selection of an advertisement.

As shown in FIG. 7, in one embodiment when a consumer wishes to render content 700 on a compliant content playback device or application 702, the device 702 executes the content item's control 704 that requires that ad-slots for content 700 be filled according to an objective function that optimizes the content provider's objective of collecting ad revenue from this viewing event. The objective function can be expressed using a DRM object and can be updated as desired. In one embodiment, the control 704 will evoke a search mechanism through the available ads 706 in the local ad cache 708. As shown in FIG. 7, in some embodiments the set of available ads may be narrowed down in accordance with requirements in control 704 as to the type of advertisement that is permitted to be played in connection with content 700. Once a group of potential ads is selected, the license (also referred to in some embodiments as a DRM control) associated with each ad is evaluated. For example, when the control 710 of an ad 706a executes, it computes a bid for the ad slot based on the information in the control 710, and various local attributes available to the control. In some cases, control of the link to an attribute node may require payment for the use of trust in the attributes provided in that node. In one embodiment, the bid consists of two numbers: the first is the amount the advertiser will pay for rendering the ad, and the second is the amount the content provider gets. The difference (if any) is the amount that may need to be paid to others, including, e.g., the ad distributor, the device provider, the clearinghouse, the service provider, an attribute certifiers, and/or the like. When the bids are computed, the content control's objective function is used to select the ad that will be rendered based on the bids. Typically, the objective function will choose the ad with the biggest payoff to the content provider. However, the function could give some weight to the total payoff amount (paid by the advertiser) in order to encourage development of the infrastructure. This, in turn, could maximize impressions and the quality of ad matching, and have an effect on future bidding, thereby increasing competition, promoting larger bids in the future, and thus maximizing total return for all stakeholders. Thus, it will be appreciated that a variety of mechanisms could be used to select a winning bid.

In one embodiment, once an ad is rendered, an audit record is created and (eventually) sent to a clearinghouse specified in the content provider's control. In one embodiment the audit record includes the bid information, including the total price the ad paid, and the amounts to be paid to the various stakeholders (e.g., the clearinghouse, the device provider, the ad distributor, the content distributor, etc.).

Figure 8:
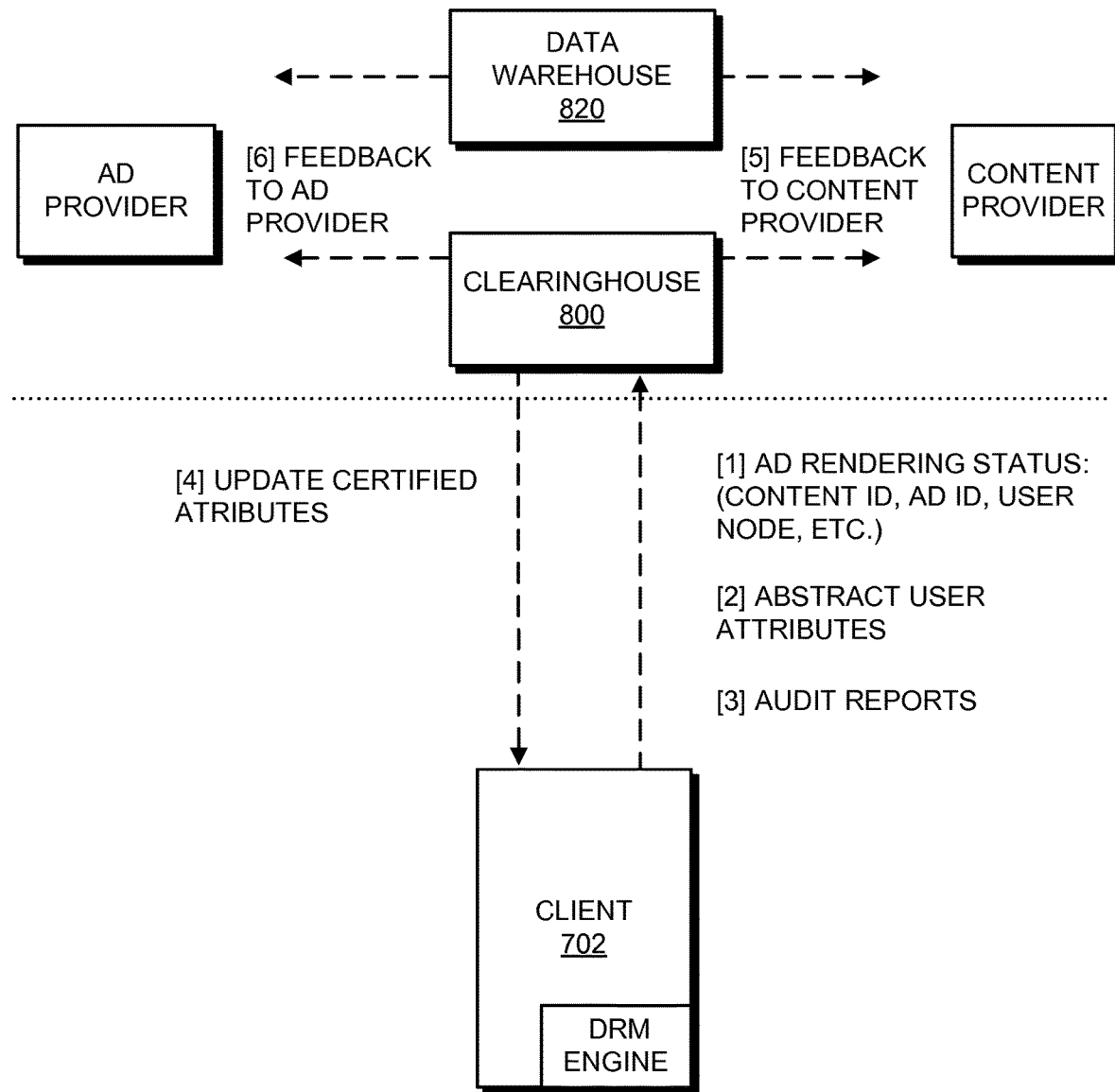
FIG. 8 illustrates audit reporting in accordance with one embodiment.

FIG. 8 illustrates various examples of audit reporting. As shown in FIG. 8, in one embodiment, client 702 could opportunistically send clearinghouse 800 one or more audit records that include information about ad and content rendering transactions. Some of the audit record information might include data on the ads that participated in the auction, the user contextual data used during the auction, and the content chosen for rendering. Based on the prevailing privacy laws, this transactional data might be anonymized. These usage reports could also be forwarded to a data warehouse 820 for further analysis and redistribution. In some embodiments, the amount paid to the content distributor could be a percentage of the amount paid to the content provider (and not used in the objective function calculation) or it could be a separate item, but included in the total. It is expected that often the amounts will be relatively small on a transactional basis, and therefore large scale is preferable for ad revenue sharing and content distribution to work most efficiently. However, it will be appreciated that in preferred embodiments the system is designed to scale up automatically, and use automation effectively, while, on the other hand, being capable of supporting a large number of simpler models for long-tail reaches, supporting revenue shares for small-scale content providers, and allowing local advertising to be effectively supported.

In one embodiment, if, at the time of content rendering, there are an insufficient number of relevant ads, a fallback or default ad could be displayed. In one embodiment, these fallback ads will only be rendered as long as the rules associated with the content are respected. The fallback or default ads can, for example, be provided by any of the stakeholders.

In one embodiment, in an 'open' deployment, where the content and the ads are distributed through multiple delivery networks, consumers could be given an opportunity to 'flag' inappropriate content or ads. If some predefined minimum number of users report that a content item or ad is inappropriate, then the content item or ad could be removed from the system (e.g., via cryptographic revocation).

A powerful feature of some preferred embodiments is the collection and distribution of system statistics. In one embodiment, clearinghouse 800 collects a large amount of information from audit records and forwards it to data warehouse 820. In one embodiment, the data that is sent to warehouse 820 is stripped of any private information that would explicitly identify the user, the content, and/or the ad. Data warehouse 820 can employ existing statistical techniques to compute effectiveness rankings for both content distributors and ad distributors. Data warehouse 820 could provide services that present information that can be used to determine optimum pricing for ad bids, content distribution shares, and ad distribution shares. Advertisers can discover which ad distributors are most effective in reaching certain consumer types. Ad distributors and content distributors can use clearinghouse statistics and breakdowns to determine what kinds of ads they can more effectively distribute and target, and how they can target them. The effectiveness of device and application providers can also be gauged, so that appropriate incentives can be provided in the bids at the advertiser/ad distributor interface, the content provider/content distributor interface, and in the bids for ad-slots.

Example Use Case Scenarios

Content Deployment

In this example, FashionTV would like to upload its latest winter collection to the system. FashionTV has slotted the content for ads, and decides on any ad-slot filling rules. FashionTV also specifies, as part of the rules, the minimum revenue that is expected from each rendering of the content clip.

The rules can be entered from a user interface, and could later be mapped into an XML representation, which could, in turn, be translated into a DRM control that can be processed by a DRM engine. The following illustrative XML snippet is a rule definition provided by FashionTV:

```
<ContentRule>
    <Name>Winter Collection</Name>
    <Genre>Fashion</Genre>
    <Rating>PG</Rating>
    <AdSlots>
        <Slot>
            <Duration>10</Duration>
        </Slot>
        <Slot>
            <Duration>15</Duration>
        </Slot>
        <Slot>
            <Duration>10</Duration>
        </Slot>
    </AdSlots>
    <ExpectedBid>
        <!-- The revenue expectation of the content. The content needs this much to be sponsored by ads -->
        <Min>$1.25</Min>
    </ExpectedBid>
    <ClearingHouse>http://clearinghouse.xyz.com </ClearingHouse>
</ContentRule>
```

In the above rule definition, the content provider has offered three ad slots for the "Winter Collection" content clip. The minimum revenue expectation for each content play is set at $1.25. Moreover, additional attributes for the content are also provided, including the content's rating and genre. In this example, the rule also explicitly identifies the clearinghouse that needs to be contacted after a content rendering event, which illustrates the flexibility that content distributors would have to specify the particular clearinghouse for revenue collection and reporting purposes.

FashionTV could make this content clip and the associated rules definition available to the system's packager. The packager would then create a DRM control (e.g., a control object of the type described in the '693 application) from the specified rules, package the content, and register with the clearinghouse for further delivery to third party content distribution networks. The external distribution networks would then make the packaged winter collection content clip available to their users for consumption.

Ad Deployment

In another example, Ad Corp., a video advertising aggregator, would like to deploy its new ad campaign for ABC Co. trucks. Ad Corp. has analyzed the ad targeting requirements, and would like to target a suburban audience whose gross annual income is more than $80 k and that is in the age group of 25-35. There is also a gender preference (male). Ad Corp. has concluded that the ad campaign would be more effective if it is associated with a content clip whose genre is either sports or action. Given the target audience, Ad Corp. decides that the ad should run between 6 PM to 9 PM for greater reachability. Keeping its 360 degree engagement model, the ad campaign would also carry a call-for-action feature.

Ad Corp. is not certain of the cost-per-mille ("CPM", or cost per thousand impressions) price that this ad campaign should pay. Taking advantage of the system's ability to provide auctioning with feedback, Ad Corp. chooses a $0.15 minimum bid for each impression/ad-run. In addition, Ad Corp. specifies circumstance under which it is willing to increase its bid amount, and/or under which it is not willing to bid at all. The constraints and requirements of the ad campaign are expressed as part of a rule definition, which can be entered via a user interface that is available to Ad Corp., or written directly in XML.

An XML representation of the ad rules for this example might be as follows:

```
<!-- Ad for ABC Co. Trucks targeting
Rule 1. Income level: > 80k
Rule 2. Location: Suburban
Rule 3. Age group: 25-35
Rule 4. Gender: Male
Rule 5. Target Content Genre: Sports or Action or Adventure
Rule 6. Time of the day: 6pm to 9pm
NOTE:
a. Bid price is $0.15 for each impression
b. This is a clickable Ad->
<AdRule>
    <Rating>G</Rating>
    <Bid>
        <!-- Note # a -->
        <Min>0.15</Min>
        <Max>0.25</Max>
    </Bid>
    <TargetAudience>
        <!-- Rule # 1-->
        <IncomeLevel BidFactor="1.1">over 80000</IncomeLevel>
        <!-- Rule # 2-->
        <ResidenceLocation
BidFactor="1.5">Suburban</ResidenceLocation>
        <!-- Rule # 3-->
        <Age BidFactor="1.5">25-35</Age>
        <!-- Rule # 4-->
        <Gender BidFactor="1.25">M</Gender>
    </TargetAudience>
    <!-- Rule # 5-->
    <TargetContent BidFactor="1.25">
        <Genre>Sports</Genre>
        <Genre>Action</Genre>
        <Genre>Adventure</Genre>
    </TargetContent>
    <Context>
        <!-- Rule # 6 -->
        <TimeOfDay BidFactor="1.25">
            <Start>18:00</Start>
            <End>21:00</End>
        </TimeOfDay>
    </Context>
    <Actions>
        <OnClick>
            <LaunchURL>http://www.abcco.com/trucks</LaunchURL>
        </OnClick>
    </Actions>
    <ClearingHouse>http://clearinghouse.xyz.com</ClearingHouse>
</AdRule>
<TBD XML representation>
```

The ad content and rules are packaged via a packager into a format that is compatible with a DRM or ad matching engine. The packaged ad content is then registered with an ad registration service. Ad Corp. could distribute the packaged ad content to its own network, and/or it could let the ad registration service make the ad content available to other ad distribution networks. In some embodiments, a combination of the above two schemes could be used. For example, Ad Corp. could sell the ad campaign to other ad distribution networks that have unused content inventory, or could run the ad campaign in its own content network.

Preferred embodiments of the client application support the notion of ad counts. In one embodiment, ad counts allow the advertiser to choose reinforcement and fadeout strategies for their ads. In the above use case, Ad Corp., for example, might pay $0.15 for the first impression for a given user with the right attributes, but then pay $0.20, where $0.05 is a positive increment, for a second impression, under the theory that having paid for the first impression, it is important to compete against other ads and ensure a second impression for reinforcement. After that, it might pay only $0.10 (−$0.05) for a third impression, etc.

Ad Auctioning

In another example, user John Doe decides to play a content clip consisting of highlights from a sporting event. The clip defines two ad slots. When the clip is selected to play, the client platform performs local ad matching and identifies a number of ads from its local ad repository that match the rendering criteria (which might include, e.g., demographic, geographic, behavioral, contextual and past transactional information, etc.). The controls representing the rules associated with the selected ads are chosen and evaluated by the underlying runtime engine. The individual ad controls are presented with any contextual information that they may need to determine their bids.

The client platform would then choose two ads (for the two ad slots in the content clip) that maximize the objective function. The objective function in this example is a pure profit function, and hence the two highest bidding ads are chosen to play.

After the content plays, the controls representing the two chosen ads might report to the clearinghouse, e.g., the bid value, the type of content, abstracted user profile information, and/or the like.

The client platform might also report to the clearinghouse on the ads that failed in the auction. This feedback could include an identification of the winning bid, and abstracted user profile, contextual, and content information, and/or the like. Ad aggregators/placement agencies could use this information to take further action (e.g., by increasing their bid prices by distributing updated controls for use in future auctions).

Audit Reporting and User Profile Collection

In yet another example, user John Doe selects a content clip to play. The content is rendered along with any ads to fill the obligatory ad slots in the content clip. Afterwards, the client platform sends an audit report to a trusted clearinghouse. In this example, the audit report is sent opportunistically so as to limit network bandwidth consumption. The audit report includes information regarding ads that were chosen during the content rendering, the corresponding ad bids, the nature/genre of the content, the number of impressions that were made of the ads, abstracted user profile information, context information during the content play, and/or the like.

In some embodiments, the audit report sent to the clearinghouse also includes information regarding the ads that have participated in the bidding for the ad slots. The clearinghouse can then forward all of the client transactional data to a data warehouse. In preferred embodiments, the forwarded data that is sent to the warehouse is stripped of information that would explicitly identify the user, the content, and/or the advertisement. In some embodiments the client platform would also gather information regarding the user's viewing patterns, and send abstracted categorization information to the clearinghouse. This abstracted information, preferably free of private information, can be shared with preferred partners.

In order to conform with privacy laws in certain jurisdictions, the client may choose to maintain a user profile locally on the client, which can be represented as a node with attributes, as described in the '693 application. The various potential nodes (e.g., impulse buyer, fashion-conscious, etc.) are connected by links, which carry strengths that are based on advertising viewing patterns. User volunteered information can also be expressed as DRM objects, but these associations may be weaker in the beginning. As the platform learns more about the user from the client, the strengths of each association will change. The ad-controls associated with an ad could refer to these DRM objects and their strength values, and use this information to help decide on a bid-price.

An attribute aggregator node from an external entity could further refine the user profile for targeted advertising. This DRM node (e.g., of the type described in the '693 application) is introduced into the system through the trust mechanisms, and could include any qualifying attributes of the users, like organizational memberships, frequent flier status, etc.). Third party entities can be compensated for this, while the ad-controls can refer, during arbitration, to these aggregator nodes and their strength/connection to the user's node.

Consumers may choose to make up certain policies such as, for example, a policy to favor one ad provider over another, or a policy in which the user wants a certain service provider to maintain his or her user profile. Such policies can be expressed as DRM engine objects of the type described in the '693 application, and can be updated if and when necessary.

Figure 9:
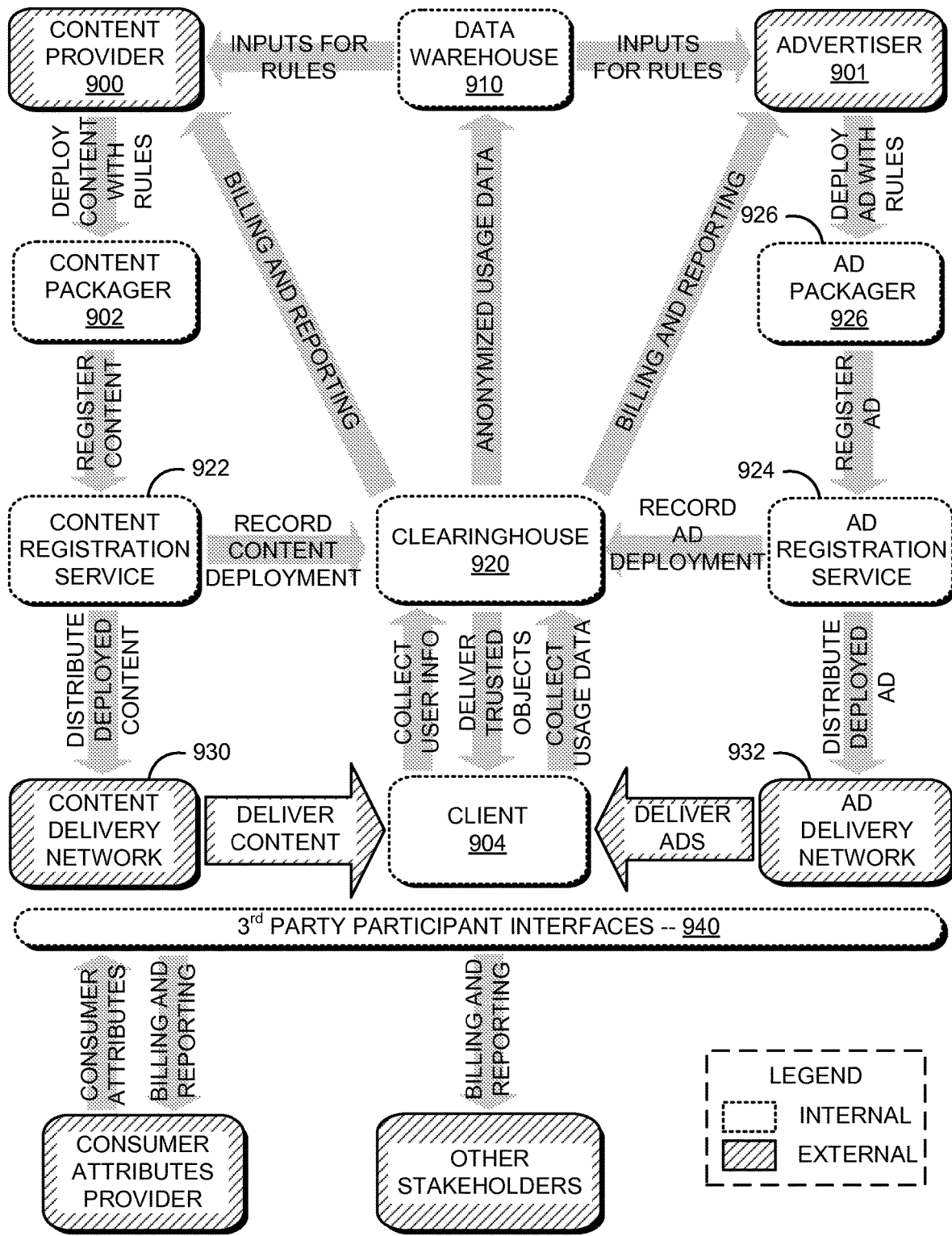
FIG. 9 illustrates various system components in one example embodiment, and the message interactions between them.

FIG. 9 is a more detailed illustration of various system components in one example embodiment, and some illustrative message interactions between them. As shown in FIG. 9, in one embodiment a content packager interface 902 is a service provided by the ad-matching platform that enables content providers 900 to package and transcode content for client consumption. The content thus packaged can be hosted by the provider 900 at its own site or can be hosted by the platform and/or an external content delivery network 930 for further delivery to client 904. In one embodiment, interface 902 allows a provider 900 to specify details about the content, including tags to help categorize the content. In one embodiment, the content packager is responsible for packaging content with associated deployment rules, specifying ad insertion points and content metadata, and updating content deployment rules.

In one embodiment, after the content is packaged, deployment information and the content's associated rules are registered with a clearinghouse 920. After registration with clearinghouse 920 is complete, the content is ready to be distributed. In one embodiment, a content registration service 922 enables the content to be discovered by content delivery networks 930. For example, the content registration service 922 could broadcast that the content is available, implement content discovery services, or perform some combination of both. In one embodiment, content registration service 922 is responsible for registering the content with a clearinghouse 920, un-deploying the content, and making deployed content available to content delivery networks 930.

In one embodiment, the content delivery networks 930 are the entities that are primarily responsible for delivering content to a consumer's device 904. One of ordinary skill will appreciated that there are many existing content delivery networks, and that any suitable content delivery network could be used in connection with the systems and methods described herein.

In one embodiment, the advertisement packager interface 926 is a service provided by the ad-matching platform to enable advertisers to package and format advertisements for client consumption. In one embodiment, packager 926 allows for ad insertions from both individual advertisers and third party ad networks. The packaged advertisements can be delivered to consumers directly by the provider 901, can be hosted by the platform for further delivery to the client, and/or can be hosted by an external ad delivery network 932. In one embodiment, interface 926 allows a provider 901 to specify advertisement rules and details about the advertisements, including tags to help categorize the advertisements. Services for various aspects of a campaign may include specifying a campaign budget, dynamic bidding for ad slots, and specifying associations with a user profile and/or a content type. In one embodiment ad packager 926 is responsible for packaging advertisements with associated deployment rules, and updating ad deployment rules.

In one embodiment, after an ad is packaged, the deployment details along with the ad's associated rules are registered with a clearinghouse 920. In one embodiment, an ad registration service 924 is provided to facilitate this process. After registration with clearinghouse 920 is complete, the ad is ready to be distributed. The ad registration service 924 enables the ad to be discovered by external ad delivery networks 932. Ads can be pushed to the ad delivery networks 932 or pulled by the ad delivery networks 932, depending on the need. In one embodiment, an ad registration service 924 is responsible for registering an ad with a clearinghouse 920, un-deploying an ad, and/or making a deployed ad available to the ad delivery networks 932.

In one embodiment, ad delivery networks 932 are the entities that are primarily responsible for delivering advertisements to the consumer's device 904. In one embodiment, clearinghouse 920 provides user profile retrieval services to the ad delivery networks 932. Ad delivery networks 932 can use this information to deliver highly targeted ads. One of ordinary skill in the art will appreciate that there are many existing advertisement delivery networks, and that any suitable network could be used.

In some embodiments, it may be desirable to apply certain restrictions on delivering ads by individual ad delivery networks. One such restriction could be on the number of ads which can be delivered by an ad delivery network, e.g., due to limited capabilities on the consumer's device.

In one embodiment, the operator of the ad distribution/matching system provides clearinghouse services 920 between the advertisers 901 and the content providers 900 in order to reconcile revenue sharing. In one embodiment, this interface 920 provides services for a local or a third party clearinghouse tool to access relevant transactional data from the server.

In one embodiment, a user profile collection interface collects information volunteered by the user, and a trusted object delivery interface is responsible for delivering self-protecting DRM objects to the consumer's device. The self protecting DRM objects may include, for example, nodes, links, and control agents of the type described in the '693 application. For example, when the system detects any changes in user behavior/categorization, updated objects can be delivered to the consumer's device.

Clearinghouse 920 also may provide a usage reporting interface for a hosting provider to access usage statistics on the performance of ad campaigns and the users' receptiveness to available content. Operators can use this data to fine tune their pricing spectrum for both content providers and advertisers. In one embodiment, this interface is responsible for forwarding audit reports to the data warehouse.

In some embodiments, clearinghouse 920 may have a billing and reporting interface that enables advertisers to gather information on various behavioral aspects during and after the completion of an ad campaign. Some of these might include, for example, the actual impressions of the ad, click-through rate (CTR) of the ad, profile information on the users who watched the ad (e.g., demographic, location, etc.), content associations of the ad, and/or other usage statistics. In one embodiment, the billing interface provides a web service for advertisers to access a billing system that monitors the ad run costs. In one embodiment, this interface is further tied to a clearinghouse service to reconcile campaign costs.

Thus, in various embodiments, clearinghouse 920 is responsible for some or all of:
  Recording content and ad deployment.
  Collecting usage data (possibly with context information) from consumer devices.
  Collecting user categorization information from the device. In some embodiments, some private information should not leave the user device. Such information will be generalized by the application on the device and sent out to the clearinghouse.
  Sending anonymized reports to the data warehouse.
  Creating and delivering trusted DRM objects to consumer devices.
  Managing content providers' and advertisers' accounts for billing purposes.
  Handling financial transactions.
  Providing reports to content providers (e.g., reports that answer questions like how many content views in the last 24 hours? how much ad revenue was a particular piece of content responsible for? how much revenue a content provider is making in a particular time period? how much revenue came from a particular ad provider?).
  Providing reports to advertisers (e.g., reports that answer questions like how many ad views in the last 24 hours? how many times did this ad sponsor content from a particular content provider? what is the click through rate? how much did an ad provider spend in particular time periods? what percentage of an ad budget is being used to sponsor content from a certain content provider?).
  Providing interfaces for third parties 940 (e.g., user information providers). For example, interfaces that enable parties that can provide further user information (e.g., membership in an automobile club or a retiree organization, type of credit cards held, frequent flier accounts, preferred customer accounts, and/or the like). This information can be used to deliver user attributes, which in turn can be used to better target ads.
  Facilitating the distribution of advertising revenue amongst the key participants in the value chain.

In preferred embodiments, a data warehouse 910 facilitates the collection and distribution of system statistics. Clearinghouse 920 collects a large amount of information from audit records and forwards it to data warehouse 910. In some embodiments, the data that is sent to warehouse 910 is stripped of any private information that would explicitly identify the user, the content, and/or the ad.

In preferred embodiments, data warehouse 910 offers services that provide information that can be used to determine optimum pricing for ad bids, content distribution shares, and ad distribution shares. For example, data warehouse 910 can employ conventional statistical techniques to compute effectiveness rankings for both content distributors and ad distributors. Advertisers can discover which ad distributors are most effective in reaching certain consumer types, and ad distributors and content distributors can use clearinghouse statistics and breakdowns to determine what kind of ads they can more effectively distribute and target, and how they can target them. The effectiveness of device providers and user application providers can also be gauged, so that appropriate incentives can be provided in the bids at the advertiser/ad distributor interface, the content provider/content distributor interface, and in the bids for ad-slots. Thus, in some embodiments the warehouse 910 can be responsible for some or all of:
  Collecting anonymized usage reports from the clearinghouse.
  Maintaining and reporting historical data.
  Providing feedback services for content providers to facilitate the creation of optimal rules.
  Providing feedback services to advertisers that help advertisers run their ad campaigns more effectively and minimize unnecessary impressions. It can also provide insights to an advertiser to facilitate the creation of more effective rules for a particular advertisement.

In preferred embodiments, client 904 includes a DRM engine to ensure that the rules specified by content providers and ad providers are executed, and any consequent obligations are met. In other embodiments (e.g., where the consumer's device lacks sufficient processing power), other configurations can be used. For example, in some embodiments rules could be processed by a proxy (e.g., over the web or over a home network), rather than at the client.

In preferred embodiments, the transfer of content and/or advertisements to the client can be accomplished by any suitable combination of offline and/or online modes. For example, a client may have a content and advertisement delivery interface that provides web services for a client player to download content and/or advertisements from the system backend.

As shown in FIG. 9, content can be delivered to the consumer's device 904 via content delivery networks 930, and ads can be delivered via advertisement delivery networks 932. Advertisement delivery networks 932, may, for example, deliver the ads relevant to the user based on user volunteered info, the user's usage behavior, and/or alternative or additional attributes.

After content has been rendered by client 904, any relevant obligations specified by the DRM controls associated with the content and/or the ads need to be honored. Such obligations may, for example, include sending feedback to a clearinghouse. This feedback could include context information, information regarding the ads and/or the content that was rendered, and/or the like. In some embodiments, additional information can also be provided, such as the winning bid prices or the like.

In a preferred embodiment, a content/advertisement sharing interface is provided to facilitate super-distribution of content and/or ads. Content and associated ads can be shared between a user's own devices or with other users. This interface may provide services to facilitate the distribution of content, such as by providing recommendations to the user's peers.

In some embodiments, the client could provide mechanisms to gather self-volunteered information from the user. There may be some incentives offered to the user in exchange for this information. The self-volunteered information can be used to categorize the user and to deliver highly targeted ads and possibly also to recommend relevant content that may be interesting to the user.

In some embodiments, the user might sign up and register with a service provided by the ad distribution platform. A user registration interface might provide services for user registration, including gathering initial profile information. In one embodiment, a unique user identifier (GUID) is assigned to the user, which is used to validate any allowed services.

FIG. 9 has been provided for purposes of illustrating the wide variety of services, interfaces, and relationships that can be provided in various embodiments. However, it will be appreciated that a variety of modifications can be made to the structures and functions described in connection with FIG. 9 without departing from the scope of the inventive body of work. For example, in some embodiments various elements illustrated in FIG. 9 could be combined or eliminated or supplemented with additional elements that are not shown. In addition, while FIG. 9 illustrates a relatively comprehensive ad matching platform, in some embodiments, some or all of the functionality of this platform could instead be performed by external entities. Thus it will be appreciated that FIG. 9 has been provided for purposes of illustration and explanation, and not limitation.

Use of Dynamic Media Zones

The following is a discussion of an illustrative set of example embodiments that make use of the DRM engine technology described in the '693 application and the dynamic media zone technology described in the '543 application. At an abstract level, the technology described in the '693 application consists of an object model and a control language which is applicable more generally to other areas outside what is traditionally viewed as "DRM". Embodiments of the systems and methods described in the present application provide a platform for advertising that is applicable to a large set of devices with varying degrees of storage capacity, processing power and network connectivity. Embodiments of this platform build on the technology and trusted services that have been described in the '693 application and the '543 application and extend this technology to provide innovative services for targeted advertising and trusted remote event monitoring, that leverage local information for ad-matching.

In preferred embodiments, trusted, self-protecting DRM objects are delivered to end user devices using standard mechanisms. An example of such a mechanism is the service-oriented technology described in the '551 application. These objects can be deployed to perform functions such as local ad-matching, usage data filtering, usage data reporting, and peer-to-peer (P2P) content and ad-sharing. Each of these functions is described in more detail below.

In the following discussion, the following terms will generally have the following meanings, unless otherwise clear from the context:

Ad-List: A typically unordered set of advertisements that is used for ad-matching. The list could be treated as an Ad-Queue if the order of the advertisements is not important.

Ad-Queue: An ordered set of advertisements obtained after performing ad matching to determine an order of priority.

Ad-Slot: A placeholder for an advertisement. Typically an insertion point for the advertisement in a piece of content.

Figure 10:
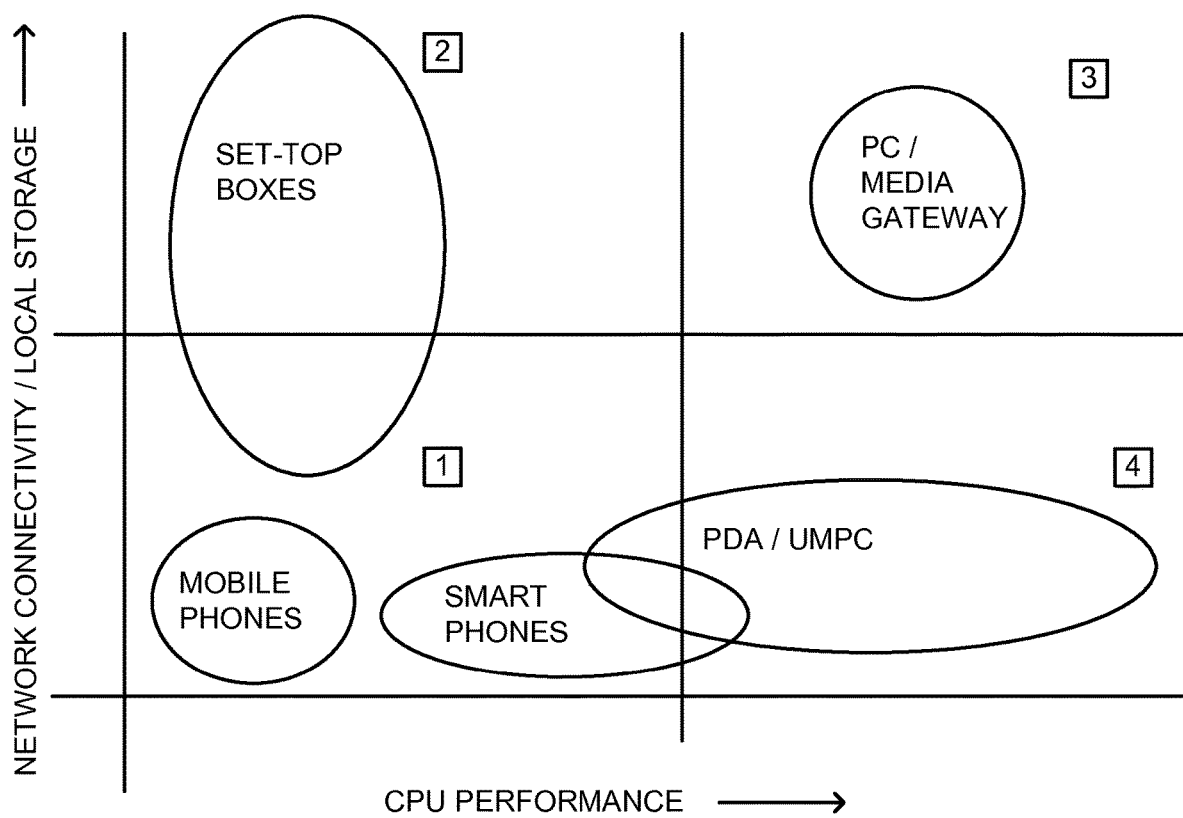
FIG. 10 shows examples of different types of devices supported by preferred embodiments.

As shown in FIG. 10, preferred embodiments of the systems and methods described herein support a large variety of consumer devices. These devices include, without limitation, mobile handsets, set-top boxes, personal digital assistants (PDAs), ultra-mobile personal computers (UMPCs), PCs, Media Gateways, televisions, and/or the like.

FIG. 10 shows the distribution of devices with CPU performance on the x-axis and Network Connectivity/Local Storage Space on the y-axis. For this illustration Network Connectivity is a measure of networking performance and could be an index computed using various network performance figures such as download speed, upload speed, time-continuity and area-coverage of the network etc.

In order to serve advertisements to a variety of devices with different capabilities, preferred embodiments make use of the computing power of the cloud as well as local processing power as appropriate to enable targeted ad-matching, efficient ad-delivery and effective usage data collection and reporting using trusted services. The actual computation required for these operations may be divided between local computation and server-side computation, to make best use of the capabilities of the platform within the existing network, local storage, and other constraints.

For devices with relatively low CPU power (e.g., Zone 1 and Zone 2 in FIG. 10) it may be desirable for the cloud's resources (e.g., server-side resources) to be used to pre-filter ads to a larger extent than might be done for devices in Zones 3 and 4. For devices that fall in Zone 3 or Zone 4, preferred embodiments make more extensive use of local processing power for ad-matching.

For devices in Zone 2 or Zone 3, direct download and caching of advertisements could be done to a larger extent than those in Zone 1 and Zone 4, where advertisements would tend to be downloaded on demand, side-loaded or streamed to the rendering devices.

Devices in Zone 2 and Zone 3 may directly report usage data to trusted services in the cloud either in real-time (Zone 3) or near real-time (Zone 2), while devices in Zone 1 and Zone 4 might be more likely to locally store a limited set of usage data and forward it to the trusted services in the cloud only infrequently because of the constraints of limited bandwidth and local storage and higher relative cost of bandwidth.

Regardless of the type of device, some pre-filtering is likely to facilitate more targeted and efficient ad-matching. In accordance with some embodiments, pre-filtering can be done using information available at the server using conventional ad-matching techniques. For example, third party statistical engines, anonymizer software, and ad-matching software could be used to pre-compute and pre-filter a set of ads for each content item or user. Standard targeting mechanisms such as targeting for age, gender, income level, geographic location, time of day, areas of interest (e.g., inferred from past behaviour) can be used. Alternatively, or in addition, ads may be targeted to individual content items using tagging, or a combination of content targeting and user targeting may be used.

Figure 11:
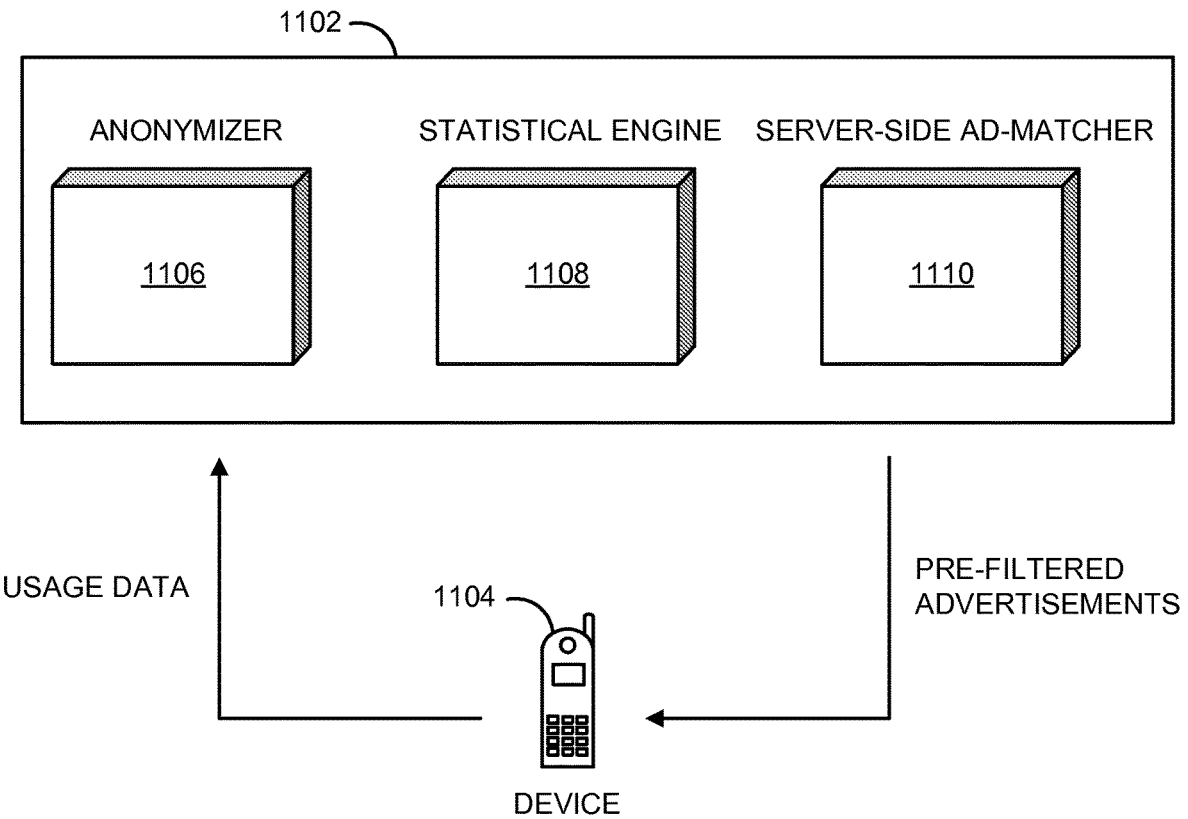
FIG. 11 illustrates the use of server-side ad matching to pre-filter advertisements for a device.

FIG. 11 illustrates the use of server-side ad matching to pre-filter advertisements for a device 1104, based at least partially on usage data supplied by the device 1104. As shown in FIG. 11, device 1104 provides usage data to server 1102 for use in pre-filtering ads. Server 1102 uses anonymizer 1106 to anonymize the usage data, then uses statistical engine 1108 to analyze the data. The output of statistical engine 1108 can be used by server 1102 to make a determination as to the type of advertisements that are most likely to be of interest to the user of device 1104. Server-side pre-filtering aids the client by pre-computing a set of relevant advertisements from which a much more relevant match may be performed using the local ad-matching techniques described elsewhere herein. It will be appreciated that FIG. 11 is provided for purposes of illustration, and that other arrangements could be used. For example, if server 1102 is not trusted by device 1104, usage data from the device may be anonymized before being provided to server 1102. In other embodiments, usage data is not provided to server 1102 at all, and server 1102 performs any pre-filtering based on whatever information it is able to glean about device 1104 or the user thereof from the context.

Taxonomy of Categories

In some embodiments, a pre-defined set of categories is used for purposes of classification of ads, content, and users. In some embodiments, the exact taxonomy that is used might be private to the respective parties that generate the controls—e.g. content providers would be responsible for defining the taxonomy for content, advertisers would be responsible for defining the taxonomy for advertisements, and the clearinghouse which creates objects that describe user attributes would be responsible for defining the taxonomy for users. The taxonomies would then be shared between these entities. In other embodiments, the taxonomies could be standardized (e.g. all content providers who participate in the system could share the same taxonomy) and the standard could be published for use by other participants in the system.

As a specific, illustrative example, the applicable categories for an entity could be specified as a comma-separated list of elements, where each element represents a hierarchical tag using the dot notation to indicate the hierarchy of the tag. Each category could also be associated with a weight for the category normalized to some range e.g. 0-100. With the inclusion of weights the set of tags could be represented in a string form using the ':' character to separate the leaf-level category from its weight. The wildcard character '*' could be a reserved character and used to match any category/subcategory.

Figure 12:
FIG. 12 shows an illustrative ad-tags taxonomy.

A fragment of an illustrative example of an ad tags taxonomy is shown in FIG. 12. For the taxonomy shown in FIG. 12, some examples of tags might include:

Food.Chinese.Szechuan
Food.Chinese
Art.Opera
Art

Examples of tags with the inclusion of weights are:

Food.Chinese.Szechuan: 10
Food.Chinese: 5
Art.Opera: 30
Art: 5

Example of tags with wildcards and weights are:

Food.Chinese: 5
Food.*: 3

Many platforms provide efficient implementations for string search and manipulation, which provides a reason for expressing this information as a string. For ease of matching, in a preferred embodiment, by convention, the more specific category occurs earlier in the list of tags than a corresponding less specific category. It will be appreciated that the opposite convention (or any other convention) could be used instead. The categories could be sorted in collation sequence to enable easy searching of the category/sub-category.

An alternate implementation could represent the set of tags as a ValueList (as described in the '693 application) containing a hierarchy of categories and sub-categories (including weights for the leaf level categories) in binary form. These tags could be part of the AdExternalZoneInfo structure described in more detail below.

Ad-Insertion Points

In some embodiments, the dynamic media zone (DMZ) technology described in the '543 application can be used to facilitate ad insertion. The DMZ technology provides support for the description of different types of zones in media presentations. A video presentation with interspersed video ad zones is an example of such a presentation.

AdExternalZoneInfo

As described in the '543 application, the DMZ technology allows a presentation to refer to external media via the ExternalZoneInfo construct. As shown below, the AdExternalZoneInfo builds on the ExternalZoneInfo in order to refer to either an external advertisement or an external Ad-Matching Control.

```
AdExternalZoneInfo extends ExternalZoneInfo : {
    tags: string
    externalAdURN: string
    externalAdMatchingControlURN: string
}
```

[INHERITED] splicePoint: reference index of a ZonePoint element of the points array where the zone media is to be spliced.

[INHERITED] id: identifier for the zone, an opaque identifier that the Local Ad-Matching will use for its own processing tags: a list of comma-separated tags for the ad-zone to splice in. The tags consist of the names specified in the taxonomy of ad-tags, using the dot notation for hierarchical tags and wildcards. (e.g. Food. Chinese, Food.Chineze.Szechuan, Art.Sculpture.Rococo, Art.* etc). These tags are used to short list ads from the ad list.

externalAdURN: a direct reference to the external advertisement.

externalAdMatchingControlURN: a URN that points to an external Ad-Matching control. The application looks up an external Ad-Matching control using this URN and passes it the result of executing the Ad-Controls in order to pick the right advertisement for the external zone. In one embodiment, either externalAdURN or externalAdMatchingControlURN will be present; an empty string means the field is not present.

AdInternalZoneInfo

AdInternalZoneInfo extends InternalZoneInfo as shown below:

```
AdInternalZoneInfo extends InternalZoneInfo : {
    tags: string
}
``` tags: same as described above

System Integrity

Figure 13:
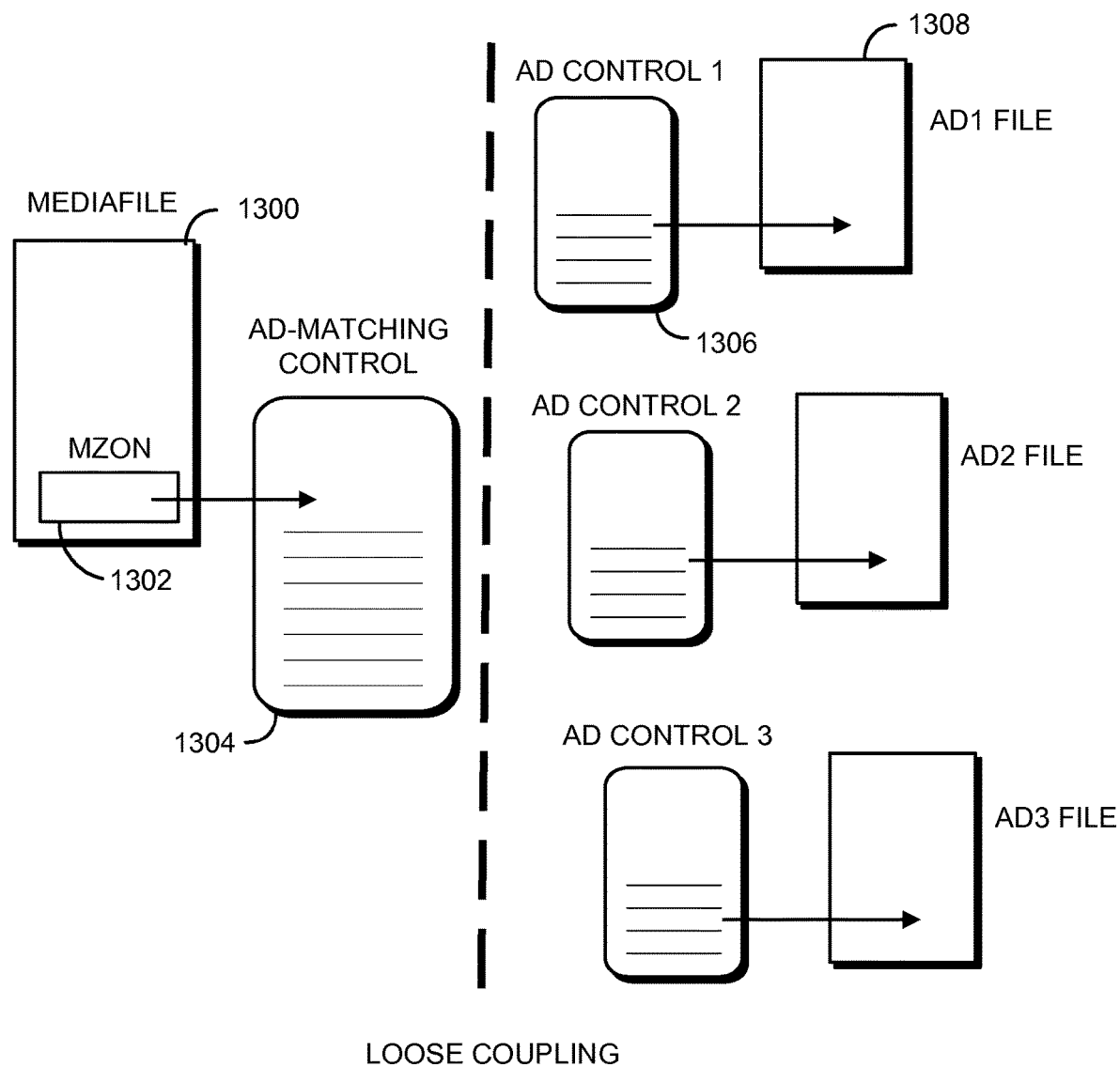
FIG. 13 shows an example of some of the governance associations in an exemplary embodiment.

This section describes some of the aspects of the DRM engine and DMZ security models which ensure the system's integrity. The main goal of the security framework is to ensure that the governance model remains intact. FIG. 13 shows an example of some of the governance associations in an exemplary embodiment. As shown in FIG. 13, these governance associations include the relatively tight relationship between a piece of media content 1300 and its associated zone map information 1302 and ad matching control information 1304. Similarly, an ad 1306 is relatively closely associated with its respective control 1308. In contrast, there is a relatively loose coupling between content 1300 and ads 1306, and their respective control information.

In one embodiment, some or all of the following requirements for security and integrity can be derived from the governance model of the system.

(1) Advertisements must be played when they are supposed to be played.

(2) Advertisements should not get skipped when they are dubbed "unskippable".

(3) An ad-matching control should be authentic, and should not be replaceable by an unauthentic (rogue) control program.

(4) Ad-controls should be authentic and not replaceable by unauthentic (rogue) control programs.

(5) The advertisement file associated with an ad-control should be bound tightly with the corresponding ad-control. It should not be feasible to replace the advertisement with another totally different advertisement from an unauthorized and possibly malicious entity (e.g. a rogue service or a hacker).

Zone Map Integrity

The integrity of a Zone Map (sometimes referred to herein and in the '543 application as an "mZon") ensures that advertisements will played when they are supposed to be played.

The AdExternalZoneInfo or AdInternalZoneInfo is part of the ZoneMap structure described in the '543 application. A digital signature on the ZoneMap protects the integrity of the entire structure (including any AdExternalZoneInfo/AdInternalZoneInfo elements).

The mZon atom itself could be stripped out or substituted into the media file. Depending upon the specific requirements for integrity protection, this could be achieved in one of the following ways:

(1) The entire media file (including mZon) could be encrypted and placed in a media container such as DCF and there could be a DRM License associated with the media file.

(2) Only the streams could be encrypted; the DRM License could have a secure reference to the mZon atom in this case. This method ensures that the presentation does not start before the overall integrity is verified.

(3) Make use of the integrity protection mechanism described in the '543 application. The DRM License is used to obtain the content key. The mZon signing key is derived from this key using a key-derivation algorithm that the application knows about. The content itself is typically encrypted and the application checks the integrity of the mZon as well. When the content starts playing, the DMZ obligation refers to the ids in the mZon. When the player detects that the media zones have been tampered with (e.g. if the mZon was stripped out or if it has been replaced by something else) the player is supposed to stop rendering. This does mean that some part of the content will not be played before the tampering is detected. In some embodiments, this may be deemed acceptable.

Encryption itself is somewhat orthogonal to the ad system. A threat analysis of the system could indicate whether encryption is required or not (e.g., encryption may not be needed if the content media and advertisements were delivered over a secure pipe directly to the device and there was no way for the user to tamper with the content media, advertisements, or the DRM objects. In this case integrity protection is used only to ensure the ad system plays what it is supposed to play, in the way it is supposed to play and does so under the governance of the DRM engine.

The DMZ technology described in the '543 application allows media zones to be made "unskippable". This method can be used to ensure that advertisements dubbed as "unskippable" will not be skipped.

Control Program Integrity

In a preferred embodiment, Ad-Matching Controls and Ad-Controls are implemented as self-protecting Controls in the manner described in the '693 application, and are issued by a trusted authority and are authentic and integrity protected. The digital signature on mZon ensures that the Ad-Matching Control will not be replaceable. The strong binding between Ad-Controls and the Ad-Files ensures that Ad-Controls will not be replaceable.

Binding Between mZon and Files

Content and Advertisement files can be tightly bound to the mZon via the mechanism for media zone integrity protection described in the '543 application. Note that this alone does not ensure tight binding as the mZon atom itself may be stripped out of or substituted with something else into the media/advertisement file. A secure reference from the corresponding DRM Control (typically Controller Signature would have a secure reference to the mZon) or encryption of the file (including mZon) may be needed to ensure tight binding between mZon and the media/advertisement files.

Aborting Media Rendering

As described in the '543 application, if the integrity of the media zone cannot be verified the application should stop rendering the entire presentation. The same principle can be used to ensure that tampered ads will not be played. If an advertisement file is tampered with then the application will be unable to render it using the content key it obtains from the Ad-Control, or if the signature verification of the Control (which includes a secure reference to the mZon) has failed. In this case the OnAccept callback for the Ad-Control should not be called and the playback of the Content should be aborted by the application.

Multiple Ad-Lists

Ad-List look-up

There are often multiple Ad-Lists within a system. Some examples for separate ad-lists could be lists of ads for 1) Commercial or Paying Ads, 2) 'House' or Non-Paying Ads (e.g., used as fallback ads to fill the ad-slots if there are no suitable commercial ads available). Each ad-list could be further organized into smaller sub-lists.

Categorizing the ads into separate ad-lists helps limit the search space for advertisements, which can be especially useful on devices that are limited in their processing power.

As described in the '543 application, the application can use the opaque id which is part of the Internal and External Zones. The application could use the id as the key to look-up the relevant ad-list from a table. The ad-list may be identified by a URN which could also be a URL if the advertisements are directly fetched/streamed from the location (e.g. from a location on the Internet). Sub-categories of lists could map to paths in the URL or to colonized parts of the URN. This would enable content matching to be performed on the server side.

Ads and Media may be streamed, with only the trusted DRM objects delivered to the client depending on the local storage constraints. These objects may be pre-parsed and pre-verified and cached in a secure storage or database locally in order to optimize the performance. The Id of the object could be used as a key to look-up the pre-parsed and pre-verified object in the database.

For example:

| Id | URN | description |
|---|---|---|
| 1234 | housead:customer-support | house ad list for customer online support |
| 3456 | housead:customer-support:productA | house ad list for customer online support for a particular product A |
| 4567 | commercial:soft_drinkB:super-bowl | Soft Drink B super-bowl ad-list |
| 456 | commercial:soft_drinkA | Soft Drink A ad-list |

AdlistMappingInfo

If the mapping is static it could be built in into the application itself and the id could remain an opaque identifier for DMZ. But if the mapping is more dynamic (e.g. the mapping varies by source of media content) it may be useful to have this mapping as part of the zone map.

```
AdlistMappingInfo {
    id : integer
    AdListURN: string
}
```

The ZoneMap would have an array of AdPlatformAdlist-MappingInfo elements that map the id to an ad-list URN/URL

```
AdPlatformZoneMap extends ZoneMap {
    AdListMap : array of AdPlatformAdListMappingInfo
}
```

Host Objects

One advantage of local ad matching is the ability to use local context to optimize the match. In one embodiment, the following host objects are made available to the instance of the DRM and/or ad matching engine running on the client. These host objects are present in addition to the standard host object environment for any DRM control.

Location: The Location host object provides the current location of the user (e.g., latitude, longitude, and altitude; city; state; etc.). In one embodiment, the values are expressed as strings, the host objects are live objects (i.e., they get updated as the user moves through a geographical region). For example, such a host object could be stored at "/AdPlatform/LocalContext/Location<-a (latitude,longitude,altitude) tuple", and the DRM engine could retrieve this object as needed. Alternatively, a host function could be exposed to return the location information.

The categories (e.g., preference classes or memberships) a user belongs to (and the relative weights for each category) can be very important local context information. The same ad matching control deployed on multiple devices which have different user profiles could result in a very different matched advertisement in the same overall situation. Such profile information could be stored at the following location: /AdPlatform/LocalContext/UserCategories/<Category>/<Sub-Category>/ . . . /weight. Where "weight" is the normalized relative weight for the category (e.g., a value 0-100).

In some cases this user-categorization may happen completely on the client and may not be shared in detail with the server for privacy reasons. In such cases, the local context information becomes more important for local ad matching. In one embodiment, a control program that owns the User-Categories container object has permissions to write to and update the user's categories.

In one embodiment, the User Categories are stored in the DRM engine's secure state database (e.g., a state database as described in the '693 application), and have the PUBLIC READ flag set for them to provide read only access to all other Control programs to this data. Alternatively, the user categories need not be stored in the state database, but could be completely computed by the application (if it knew how to compute these categories) and exposed as read-only host objects to the DRM controls.

Zone Info

The Zone Info is a parameter to Ad-Control execution and Ad-Matching Control execution. In one embodiment, this parameter exposes some of the data from the AdExternal-ZoneInfo to the controls. For example:

```
/DRMEngine/Action/Parameters/DestinationZone/ZoneInfo/id
/DRMEngine/Action/Parameters/DestinationZone/ZoneInfo/tags
/DRMEngine/Action/Parameters/SourceZone/ZoneInfo/id
/DRMEngine/Action/Parameters/SourceZone/ZoneInfo/tags
```

Where, DestinationZone refers to the media zone in the content. The id and tags of the destination zone are exposed as children of this container object. Similarly, Source Zone refers to the media zone in the advertisement itself. The id and tags of the source zone are exposed as children of this container object.

In one embodiment, for ad matching control execution, the result of the ad bids action is exposed to the control as a container host object. The following object paths could be used:

```
/DRMEngine/Action/Parameters/AdBids
/DRMEngine/Action/Parameters/Ad1 [OPTIONAL]
/DRMEngine/Action/Parameters/Ad2 [OPTIONAL]
```

In one embodiment, AdBids is a container and is typically accessed using the special child names '@0', '@1', '@2' etc which are the elements of the 'AdBids' array of bids. Each bid could have any arbitrary parameters to any arbitrary depth as child host objects. In this embodiment, the only requirement would be that the corresponding Ad-Matching control needs to understand these parameters. Each Ad-Control upon evaluation returns an extended status block (ESB) that is exposed as the corresponding host object ('@n' child of AdBids container) to the Ad-Matching control.

In one embodiment, the Ad1 and Ad2 parameters are optional parameters that are used to pass the indexes of two ads to be considered from AdBids to which the comparison is to be limited. When these two optional parameters are passed to the Ad-Matching control's CompareBid method it will return a returnCode in the ESB which determines the relative ordering of the two Ads. The Ad-Matching control's CompareBid method may then be used as a comparator function to sort all the ads into an ad-queue where ads are ordered by their priority.

Example:

```
/DRMEngine/Action/Parameters/Ad1 –> with value '@2'
/DRMEngine/Action/Parameters/Ad2 –> with value '@5'
```

The above parameter values are passed to ask the CompareBid method to compare the following two bids:

```
/DRMEngine/Action/Parameters/AdBids/@2
/DRMEngine/Action/Parameters/AdBids/@5
```

In one embodiment, the state database described in the '693 application will be available for these ad controls to enable them to persistently store some state information.

Examples of persistent state information that an ad-control may require to be stored may include the number of times it has been played when it was the winning bid, the last bid price, and whether the last bid was successful or not. This information (e.g., number of impressions, last bid status, etc.) may help the control decide the value of the next bid (e.g., the control may want to bid more/less if the previous bid was or was not successful, or the control may want to cap the total number of impressions, etc.)

Ad-Controls

In one embodiment, a new "Action" of the type described in the '693 application is introduced, called a 'Bid', and is used for local ad-matching. A Control object that bids for an ad-slot does so via this Action. In one embodiment, the following routines can be defined for the Bid action:

Control.Actions.Bid.Init

This routine will have the same semantics as Control.Actions.<Action>.Init, as described in the '693 application.

Control.Actions.Bid.Check

This routine will have the same semantics as Control.Actions.<Action>.Check as described in the '693 application.

Control.Actions.Bid.Perform

This routine will have the same semantics as Control.Actions.<Action>.Perform as described in the '693 application. If the routine is successful the ResultCode is 0 and the next item on the stack is a pointer to the ESB described below.

Control.Actions.Bid.Describe

This routine will have the same semantics as Control.Actions.<Action>.Describe, as described in the '693 application.

Control.Actions.Bid.Release

This routine will have the same semantics as Control.Actions.<Action>.Release, as described in the '693 application.

Bid Result

In a preferred embodiment, the ESB structure that is returned by the Bid action is as described in the '693 application. As an example, a "declarative" ad-control might declare its affiliation using the taxonomy, and might bid for the ad-slot by returning its Bid in the ESB for the 'Bid' action call. It is up to the Ad-Matching Control to properly evaluate the bids and to pay attention to the parameters declared by the Ad-Control. The Ad-Control and the Ad-Matching Control understand the common taxonomy used for advertisement parameters.

```
valueList = {
    parameter = {
        name = "Food";
        valueList = {
            parameter = {
                name = "Chinese"; // how relevant the ad is for
the category "Food/Chinese"
                long food_chinese_relevance = 90;
            }
            parameter = {
                name = "Asian";
                long food_asian_relevance = 70;
            }
            parameter = {
                name = "FineDining";
                long food_finedining_relevance = 5;
            }
        }
    }
    parameter = {
        name = "TOD";
        valueList = {
            parameter = {
                name = "Breakfast";
                long breakfast_relevance = 10; // how relevant it
is to show the ad at Breakfast time
            }
            parameter = {
                name = "Dinner";
                long dinner_relevance =50; // how relevant it is
to show ad at dinner time
            }
            parameter = {
                name = "Lunch"; // how relevant it is to show ad
at lunch time
                long lunch_relevance = 90;
            }
        }
    }
    parameter = {
        name = "Price";
        long price = 23;
    }
    parameter = {
        name = "Callbacks";
        valueList = {
            ...
        }
    }
    parameter = {
        name = "Obligations";
        valueList = {
            ...
        }
    }
}
```

The table below shows an example of an Ad-Control written in a procedural style. The control logic encapsulates the rules used to evaluate the bid price and the control then pokes these values into the ESB that it returns when the Ad-Control's 'Bid' method is invoked:

```
valueList = {
    parameter = {
        name = "BiddingInformation";
        valueList = {
            parameter = {
                name = "Price";
                long price =0;    // TOBEPOKED
            }
            parameter = {
                name = "Id";
                string adId =
"............................................................
........"; // TOBEPOKED
            }
        }
    }
}
```

```
        parameter = {
            name = "Callbacks";
            valueList = {
                ...
            }
        }
        parameter = {
            name = "Obligations";
            valueList = {
                ...
            }
        }
}
```

Ad-Control Callbacks

OnAccept Callback

In one embodiment, the Bid Result ESB will contain an "OnAccept" Callback (e.g., as described in the '693 application) in order to require the application to call back the AdControl if its bid has been accepted by the Ad-Matching Control. When the Ad-Control receives this callback it should store information that it needs to use later on in the state database.

OnCallToAction Callback

In one embodiment, the Bid Result ESB contains an "OnCallToAction" Callback in order to require the application to call back the Ad-Control when it performs the task associated with a call-to-action advertisement. In one embodiment, when the Ad-Control receives this callback, it should meter the corresponding event.

Ad-Control Obligations

In some embodiments the Bid Result ESB could contain a CRITICAL Obligation if the advertisement corresponding to the Ad-Control was a Call-to-Action advertisement. The following list of obligation parameters is defined for this purpose. Additional parameters could exist in the obligation, and the agreement of these custom parameters would be private to the application and the ad-control provider. The name of the obligation could be, e.g.: urn: . . . :ad:call-to-action HyperlinkReference: a ValueList that specifies a hyperlink that the host application needs to open in a browser.

SMSReference: a parameter that indicates that the host needs to send an SMS message to a specified SMS code.

PhoneNumberReference: a parameter that indicates that the host needs to call a specified phone number.

Ad-Matching Controls

In one embodiment, a new action—'CompareBid'—is introduced for Local Ad-Matching. In one embodiment, a Control object that supports this action evaluates bids and does one of the two things:

Selects the advertisement with the winning bid. The optional Ad1 and Ad2 parameters should not be passed in this case; or Compares two bids (when the optional Ad1 and Ad2 parameters are passed) and establishes their relative priority In the first case the Ad-Matching Control evaluates all Ad-Bids and selects the best-match. All the logic resides in the virtual machine byte code itself.

In the second case the virtual machine code acts as a comparator function which the application calls repeatedly to sort the Ad-List into an Ad-Queue based on relative priorities between the individual advertisements. This method is provided to enable the higher application layer to implement algorithm(s) that are appropriate for the problem and the platform (e.g., heap sort, merge sort etc.). Most of the sort logic in this case is implemented in the application's implementation language which is more easily optimized for the platform. The virtual machine instruction set described in the '693 application is relatively simple, hence this division of responsibilities may represent the most efficient solution.

Control.Actions.CompareBid.Init

This routine will have the same semantics as Control.Actions.<Action>.Init as described in the '693 application.

Control.Actions.CompareBid.Check

This routine will have the same semantics as Control.Actions.<Action>.Check as described in the '693 application.

Control.Actions.CompareBid.Perform

This routine will have the same semantics as Control.Actions.<Action>.Perform as described in the '693 application. If the routine is successful the ResultCode is 0 and the next item on the stack is a pointer to the ESB described below.

Control.Actions.CompareBid.Describe

This routine will have the same semantics as Control.Actions.<Action>.Describe as described in the '693 application.

Control.Actions.CompareBid.Release

This routine will have the same semantics as Control.Actions.<Action>.Release as described in the '693 application.

CompareBid Result

The ESB structure is described in as described in the '693 application.

In one example, the CompareBid Action of an Ad-Matching control program returns an ESB with the following structure (reflecting the best pick):

```
extendedStatusBlock EsbBidResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "WinningBid";
            parameter = {
                name = "AdIndex";
                long adIndex;        // index of ad in the shortlisted ad-list
            }
        }
    }
}
```

As another example, the CompareBid Action of an Ad-Matching control program might return an ESB with the following structure (reflecting the result of the comparison between Ad1 and Ad2):

```
extendedStatusBlock EsbBidResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "ReturnCode";
```

-continued

```
            long returnCode;
        }
    }
}
```

In one embodiment, the possible values of return code could be as follows:

| Symbol | Value | Description |
|---|---|---|
| RETCODE_ABORT | −4 | App should abort the comparison/sorting due to unrecoverable error |
| RETCODE_IGNORE_AD2 | −3 | App should ignore Ad2 and proceed with the rest of the sorting operation |
| RETCODE_AD2_WINS | −2 | Ad2 wins; no need to do any further comparisons |
| RETCODE_AD1_LT_AD2 | −1 | Ad1 < Ad2 in order of priority |
| RETCODE_AD1_EQ_AD2 | 0 | Ad1 == Ad2 in order of priority |
| RETCODE_AD1_GT_AD2 | 1 | Ad1 > Ad2 in order of priority |
| RETCODE_AD1_WINS | 2 | Ad1 wins; no need to do any further comparisons |

Usage Data Filtering

Privacy Considerations

Local laws often restrict the type of information that can be collected for users through the specification of permissible privacy practices and laws. In some embodiments, devices may talk to trusted services at the backend. Extensive data may be collected and sent to the trusted server. The information can be protected on the service end from disclosure as required by local regulations.

However in some cases there may be restrictions on what data may be sent up to the server, even though the backend service itself is trusted. In this situation, the data that is collected can be filtered and/or anonymized in some way before sending it up to the server.

As an example, an application may anonymize the data by padding some random data (e.g., constant random data that gets stored by the application) to the personally identifiable information and taking a one-way hash of the two. The specific techniques to be used by the application to anonymize the data are a responsibility of the application, and it will be appreciated that any suitable techniques can be used.

There may be certain data elements that are collected on the client for local use, but these may need to be filtered out before reporting to the server. The policy as to what to filter out can be completely defined by the application. However it may be more flexible if this policy was implemented as a DRM Control as it may allow the application to achieve some or all of the following:

Use a different policy for different locales based on local laws without affecting the application Update the policy independently without the need for a software update for the application when local laws are changed after the service is already operational The following section briefly describes how DRM engine technology such as that described in the '693 application may be used for Usage Data Filtering.

Filter Function

In one embodiment, a new Action—'FilterUsageData'—is introduced which is supported by a DRM Control that implements a policy for the purpose of filtering usage data. Parameters to the FilterUsageData action could include:

```
/DRMEngine/Action/Parameters/DataName <– string parameter
/DRMEngine/Action/Parameters/DataNamespace <– string parameter
/DRMEngine/Action/Parameters/Data <– Value Block
/DRMEngine/Action/Parameters/ContextId <– string parameter
/DRMEngine/Action/Parameters/TransformationMethods <– available
transformation methods supported by the application
```

Where:

"DataName" is the name of the data item that needs to be filtered.

"DataNameSpace" is the namespace in which the name of the data item is defined.

"Data" is the actual value of the data item.

"ContextId" is an opaque context id; the meaning of this context id can be as privately agreed between the application and the privacy policy provider.

"TransformationMethods" is a data-structure that is used to convey the possible data transformation methods supported by the application. In one embodiment, the agreement of the items, data types, and layout of this data-structure is private to the application and the privacy policy provider.

Control.Actions.FilterUsageData.Init

In one embodiment, this routine has the same semantics as Control.Actions.<Action>.Init as described in the '693 application.

Control.Actions.FilterUsageData.Check

This routine will have the same semantics as Control.Actions.<Action>.Check as described in the '693 application.

Control. Actions.FilterUsageData.Perform

This routine will have the same semantics as Control.Actions.<Action>.Perform as described in the '693 application. If the routine is successful the ResultCode is 0 and the next item on the stack is a pointer to an ESB.

Control.Actions.FilterUsageData.Describe

This routine will have the same semantics as Control.Actions.<Action>.Describe in the '693 application.

Control.Actions.FilterUsageData.Release

This routine will have the same semantics as Control.Actions.<Action>.Release as described in the '693 application.

FilterUsageData Result

This method returns an ESB. In one embodiment, the ESB structure is as described in the '693 application. An example is shown below:

```
extendedStatusBlock EsbFilterUsageDataResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "FilterResult";
            valueList = {
                parameter = {
                    name = "ResultCode";
                    long resultcode; }
                [OPTIONAL] parameter = {
                    name = "OutputData";
                    ValueBlock outputData;
                }
            }
        }
    }
}
```

ResultCodes

The following table gives the potential values of the ResultCode parameter in one example embodiment:

| Result_Code | Value | Description |
|---|---|---|
| DO_NOT_FILTER | 0 | Application does not need to filter this data out as per the policy |
| SUPPRESS | 1 | Application needs to suppress this data in the output completely |
| ANONYMIZE | 2 | Application needs to anonymize this data and then send it to the server |
| USE_TRANSFORMATION | 3 | A transformation method is signalled in the ValueBlock (the agreement of the transformation methods is private to the application and the privacy policy provider) |
| CUSTOM_TRANSFORMATION | 4 | The virtual machine program has done a custom transformation and included the output buffer in the value block. (Useful in case the application does not have an acceptable transformation method to use) |

OutputData

This is a Value block that contains the following data:

(1) A field to signal the selected transformation method to the application; OR (2) The transformed data itself (e.g., if the filter control did the transformation itself to enforce a policy when there was no application-provided transformation available, and indicated this by setting the return code to RESULT_CODE_CUSTOM_TRANSFORMATION)

Usage Data Reporting

Dynamic Trust Relationships

In one embodiment, the client application allows a user to dynamically manage trust relationships with content and ad providers. For example, a user may decide to trust a content provider, and the trust anchors of the content provider would then be stored at the client in a special location.

In one embodiment, the level of trust might still be less than the trust that is placed on other trust anchors, and the application may thus only perform a limited set of things with these "second class" or "limited use" trust anchors.

In some embodiments, a common trust hierarchy is used. This can be advantageous for a number of reasons, including:

(1) If a common trust hierarchy is used then Controls that run are not generated by unknown and potentially malicious parties, but are generated by parties that have some type of trust relationship with the trust hierarchy. This provides some protection against rogue controls that might try to exploit problems in the DRM engine implementation, if any are found to exist once the solution is deployed in the field.

(2) The trust relationship of the clearinghouses with the central trust authority means that unknown and potentially malicious clearinghouses cannot become "free-riders".

Metering Obligation

The '881 application describes a metering obligations framework for metering higher level (e.g., application level) events (e.g. Survey event, Voting event, User skip event, etc.). These obligations can be extended to include the URL of the clearinghouse to which the data is to be sent. For example, the ValueList would contain one more parameter—the string parameter "ClearinghouseURL" and the value would be a string containing the URL for the Clearinghouse.

P2P Content and Ad Sharing

Due to the extremely large volume of the content that is available over the Internet and other distribution mediums, it is often difficult to find content that is relevant. Media syndication via RSS provides a partial solution to the problem. Users can subscribe to content feeds that may be to their liking and effectively sign up to receive that "channel".

Another mechanism for content distribution is via peer-to-peer (P2P) sharing. P2P sharing involves any two arbitrary devices that "bond" or "connect" with each other to share content. While devices could expose RSS feeds of their content to each other, users still need to select the feeds and/or individual content items. Due to the small form factor of mobile devices this may not be an optimal user experience.

There are some interesting possibilities during the P2P interaction:

(a) The devices could automatically exchange content that would be likely to be relevant to the respective owners of the devices.

(b) The devices could automatically exchange advertisements that are more likely to be matched by a local Ad-Control on the recipient device.

These types of interactions would provide a means to seamlessly disseminate Content and Advertisements to people who are likely to find them to be relevant and would provide a better user experience.

However, under normal circumstances, random peers do not trust each other and it is not possible for peers to probe each other directly. The DRM engine technology used in preferred embodiments makes it possible for certified and integrity protected DRM Agents (e.g., of the type described in the '693 application) to be run on remote peers in order to obtain non personally-identifiable, contextual, user information, device information, information about the past behavior of the user, etc.

With the help of this information a sending peer can decide what Content and/or advertisements would be likely to be relevant to the receiving peer and automatically push these over to the recipient.

Remote Probing Agent

The sending peer will run the remote probing agent on the remote (receiving) peer in order to probe its environment for information. The type of information that it may probe could, for example, include:

(a) user profile information (b) device context information (c) behavioural information/transactional data An agent can probe the above information, filter it as appropriate using, e.g., the filtering mechanism described herein, and return the information in an ESB. This ESB in effect contains the filtered local context for the remote peer. The sending peer uses this information along with Ad- Controls and/or Ad-Matching Controls and determines the Content items and Advertisements that may be relevant to the recipient.

In some embodiments, the following routines could be defined:

Control.Agents.RemoteProbe.Init

This routine will have the same semantics as Control.Agents.<Agent>.Init as described in the '693 application.

Control.Agents.RemoteProbe.Run

This routine will have the same semantics as Control.Agents.<Agent>.Run as described in the '693 application.

Control.Agents.RemoteProbe.Describe

This routine will have the same semantics as Control.Agents.<Agent>.Describe as described in the '693 application.

Control.Agents.RemoteProbe.Release

This routine will have the same semantics as Control.Agents.<Agent>.Release as described in the '693 application.

Example Use Cases

The following discussion explains how certain illustrative embodiments make use of the DRM engine constructs enumerated above and described in the '693 application and/or the '551 application.

One relatively simple use-case deals with local ad-matching involving a set of three advertisements. Server-side filtering is assumed to have happened and three advertisements are in the ad-list. They are:

(1) Advertisement for a high-end sit-down restaurant (Ad1)

(2) Advertisement for a Chinese take-out fast-food restaurant (Ad2)

(3) Advertisement for a mobile handset (Ad3)

Figure 14:
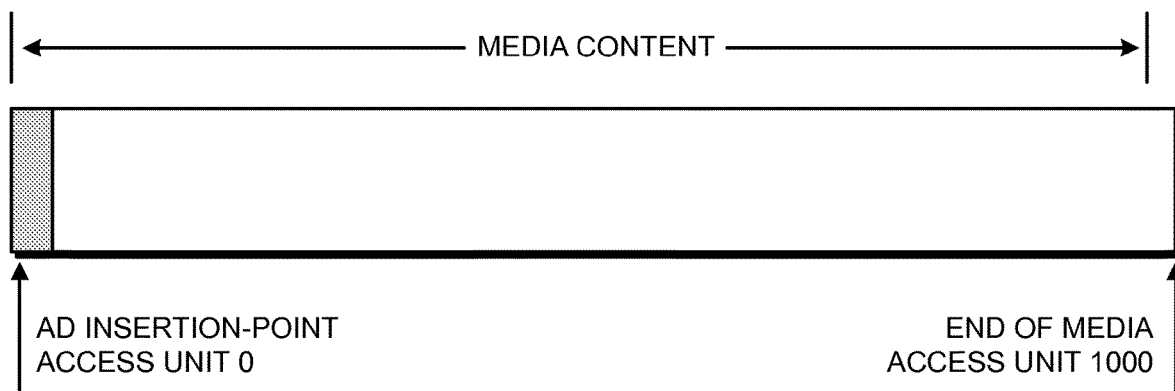
FIG. 14 shows an example of a piece of content divided into zones.

As shown in FIG. 14, in this example the content is a soap opera episode that needs to show an advertisement before playing the content at Access Unit 0.

Consider the following snippet of a taxonomy of content categories:

```
Entertainment
    SoapOpera
        Name
            ...
        Rating
            ...
        Duration
            ...
        Season
            ...
        Synopsis
            ...
    ...
```

The tags for the content could be as follows:

```
Entertainment
    SoapOpera
        Name
            Murray
        Rating
            General Audiences
        Duration
            30 minutes
        Season
            3
        Synopsis
            Murray visits his ...
```

The zone map corresponding to this content could be as follows:

```
ZoneMap: {
    points: [AU-0, AU-1, AU-1000]
    internalZones: [
        {
            //  internal zones here
            //  so MediaZones obligations can be attached
            //  to them.
            //      MAGNETIC zone from AU-0 to AU-1000
            {
                fromPoint:  0,
                toPoint:    2,
                id:         454545454,
                attributes: 0,
                mediaDigestAlgorithm: 1,
                mediaDigest: [...],
                meteringTag: XYZ
            },
            //  STICKY and NOSKIP zone from AU-0 to AU-1
            {
                fromPoint:  0,
                toPoint:    1,
                id:         454545454,
                attributes: 0,
                mediaDigestAlgorithm: 1,
                mediaDigest: [...],
                meteringTag: XYZ
            },
        }
    ]
```

```
        externalZones: [
            {
                splicePoint: 0                      // insert at AU at index 0
                id:         217617                  // some opaque id
                tags:       Entertainment.SoapOpera.Name.Murray,
                            Entertainment.SoapOpera.Rating.GA,
                            Entertainment.SoapOpera.Duration.30min,
                            Entertainment.SoapOpera.Season.3,
                            Entertainment.SoapOpera.Synopsis.Murray visits \. Then
he encounters ...
                externalAdURN: '' // empty string
                externalAdMatchingControlURN: "urn:acme:control:003"
            }
        ]
        signature: {
          signatureAlgorithm=0,
          signatureValue= [...]
        }
}
```

There is a MediaZones obligation that specifies that the entire presentation is MAGNETIC, and a small zone surrounding the insertion point that is STICKY and NOSKIP. In addition the external zone is STICKY and NOSKIP to ensure that the external advertisement would not be skipped or fast forwarded (see FIG. 15)

Consider the following snippet of the taxonomy of categories for advertisements:

```
                    Restaurants
                        ...
                    Food
                        Chinese
                            Takeout
                            ...
                        FineDining
                            French
                            Cantonese
                            Mediterranean
                            Japanese
                            ...
                    Electronics
                        Devices
                            MobilePhones
                            ...
                    ...
```

For purposes of this example, assume the max Access Unit for the advertisement is 300, 400 and 500 for the above three advertisements The zone map for Ad1 is:

```
ZoneMap: {
        points: [AU-0, AU-300]
        internalZones: [
            {
                fromPoint=0,
                toPoint=1,
                mediaDigestAlgorithm=1,
                mediaDigest= [...] ,
                id=100,
                attributes=0
                tags: Food.FineDining.Cantonese,Restaurant.*
            }
        ]
        externalZones: [ ]
        signature: {
          signatureAlgorithm=0,
          signatureValue= [...]
        }
}
```

The zone map for Ad2 is:

```
ZoneMap: {
        points: [AU-0, AU-400]
        internalZones: [
            {
                fromPoint=0,
                toPoint=1,
                mediaDigestAlgorithm=1,
                mediaDigest=[...],
                id=100,
                attributes=0
                tags: Food.Chinese.Takeout,Restaurant.*
            }
        ]
        externalZones: [ ]
        signature: {
          signatureAlgorithm=0,
          signatureValue=[...]
        }
}
```

The zone map for Ad3 is:

```
ZoneMap: {
        points: [AU-0, AU-500]
        internalZones: [
            {
                fromPoint=0,
                toPoint=1,
                mediaDigestAlgorithm=1,
                mediaDigest=[...] ,
                id=100,
                attributes=0
                tags: Electronics.Devices.MobilePhones
            }
        ]
        externalzones: [ ]
        signature: {
          signatureAlgorithm=0,
          signatureValue=[...]
        }
}
```

For purposes of this example, assume that the ad matching control (having Id="urn:acme:control:003") includes the following rules:

(a) If the time is between 11:00 am and 2:00 pm OR 6:00 pm to 8:00 pm, use food related ads only.

(b) For all other times use all ads that are available.

(c) Within the ads that are available, check the bid price and select the winner (e.g., the winner could be the highest bid, or the highest bid given a relative priority, depending on how the control is written).

It will be appreciated that in some embodiments, the ad matching control may itself include one or more rules that dictate the type of content with which it can be rendered, and/or the amount it is willing to bid, given a specific type of content.

For purposes of this example, assume that the ad controls include the following rules:

Ad1: Bid a price of 10 cents at dinner time (6:00 to 8:00 pm), otherwise bid 5 cents, cap at 10,000 impressions.

Ad2: Bid a price of 6 cents at lunch time (11:00 to 2:00 pm), otherwise bid 3 cents, cap at 20,000 impressions.

Ad3: Bid a price of 2 cents throughout the day except when near an electronics store, then the bid is 9 cents. Capped at 5000 impressions.

Some of the results in this example are summarized below:

Near an electronics store when the time is not lunch time or dinner time the mobile phone ad wins.

At dinner time the fine-dining Cantonese restaurant ad wins.

At lunch time the Chinese take-out restaurant ad wins.

As the impressions get capped, the ads get removed from the list that is in contention for the ad-slot.

Some examples of the data structures that might be returned by the ad matching control in various permutations of the above scenario are illustrated below.

Ad-Matching Control Result (Best Pick)
Case: Dinner time; not located near electronics store
Result: Ad1 is chosen

```
extendedStatusBlock EsbBidResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "WinningBid";
            valueList = {
                parameter = {
                    name = "Price";
                    long chosenPrice = 10; // Price of the winning bid
                }
                parameter = {
                    name = "Id";
                    string chosenId = "Ad1";   // logical ID of ad-control for the chosen ad
                }
                parameter = {
                    name = "AdIndex";
                    long adIndex = 0; // index of ad in the shortlisted ad-list
                }
            }
        }
    }
}
```

Ad-Matching Control Result (Comparator)
Case: Dinner time; not located near electronics store; comparing Ad1 and Ad2
Result: Ad1>Ad2

```
extendedStatusBlock EsbBidResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "ReturnCode";
            long returnCode = RETCODE_AD1_GT_AD2;
        }
    }
}
```

Figure 15:
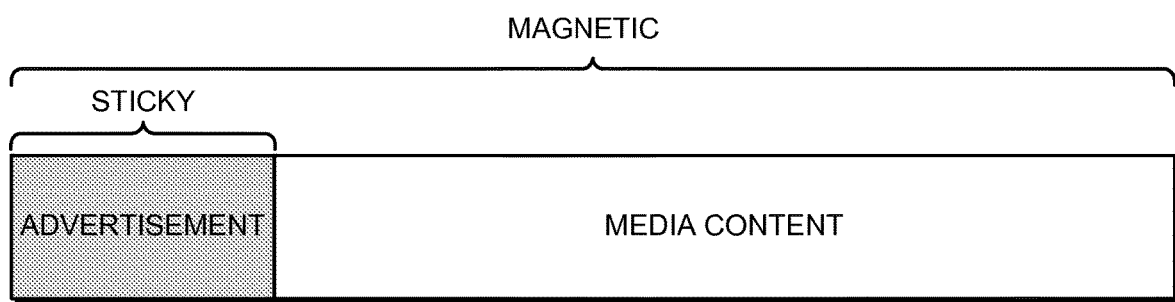
FIG. 15 shows another example of a piece of content divided into zones.

As shown in FIG. 15, the selected advertisement would play from beginning to end before the media content. Users would not be allowed to skip inside the ad or to skip over the ad.

Obligations for Call-for-Action Advertisement

In this example, say that the mobile phone ad was a call-for-action advertisement. In this case the Ad-Control would have (i) metering obligation, (ii) a callback that asks the application to call the engine when a click occurred, and, as a response to this click, the application receives a call-to-action obligation. This tells the application what do (e.g. make a phone call to a direct marketing service).

In one embodiment, after an Ad successfully bids and plays, the OnAccept Callback gets called and each ad keeps track of the number of impressions that have been consumed.

In some embodiments, all controls are checked for integrity. For example, a control can be deemed authentic if there is a PKI signature on the controller and a corresponding cert-chain can be verified to extend to one or more relevant trust anchors. In one embodiment, zone map integrity is checked for both the content and the advertisement before playback begins.

Competitive Bidding

The DRM engine framework enables actions in a control program to be called repeatedly. This capability allows competitive bidding between advertisements. In the case of competitive bidding after each Ad-Control bids, the bidding process is repeated (e.g., each Ad-Control can see the other bids via the AdBids container which can be exposed to Ad-Controls as a host object in the same way as they are exposed to Ad-Matching Controls). An Ad-Control may be able to revise its own bid competitively upwards or downwards in subsequent rounds of bidding. The entire process may be repeated several times as may be required by the rules of the bidding process to get the final bids from the Ad-Controls which would then be evaluated by the Ad-Matching control.

Usage Data Filtering and Reporting

Client Usage Data

The following is an example of the type of usage information that a client may have collected:

| Data Name | Data Type | Value |
| --- | --- | --- |
| personality-id | String | "urn: . . . :perso:0001" |
| event-id | string | "PLAY" |
| timestamp | String | Fri Jan 30, 2009 12:01:03 |
| content-name | String | Murray |
| genre-tags | String | Entertainment.SoapOpera |
| content-tags | String | Entertainment.SoapOpera.Name.Murray |
| genre-id | Long | 1001 |

Privacy Policy

For this example, assume that there is a privacy policy that says the following:

(a) Suppress DRMEngine-personality-id.

(b) Pass through event-id, timestamp, and genre-tags.

(c) Anonymize content-name and also content-tags, since they identify the content too closely.

(d) This particular content needs to report genre-id under bucket 1001 to 1003 due to a change that happened on the server side.

(d)(1) Case 1: The Application is an updated version and knows how to do this.

(d)(2) Case 2: The Application is an older version and is not aware of any transformation method for this change.

Filtering in Action

The following discussion shows the parameters to the 'FilterUsageData' action in the context of the above example, and the results returned by this action.

Item Passthrough

As an example the Action parameters could be as follows:

```
/DRMEngine/Action/Parameters/DataName = "event-id"
/DRMEngine/Action/Parameters/DataNamespace = "com:acme:1"
/DRMEngine/Action/Parameters/ContextId = 23434
/DRMEngine/Action/Parameters/TransformationMethods {...}
```

The result would be as follows (e.g., because of the privacy policy, which is encapsulated in the Control program):

```
extendedStatusBlock EsbFilterUsageDataResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "FilterResult";
            valueList = {
                parameter = {
                    name = "ResultCode";
                    long resultCode =
                        RESULT_CODE_DO_NOT_FILTER;
                }
            }
        }
    }
}
```

Item Suppresion

As an example the DRMEngine Action parameters could be as follows:

```
/DRMEngine/Action/Parameters/DataName =
    "DRMEngine-personality-id"
/DRMEngine/Action/Parameters/DataNamespace = "com:acme:1"
/DRMEngine/Action/Parameters/ContextId = 23434
/DRMEngine/Action/Parameters/TransformationMethods {...}
```

The result would be as follows:

```
extendedStatusBlock EsbFilterUsageDataResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "FilterResult";
            valueList = {
                parameter = {
                    name = "ResultCode";
                    long resultCode =
                        RESULT_CODE_SUPPRESS;
                }
            }
        }
    }
}
```

Item Anonymization

As an example, the Action parameters could be as follows:

```
/DRMEngine/Action/Parameters/DataName = "content-name"
/DRMEngine/Action/Parameters/DataNamespace = "com:acme:1"
/DRMEngine/Action/Parameters/ContextId = 23434
/DRMEngine/Action/Parameters/TransformationMethods {...}
```

The result would be as follows:

```
extendedStatusBlock EsbFilterUsageDataResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "FilterResult";
            valueList = {
                parameter = {
                    name = "ResultCode";
                    long resultCode =
                        RESULT_CODE_ANONYMIZE;
                }
            }
        }
    }
}
```

Data Transformation

Case 1: Updated application knows how to transform data for genre-id:

```
/DRMEngine/Action/Parameters/DataName = "genre-id"
/DRMEngine/Action/Parameters/DataNamespace = "com:acme:1"
/DRMEngine/Action/Parameters/ContextId = 23434
/DRMEngine/Action/Parameters/TransformationMethods
    {GENRE_TRANFORM_1, ...}
```

The result would be as follows:

```
extendedStatusBlock EsbFilterUsageDataResult =
esb{
    globalFlags = 0;
    esbCategory = ACTION_GRANTED;
    esbSubCategory = 0;
    localFlags = 0;
    cacheDuration = {SEC, 0};
    valueList = {
```

```
       parameter = {
           name = "FilterResult";
           valueList = {
               parameter = {
                   name = "ResultCode";
                   long resultCode =
RESULT_CODE_USE_TRANSFORMATION;
               }
               parameter = {
                   name = "OutputData";
                   parameter = {
                       name = "TransformMethod";
                       long tm = GENRE_TRANSFORM_1;
                   }
               }
           }
       }
   }
}
```

Custom Data Transformation

Case 2: Updated application does not know how to transform data for genre-id. The application could call the FilterUsageData for the data-type and will discover that there is no available transformation. In this case it will have to transform each individual data item as follows:

```
/DRMEngine/Action/Parameters/DataName = "genre-id"
/DRMEngine/Action/Parameters/DataNamespace = "com:acme:1"
/DRMEngine/Action/Parameters/Data = 1001
/DRMEngine/Action/Parameters/ContextId = 23434
/DRMEngine/Action/Parameters/TransformationMethods
{GENRE_TRANFORM_1, ...}
```

The result would be as follows because of the privacy policy (which is encapsulated in the Control program):

```
extendedStatusBlock EsbFilterUsageDataResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "FilterResult";
            valueList = {
                parameter = {
                    name = "ResultCode";
                    long resultCode =
RESULT_CODE_CUSTOM_TRANSFORMATION;
                }
                parameter = {
                    name = "OutputData";
                    parameter = {
                        name = "Data";
                        long data = 1003;
                    }
                }
            }
        }
    }
}
```

Reporting to Clearinghouse

As another example, assume a metering obligation included the following clearinghouse URL: http://www.ac-me.com/servires/ad/usage-data-collection The collected usage-data after filtering as described above would be submitted to the clearinghouse URL using a suitable format of the payload and the appropriate network protocol.

P2P Content and Ad-Sharing

User Profile (Remote Peer)

Assume a remote peer has the following user-profile information:

```
/AdPlatform/LocalContext/UserCategories/Movies/SciFi/10
/AdPlatform/LocalContext/UserCategories/Movies/HistoricalFiction/20
/AdPlatform/LocalContext/UserCategories/Movies/Political/XYZ/50
/AdPlatform/LocalContext/UserCategories/Movies/FilmNoir/80
```

A RemoteProbe Agent can be run on the remote peer on behalf of the sending peer. It will probe the host environment and make a filtered copy of the environment and retrieve this information in the result. In this example, assume that the filtering rules say that the user's political affiliations should not be disclosed to anyone. In one embodiment, the result code looks like the one below:

```
extendedStatusBlock EsbRemoteProbeResult =
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "Movies";
            parameter = {
                name = "SciFi";
                parameter = {
                    name = "weight";
                    long weight = 10;
                }
            }
            name = "Movies";
            parameter = {
                name = "HistoricalFiction";
                parameter = {
                    name = "weight";
                    long weight = 20;
                }
            }
            name = "Movies";
            parameter = {
                name = "FilmNoir";
                parameter = {
                    name = "weight";
                    long weight = 80;
                }
            }
        }
    }
}
```

Remote User Profile (Obtained by Sending Peer)

The sending peer has received the following user-profile information for the remote peer:

```
/AdPlatform/LocalContext/UserCategories/Movies/SciFi/10
/AdPlatform/LocalContext/UserCategories/Movies/HistoricalFiction/20
/AdPlatform/LocalContext/UserCategories/Movies/FilmNoir/80
```

At this point a simulation environment for the remote peer can be created using the information obtained from the remote peer, and the ad controls may be evaluated one by one. Their results may be cached.

The next step is to evaluate the ad matching controls for the content. If the content has a matching ad in the user's environment, the content and the advertisement will be added to the shortlisted content items and advertisements.

After evaluating all of the ad matching controls, a shortlist of advertisements and content items relevant to the remote user will be created.

The shortlisted content and advertisements, along with ad-matching controls and ad-controls will be pushed to the remote receiving peer. There is also a possibility to stream the content to the remote receiving peer instead of physically transferring the content. If the peer acts like a proxy for the remote receiving peer (e.g., ad-matching is done by this peer on behalf of the remote peer) there may be a need to proxy the calls to OnAccept.

Local Bidding

Embodiments of the systems and methods described herein provide mechanisms for an advertiser and/or a content provider to specify rules on how and when ads and/or content is rendered. Ad provider rules can include specific conditions regarding when the ad may be selected, the particular type of content with which the ad should be rendered, and/or the like, while content provider rules might include payout details. A DRM engine ensures that the rules are executed and the consequent obligations are met.

In one embodiment, targeting is performed at two different levels. A first, pre-filtering pass is performed on the server side, as described elsewhere herein. A second pass is performed on the client side, additional embodiments of which are described below. In one embodiment, the second pass is an auction where an ad is matched to particular content and a particular user.

In one embodiment, the ability to support separation of content and ads and the ability to mix them to form a presentation (e.g., what is shown to the user) is implemented using the dynamic media zone technology described in more detail in the '543 application.

Media zone information embedded inside content can specify one or more point(s) where another piece of media (identified by an id, called an external zone id) needs to be inserted during rendering. Other media files, e.g., ads, need to have a zone with the corresponding id (internal zone id) to be inserted. The zone usually covers the whole file, although that is not always the case. Embodiments of the inventive body of work provide a mechanism by which the client can locate and select the relevant media zone (e.g., ad) to insert.

Figure 16:
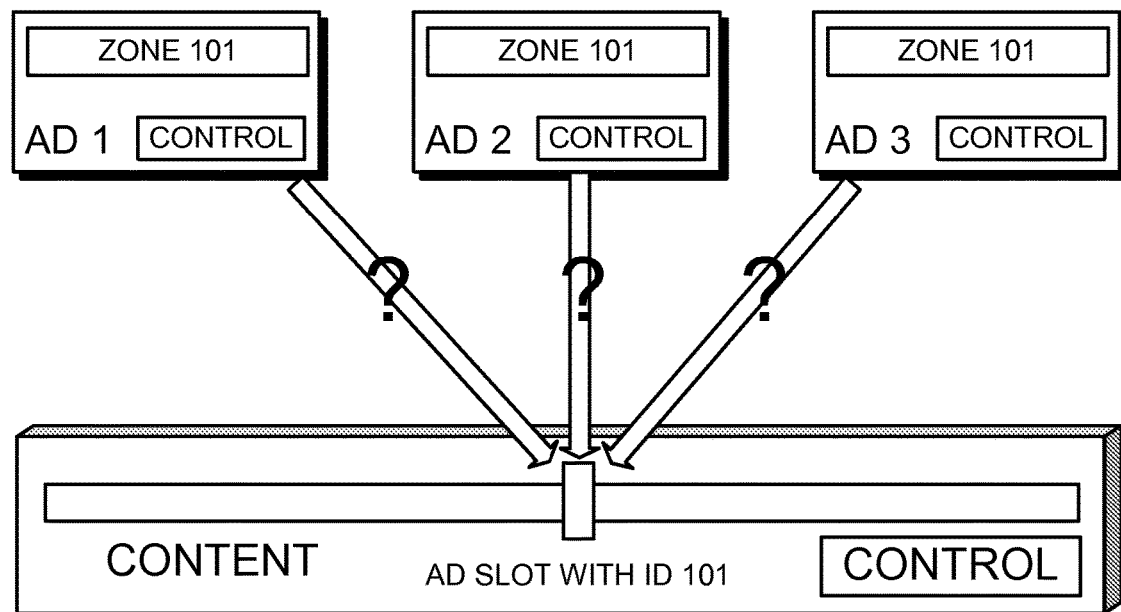
FIG. 16 shows a piece of media content formatted in accordance with the dynamic media zone technology.
Figure 17:
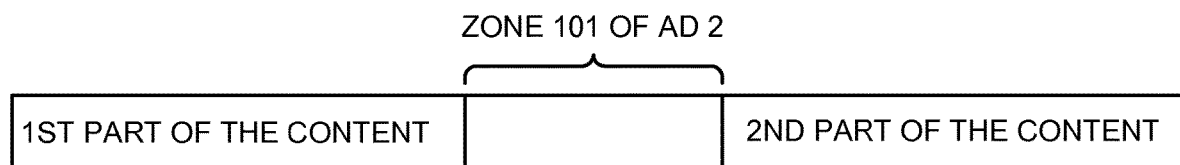
FIG. 17 shows the integration of a piece of content and an advertisement using the dynamic media zone technology.

FIG. 16 shows a piece of media content 1602 formatted in accordance with the dynamic media zone technology described in the '543 application. As shown in FIG. 16, content 1602 has one ad slot, represented by the external zone id 101. In the example shown in FIG. 16, the electronic device on which content 1602 is stored includes three ads, and ad selection software running on the electronic device determines which ad to insert by performing local ad matching as described herein. If ad 2 is selected (e.g., if ad 2 wins an auction performed by the ad selection software), the presentation of the content and advertisement will be as shown in FIG. 17.

Architecture

Figure 18:
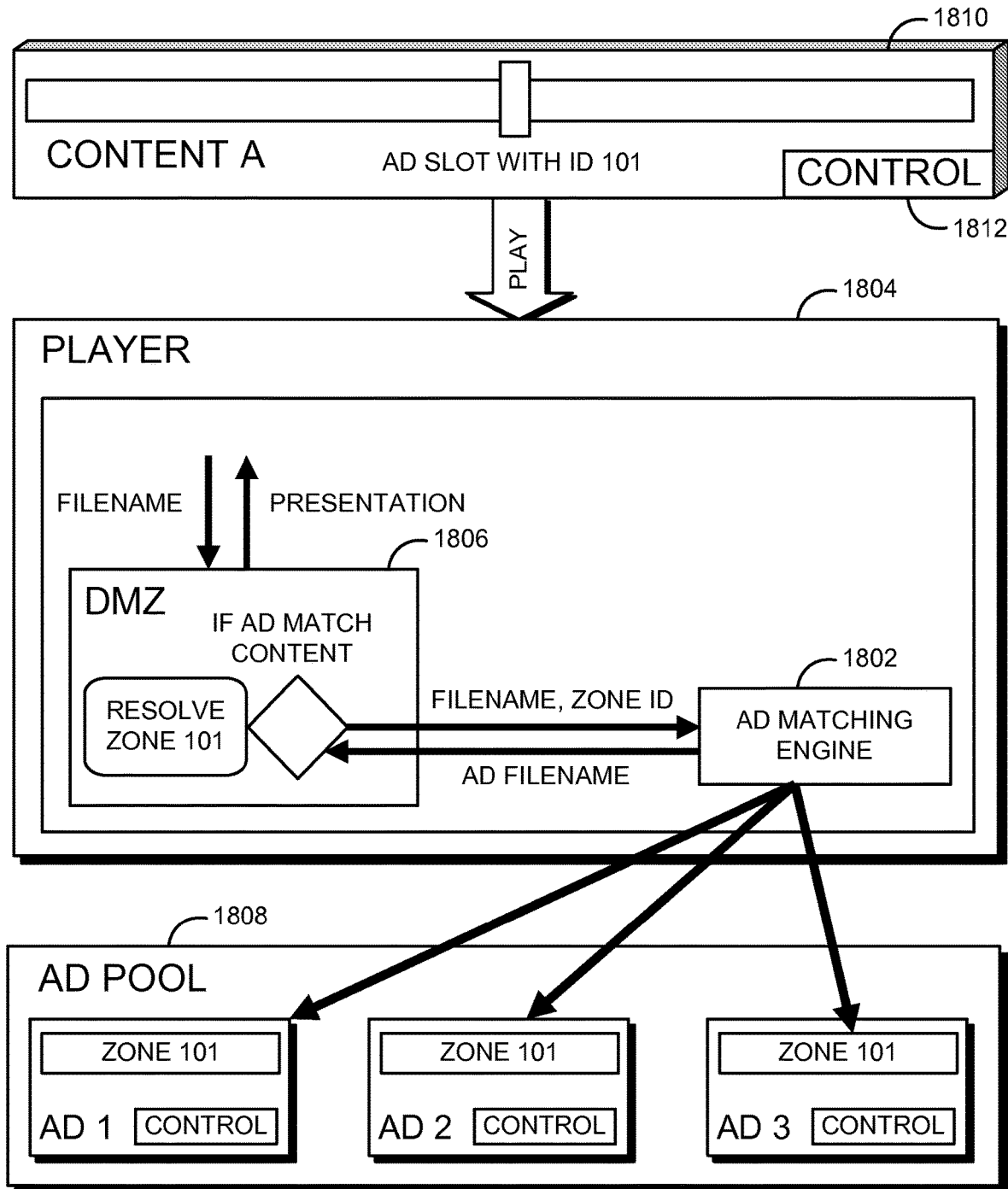
FIG. 18 shows an example media player for use in certain embodiments.

As shown in FIG. 18, in one embodiment ad selection software 1802 is implemented as a plug-in to a DRM-enable media player 1804. An external zone resolver can be used by the dynamic media zone technology 1806 to match an external zone id to an actual file (or part of it, i.e., a zone). In one embodiment, the dynamic media zone technology 1806 may use multiple external zone resolvers, and may use the ad selection module 1802 to resolve external zone ids for content designated for use in the ad matching system. In preferred embodiments, ads in an ad pool 1808 bid for a slot within a piece of content 1810. DRM controls within the ads are executed by the system's DRM engine and determine the amount an ad is willing to bid for a given slot.

In a preferred embodiment, content 1810 also has a say in ad matching via its own associated DRM controls 1812. For example, the content's associated control information 1812 can exclude certain types of ads, while favoring others. For instance, a children's TV show might prefer ads for toys, not investment banking services.

In one embodiment, local ad bidding makes use of user information available to the user's device to determine the bidding price. Performing the bidding on the device protects the user's privacy. Alternatively, or in addition, the bidding component can use local context information (e.g., local time, global positioning coordinates, etc.) to determine an optimal match between ads and content.

Local Ad Matching

The following discussion explains the mechanisms and components involved in ad bidding in some illustrative embodiments.

How does the client know which ad matching technology to use?

When a piece of content's zone map has an ExternalZoneInfo element (identified by an external zone id, X), meaning that content contains an ad slot, the client has to find the relevant media zone to insert in the slot. A relevant media zone is a portion of a media file whose zone map contains an InternalZoneInfo element with an internal zone id that matches the external zone id X.

In one embodiment, an external zone resolver is responsible for finding the relevant media zone to insert. If the content is branded with the name of a particular ad matching service or technology (as described in more detail below), the client uses that ad matching service or technology to find the relevant media zone. For example, a piece of content could specify this information in its header.

Figure 19:
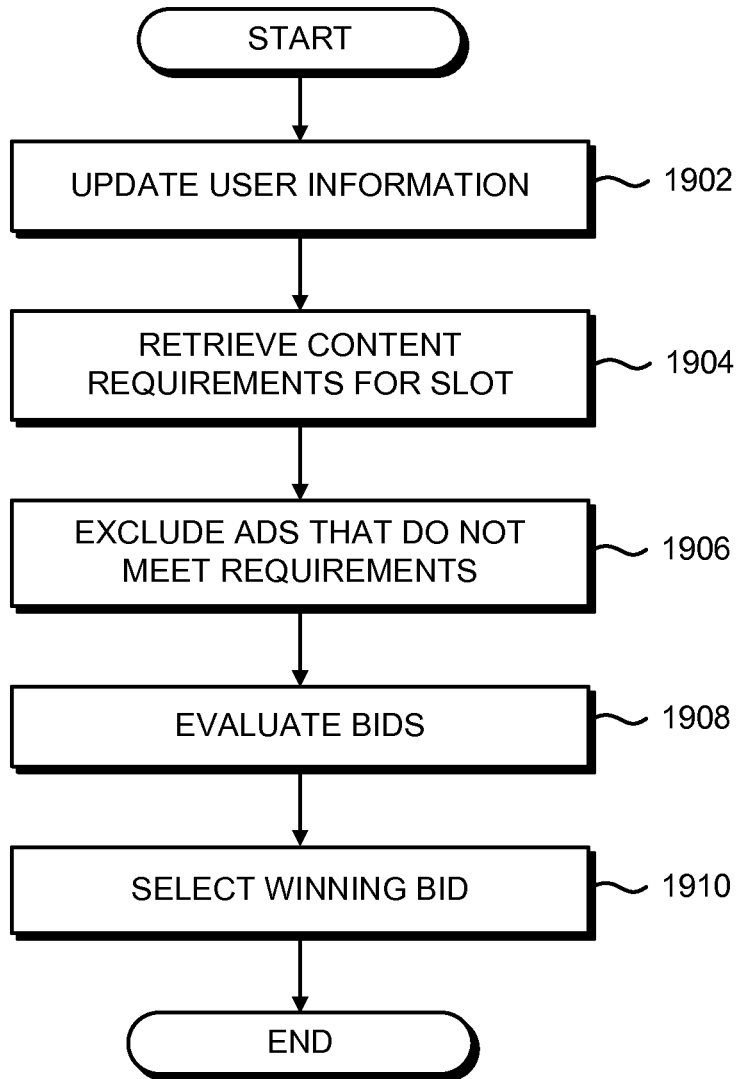
FIG. 19 shows an ad-matching process in accordance with one embodiment.

As shown in FIG. 18, in one embodiment the inputs to the ad matching module 1802 are the content's filename and the zone id to be resolved. The output is an identification of the ad that was selected (e.g., a filename, URL, etc.). In a preferred embodiment, an ad matching process such as that shown in FIG. 19 is used. As shown in FIG. 19, the client may first update the user information, if necessary (1902). The client then extracts the content requirements for that ad slot (1904), and ads that do not match those requirements are excluded from the auction (1906). Next, all suitable ads bid for the slot (1908), and the client picks the highest bidding ad and returns the path of the ad and optionally other information as well (1910).

In one embodiment, some or all of the following data is used for ad matching (for the content as well as for the ads): media zone information (mZON); ad matching technology information (tZON); and/or license and content id(s).

If any of these elements are stripped out of the content, the ad matching module returns an error. In one embodiment, each of these elements, except for the content id(s), contains a signature. If signature verification fails, an error is reported to the dynamic media zone module layer, and the content is preferably not rendered.

As previously indicated, in one embodiment the ad matching module retrieves a license associated with the content and executes the Control.Actions.GetReq.Perform routine to get the content provider's requirement for the ad slot. In one embodiment, the content control has an input parameter: DRMEngine/Action/Parameters/SlotNumber, which is an integer object that contains the slot number (0 based-index). In one embodiment, the requirements are returned in the following ESB:

```
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "Requirements";
            valueList = {
                parameter = {
                    name = "Prefer";
                    string prefer = "KidCo;Toys";
                }
                parameter = {
                    name = "Exclude";
                    string exclude = "Violence;Mature";
                }
                parameter = {
                    name = "Minimum";
                    long minimum = 33;
                }
            }
        }
        [ DMZ and DRM obligations / callbacks ]
    }
}
```

"Exclude" is an optional, semicolon-separated string that contains the tags that the content provider does not want to have associated with its content. In this particular example, Kid Co. does not want to have adult or violent ads shown in its content. Even if a violent ad has the highest bid for the slot, it will not be shown.

"Prefer" is an optional, semi-colon separated string that contains tags that the content provider prefers. In this particular example, content provider Kid Co. wants Kid Co. ads to be shown, even if the Kid Co. ad does not bid the most. For example, if Shoe Co. ad bids 45, Kid Co. ad-1 bids 20, and Kid Co. ad-2, Kid Co. ad-2 will be shown. If no Kid Co. ad participates in the bidding then another ad is shown.

"Minimum" is an optional string that can specify the minimum revenue the content provider wants from a particular piece of content or slot. The value of this object is the minimum bid for that slot.

Once the content requirements are extracted, ads that are not excluded take part in the auction. The "Exclude" tags will be compared against the tags contained in the ad. If one or more excluded tags appear in the tags entry of the ad's InternalZoneInfo, the ad will be excluded from the auction.

In preferred embodiments, the ad control is responsible for bidding. As indicated above, pre-selected ads take part in the auction. The bidding price depends on the ad provider's preferences. In one embodiment, the ad provider can base the bidding price on multiple variables, including, for example:

User personal data, such as links or user attributes (e.g., such as those that might be stored in the DRM engine's secure database).

Context, such as time of day, date, location, etc. (e.g., pay more as we get closer to a certain date and nothing after that date).

Other information, such as usage information (e.g., pay x for the first rendering, y for the second, etc.).

The ad control's Control.Actions.Bid.Perform routine determines the bid price and returns it in the following ESB:

```
esb{
    globalFlags = 0;
    esbCategory = ACTION_GRANTED;
    esbSubCategory = 0;
    localFlags = 0;
    cacheDuration = {SEC, 0};
    valueList = {
        parameter = {
            name = "BiddingInformation";
            valueList = {
                parameter = {
                    name = "Price";
                    long price = 33;
                }
                parameter = {
                    name = "NotInSameContentSession";
                    long notinsamesession = 0;
                }
            }
}}}}
```

Where, "price" is the price the ad is bidding to be played, where if the value of "NotInSameContentSession" is 1, the ad will be selected for only one slot of a given piece of content.

The ad selection module will typically pick the ad that bids the most. However, as previously indicated, in one embodiment one exception is that even if an ad with a tag that matches the "Prefer" tags is not the highest bidding ad, it will still get selected over a higher paying ad that is not preferred. If two or more ads are preferred, the highest bidding ad among them will be selected.

In one embodiment, if no ad has been found for a slot, the ad matching module returns an error and the application stops any further playback of the presentation. In some embodiments, certain default ads are packaged with the content or provided with the client to ensure that this error is not encountered.

In some embodiments, the content provider can deploy the same piece of content for paid subscriptions, where it is shown without ads, and for an ad supported service, where it is shown with ads. This can be implemented by, for example, marking the ad zones as INSERTED, that way, they will only be rendered if there is a NO SKIP obligation for them. The content item's control checks for the existence of a paid subscription (e.g., using link objects and/or by retrieving objects from a database). If the user doesn't have a paid subscription (e.g., as evidenced by the user's lack of a valid subscription link), the content item's control returns an ESB (an example of which is shown below) indicating that the ad zone cannot be skipped.

```
parameter =
{
    name = "Obligations";
    valueList =
    {
        parameter =
        {
            name = "MediaZones";
            valueList =
            {
                valueList =
                {
                    long zoneid = 101;
                    long zonetype = 0; // NO_SKIP
                    long zoneflags = 0;
                }
            }
        }
    }
}
```

If, however, the user has a paid subscription, the control will not return such an obligation and the user will not have to view the ad, so ad-matching need not occur.

In one embodiment, two obligations are used to record that an ad has been played. These obligations are returned by the content item's control in an ESB, an example of which is shown below:

```
parameter =
{
    name = "Obligations";
    valueList =
    {
        parameter =
        {
            name = "MediaZones";
            valueList =
            {
                valueList =
                {
                    long zoneid = 101;
                    long zonetype = 0;
                    long zoneinfo = 1;
                }
            }
        }
        parameter =
        {
            name = "urn:....:obligation:meter-play-duration";
            valueList =
            {
                string namespace = "urn:....:organization:... ";
                string logicalId = " cid:contentid:0001";
            }
        }
    }
}
```

The zoneinfo flag is set to METER, which means that if there is a metering obligation for this content, the application logs a metering event when this zone has been played. In this example, there is an obligation for metering (i.e., the parameter named "urn: . . . :obligation:meter-play-duration"), so once the zone 101 is played successfully, the application will log that event, as well as ad matching information. Ad metering is performed by appending the metering data to the DMZ logical id (i.e., "logicalId" in the above example ESB). An example of the type of ad-related data that can be metered is shown below:

```
<AdMatchingInformation>
    <ContentId>urn:....:acme:0000000A:content:00000033</ContentId>
    <Slot id="0">
    <BidSummary>
        <Ad>
            <Id>urn:....:acme:00000009:ad:00000007</Id>
            <Price>40</Price>
            <Time>2009-11-4T19:49:13.986 GMT</Time>
        </Ad>
        <Ad>
            <Id>urn:....:acme:00000009:ad:00000006</Id>
            <Price>45</Price>
            <Time>2009-11-4T19:49:14.48 GMT</Time>
        </Ad>
    </BidSummary>
    <SelectedAd>
        <Id>urn:....:acme:00000009:ad:00000006</Id>
        <Price>41</Price>
    </SelectedAd>
    </Slot>
    <Slot id="1">
    <BidSummary>
        <Ad>
            <Id>urn:....:acme:00000009:ad:00000007</Id>
```
-continued
```
            <Price>40</Price>
            <Time>2009-11-4T19:49:14.111 GMT</Time>
        </Ad>
    </BidSummary>
    <SelectedAd>
        <Id>urn:....:acme:00000009:ad:00000007</Id>
        <Price>40</Price>
    </SelectedAd>
    </Slot>
    <BidContext>
        <UserIds>
            <Id>urn:organization:service-provider-v:8pususer:1</Id>
            <Id>urn:organization:service-provider-v:8pususer:3</Id>
        </UserIds>
    </BidContext>
    <PersonalityId>urn:organization:testpdc:device-maker-x:8pusperso:aa08a2</PersonalityId>
</AdMatchingInformation>
```

This example shows a summary of the ad matching for the piece of content with id "urn: . . . :acme:0000000A:content:00000033". In this example, two slots had to be filled. For the first slot, two ads participated in the bid, and "urn: . . . :acme:00000009:ad:00000006" won the auction with a bid of 45 units, although, in this example, it will pay only one unit of price more than the second best bid of 40 units. Only one ad participated in the bid for the second slot (i.e., "acme:00000009:ad:00000007"), so it is picked and it pays its bidding price. In the example shown above, the metering data also contains context information about the auction, such as the fact that two user nodes were present. It will be appreciated that this illustration provides examples of what could be metered, and that in other contexts more, less, or different information could be collected. In addition, depending on privacy issues, only a subset of the collected information could be sent to an external server. In one embodiment the metering data is stored securely in the media player's (or DRM engine's) database, and opportunistically reported back to an external server via a secure channel.

Packaging

In one embodiment, a packaging script can be used that takes a clear text file as an input and packages it: it can package content files as well as ad files. For example:

```
Usage: Package.py [options] <input file> <output file>
Options:
    -h, --help          show this help message and exit
    -d <dmzdescription.xml>, --dmz=<dmzdescription.xml>
                        description of the DMZ information
    -t <admdescription.xml>, --admatching=<admdescription.xml>
                        description of the ad matching information
    -l <license.xml>, --license=<license.xml>
                        license to insert in the file
    -k <contentid> <contentkey>, --content-key=<contentid>
    <contentkey>
                        content id and content key
    -a, --ad            specify an ad packaging
```

According to this example, a content file could be packaged as follows:

```
$ python Package.py -d DMZ_ZoneMap.xml -t Ad ZoneMap.xml -l
content_license.xml -k foo:0001
AAAAAAAAAAAAAAAAAAAAAA== -k foo:0002
AAAAAAAAAAAAAAAAAAAAAA== TVShow.mp4 TVShow.mlv
```

An advertisement could be packaged as follows:

```
$ python Package.py -a -d DMZ_AdZoneMap.xml -t
Ad_AdZoneMap.xml -l
ad_license.xml Ad.mp4 PackagedAd.mp4
```

As described in the '543 application, in one embodiment, dynamic media zone information is contained in an "mZon" atom, which is contained in the udta atom of a video track. An example of the input for a content file is shown below:

```
<ZoneMap>
    <!-- points: array of ZonePoint -->
    <Points type="IsoMediaAccessUnit"> <!-- or IsoMediaByteOffset -->
        <ZonePoint>289</ZonePoint>
    </Points>
    <!-- internalZones: array of InternalZoneInfo -->
    <InternalZones>
    </InternalZones>
    <!-- externalZones: array of ExternalZoneInfo -->
    <ExternalZones>
        <ExternalZoneInfo>
            <!-- splicePoint: integer -->
            <SplicePoint>0</SplicePoint>
            <!-- id: integer -->
            <Id>101</Id>
        </ExternalZoneInfo>
    </ExternalZones>
</ZoneMap>
```

In this example, there is one external zone, zone 101, which is to be spliced in at access unit 289.

An example of the input for an ad is shown below:

```
<ZoneMap>
    <!-- points: array of ZonePoint -->
    <Points type="IsoMediaAccessUnit"> <!-- or IsoMediaByteOffset -->
        <ZonePoint>1</ZonePoint>
        <ZonePoint>-1</ZonePoint>
    </Points>
    <!-- internalZones: array of InternalZoneInfo -->
    <InternalZones>
        <InternalZoneInfo>
            <!-- fromPoint: integer -->
            <FromPoint>0</FromPoint>
            <!-- toPoint: integer -->
            <ToPoint>1</ToPoint>
            <!-- id: integer -->
            <Id>101</Id>
            <!-- attributes: integer -->
            <Attributes>1</Attributes> <!-- INSERTED or 1 or 0 -->
            <!-- mediaDigestAlgorithm: integer -->
            <MediaDigestAlgorithm>0</MediaDigestAlgorithm> <!-- NONE
            0 or SHA1 1 -->
            <!-- mediaDigestValue: byte array -->
            <!-- meteringTag: string -->
            <MeteringTag>some:metring:tag</MeteringTag>
        </InternalZoneInfo>
    </InternalZones>
    <!-- externalZones: array of ExternalZoneInfo -->
    <ExternalZones>
    </ExternalZones>
</ZoneMap>
```

In one embodiment, ad matching information is contained in a "tZON" atom, which is itself contained inside the udta atom of a video track.

An example input for a content file is shown below:

```
<AdMatchZoneMap>
    <!-- externalzones: array of ExternalZoneInfo -->
    <AdMatchExternalZones>
        <AdMatchExternalZoneInfo>
            <Id>101</Id>
            <!-- tags: string -->
            <tags>Foo</tags>
            <externalAdURN>urn:ad:0001</externalAdURN>
<externalAdMatchingControlURN>urn:control:admatching:001</externalAdMatchingControlURN>
        </AdMatchExternalZoneInfo>
    </AdMatchExternalZones>
</AdMatchZoneMap>
```

An example input for an ad is shown below:

```
<AdmatchZoneMap>
    <!-- internalZones: array of InternalZoneInfo -->
    <AdMatchInternalZones>
        <AdMatchInternalZoneInfo>
            <Id>101</Id>
            <!-- tags: string -->
            <tags>Bar</tags>
        </AdMatchInternalZoneInfo>
    </AdMatchInternalZones>
</AdMatchZoneMap>
```

This zone map defines the tags used by the ad matching process to compare against the "Prefer" and "Exclude" tags.

As previously described, in one embodiment DRM controls are used to perform the actual bidding and matching. In one embodiment, content control byte code is fixed (not dynamically generated), although a system back end may be able to add a set of attributes to customize it. Some examples of attributes include "Prefer", "Exclude" and "Minimum". In one embodiment, an ad control can be generated from a specification of the ad's bidding rules. An example of such a specification is shown below:

```
<ControlDescription uid="some:control:00001">
    <BasePrice>0</BasePrice>
    <MaxPrice>41</MaxPrice>
    <AttributeConstraints>
        <Constraint>
            <Path>
.../Databases/.../PII/TechSavvy
            </Path>
            <Condition type="Exist"></Condition>
            <MetVariation>41</MetVariation>
            <NotMetVariation>0</NotMetVariation>
        </Constraint>
    </AttributeConstraints>
    <Restrictions>
        <NotInSameContentSession/>
    </Restrictions>
</ControlDescription>
```

In this example, the base price is 0 units, but if the tech savvy object is present, the new bid price is 41 units. The element "NotInSameContentSession" indicates that the ad provider chooses not to show this ad twice in the same piece of content, if two or more slots are available.

A more complex example is shown below:

```
<ControlDescription uid="some:control:00001">
    <BasePrice>30</BasePrice>
    <MaxPrice>100</MaxPrice>
```

-continued

```
    <AttributeConstraints>
        <Constraint>
            <Path>
.../Databases/.../PII/SportsEnthusiast
            </Path>
            <Condition type="Exist"></Condition>
            <MetVariation>5</MetVariation>
            <NotMetVariation>0</NotMetVariation>
        </Constraint>
        <Constraint>
            <Path>
.../Databases/.../PII/Male
            </Path>
            <Condition type="Exist"></Condition>
            <MetVariation>5</MetVariation>
            <NotMetVariation>-10</NotMetVariation>
        </Constraint>
        <Constraint>
            <Path>
.../Databases/.../PII/HighIncomeRange
            </Path>
            <Condition type="Exist"></Condition>
            <MetVariation>90</MetVariation>
            <NotMetVariation>0</NotMetVariation>
        </Constraint>
    </AttributeConstraints>
</ControlDescription>
```

In this example, the base price is 30 units, and three different constraints alter the bidding price. Namely, if the user is a sports enthusiast, the ad provider is willing to pay 5 units more than its current bid price. If the user is a male, the ad provider is willing to raise its current price by 5 units, but if the user is not a male, it lowers the current price by 10 units. If the user's income is on the high side, the ad provider is willing to raise its price by 90 units; however, a maximum price is set to 100 units, so if the bidding price exceeds that value, it is set to the maximum price.

Example pseudo-code for a control generated from the above control description is shown below:

```
currentBidPrice = getObject(BasePrice)
variation = 0
if objectIsPresent(SportsEnthusiast)
    variation = getObject(SportsEnthusiast MetVariation)
else
    variation = getObject(SportsEnthusiast NotMetVariation)
currentBidPrice += variation
if objectIsPresent(Male)
    variation = getObject(Male MetVariation)
else
    variation = getObject(Male NotMetVariation)
currentBidPrice += variation
if objectIsPresent(HighIncome)
    variation = getObject(HighIncome MetVariation)
else
    variation = getObject(HighIncome NotMetVariation)
currentBidPrice += variation
maxPrice = getObject(MaxPrice)
if (currentBidPrice > maxPrice)
    currentBidPrice = maxPrice
```

Although the above example illustrates the use of attribute constraints, it will be appreciated that other types of constraints could be used as well (e.g., time and/or link constraints).

In one embodiment, encryption and tagging is only used for content files; ad files remain clear text; however, licenses are added to (or otherwise associated with) both the ads and the content files. Content licenses may contain the content provider's preferences and rules. Ad licenses may contain bidding controls.

User Profile

Bidding controls preferably have access to up-to-date user profile information. This information can, for example, be stored in a database on the user's system (e.g., a secure database of the type described in the '693 application).

User profile information can be acquired in a variety of ways. For example, when the user buys a gaming system, he may also acquire a license that, when executed, creates a "tech savvy" user profile object. Such licenses may be stored in a special directory on the user's system. Licenses may also be downloaded when a user clicks on a link on a website. As yet another example, if a user subscribes to many travelling TV shows, the webstore that provides the TV shows could send a license that creates a user profile object that indicates the user's interest in travelling. These objects can be deleted if the user's behaviour changes. For example, a license whose control deletes an obsolete object can be pushed to the device. In one embodiment, licenses are signed and the ad matching module consumes them only if their signature is valid.

In one embodiment, before ad matching occurs, the ad matching module looks for licenses in the license directory, executes them, and deletes them. This way, the ad matching process is based on an up-to-date context. The user profile objects created as a result of executing the licenses are used (e.g., read) by ad matching controls, during the bidding process.

In one embodiment, the user profile information (e.g., objects) stored on the user's system can only be accessed by a control that is signed by the same entity as the control that created it, thus ensuring its privacy.

In one embodiment, the ad matching client obtains user information from the server side. The client's role is to report the user's actions; the server side uses that information to determine an accurate user profile (metadata). Alternatively, or in addition, if the client is intelligent enough to compute an accurate user profile, the round trip from the client to server and back is not necessary. In both examples, the user's profile is stored as objects in the client's local database. In other embodiments, the user profile information could be stored in another form, as discussed in more detail below.

One way to make user profile information available to a bidding control is to implement one or more host function(s) to provide this information. For example, a function called "System.Host.GetUserInformation" could be defined that is similar to the virtual machine function "System.Host.GetObject" described in the '693 application. The main input parameter is the name of the attribute the control wants to query, "TechSavvy" for instance. The output is the value of the object if it is present, or an error if this object is not available or if an error occurred. The value of the object could represent a weighting (e.g., an indication of how sure the system is).

In one embodiment, such a function has the following inputs:

Top of Stack:

| Name |
| --- |
| ReturnBuffer |
| ReturnBufferSize |
| ... |

Where "Name" is the address of a null-terminated string containing the name of the requested object, "ReturnBuffer"

is the address of a memory buffer where the value of the object is to be stored, and "ReturnBufferSize" is a 32-bit integer indicating the size in bytes of the memory buffer where the value of the object is to be stored.

In one embodiment, System.Host.GetUserInformation has the following output:
Top of Stack:

| TypeId |
|---|
| Size |
| ... |

Where "TypeId" is an object type id or negative error code if the call failed, and "Size" is a 32-bit integer indicating the size in bytes of the data returned in the buffer supplied by the caller, or the size required if the caller provided a buffer that was too small. If the requested object does not exist, the error returned is ERROR_NO_SUCH_ITEM. If the buffer supplied for the return value is too small, the error returned is ERROR_INSUFFICIENT_SPACE. Other error codes may also be returned.

Another example of a function that could be defined for enabling a bidding control to access user profile information is "System.Host.IsUser". This function could be used by a control to check for the existence of a user metadata entry. In one embodiment, the main input parameter is the name of the metadata that the control wants to confirm exists. The output is an integer value: zero if the object is present, or a negative error code if it is not. In one embodiment, System.Host.IsUser accepts the name of the requested object as an input (e.g., in the form of an address of a null terminated string), and returns an integer value result code as described above.

Personal Agent

The function of a personal agent ("PA") in a media distribution environment is described below, where content is distributed in a variety of ways through multiple services and mechanisms, and where rights to access media are automatically paid for by advertisers who pay premium prices to the content provider when specific advertisements are viewed by consumers who are reliably known to have certain attributes and interests. In preferred embodiments, the PA functions on various devices (e.g., PCs, tablets, handsets, TVs, etc.) in conjunction with media viewers operated by a consumer. The PA makes selections of advertisements for that consumer in real time, based on a local auctions referencing the consumer's personal and environmental metadata for the benefit of the content provider. The PA sends anonymized information about ad viewing events to a trusted clearinghouse specified by the content provider. The isolated nature of the actions of the personal agent, the anonymization process, and the open and trusted information policies of the clearinghouse provide substantial privacy protection.

A PA can learn a lot about a user through the user's online interactions, and can use that information to select advertising that is highly relevant and to automatically recommend content that suits the user's interests. PAs can do this without having to reveal the user's personal information to anyone, but they can also help the user share this information (e.g., selectively, through social networks).

A PA that knows a lot about a user can match the user's interests to an advertiser in valuable ways, such that the advertiser will be willing to pay more for the privilege of presenting certain advertisements to the user. The user will also benefit from viewing advertisements that are more relevant, and the content provider benefits from getting paid more for having the most relevant advertisements displayed in conjunction with their content. Thus, a PA that notices that a user is browsing for information on a certain type of sedan can browse the Internet to search for advertisers who are selling a similar product, and who can target an ad to that specific interest. Other data about a user could be used to find more precise matches or select parameters in the ad presentation that can better suit the user's background and interests (e.g., certain variations of the ad could be selected by gender). If a PA knows a lot about a user, it can do a better job of finding ads that are relevant, and even find "long tail" ads that are meant to appeal to a relatively small audience. Thus, instead of searching for things on the Internet, ads for those things can find the user automatically, and viewing those ads can fund the viewing of the user's favorite TV shows and movies. While a company may not find it cost effective to advertise its product during the Super Bowl, plenty of video demonstrating the virtues of the product may be already available and would be appreciated by those who are about to make a decision to buy it or a similar product.

In one embodiment, a user's personal agent has access to the user's personal information, but it works for the user, behaves the way the user prescribes, and generally does not need to tell anybody anything about the user specifically. The personal agent is also able to do some or all of the following:

- collect the user's personal information from various sources and store that information in encrypted form where it is accessible on a variety of different devices only by the personal agent and the user;
- survey and categorize this personal information to characterize the user's interests and habits, providing personal metadata scores that are useful in matching media objects to the user's interests;
- search the Internet for the user, incognito, to make recommendations on media (e.g., music, video, articles, e-books, etc.) that the user might like;
- search, incognito, for advertisements for products and services that the user most likely will appreciate;

When a media presentation (video, program guide, etc.) wants to show the user an advertisement, the personal agent will select the advertisement that pays the most for the content the user wants to watch, based on the best match between the user's interests and attributes, the interests and attributes that the advertiser is targeting, the characteristics of the content the user is watching, the media rendering environment (e.g., where the user is, time of day, device the user is using, etc.), the number of times the user has viewed this or similar ads, and/or the like.

The personal agent can have visibility into the user's actions and data on many different devices, and safely redistribute your personal information to various devices where it can be used for the user's benefit.

While the personal agent works for your benefit, it is also preferably an "honest broker" that will respect the user's interests as well as the interests of the content provider and the advertiser. Specifically, the personal agent preferably protects the user's interests by eschewing ads that are irrelevant or overly annoying, and matching the user's interests and habits with ads without revealing that information to advertisers (or to anybody, except in an anonymized and trusted context) unless permitted by the user. The personal agent protects the advertiser's interests by ensuring that advertisements are properly presented using profile information to match against the advertiser's selected categories in an auction. The personal agent protects the content provider's interests by selecting the advertisement that optimizes the objectives of the content provider, paying the content provider the most money in an auction, and/or satisfying other criteria such as favoring certain advertisers over others, eschewing advertisements that degrade the image of the content provider, etc.

Personal agents can do many other things. As suggested above, they can roam a user's devices and pick up useful and relevant information and then analyze it, categorize it, archive it, and report it to the user in useful forms.

People interact through their computers, personal devices, and web applications in ways that generate large amounts of information that they normally consider to be private. For example, people have accounts with online retailers, social networking sites, credit card companies, banks, in addition to browsing information including history and bookmarks. Much of that information gets left behind and forgotten when devices are replaced. Much of it is re-entered time and again on the same device and on other devices. In one embodiment, the personal agent not only protects all of that information, but also employs it to the user's advantage to, e.g., make selections and recommendations.

While, on occasion, a user may choose to share some of that information with others, in a limited context, in a preferred embodiment, the information is treated by the personal agent as private and confidential.

As described above, embodiments of the systems and methods described herein can lower the cost of ad-based content distribution while maximizing the ad-based revenue that content can generate. Preferred embodiments are designed to be an efficient way to distribute ad-based content, capable of leveraging both current and future ad targeting techniques in a market for ad-slots. Preferred embodiments provide incentives for consumers to participate, protecting their information even while it is used in a matching and bidding process on the consumer's own devices. The burden imposed on content distribution itself is very light. In fact, virtually any method of distribution can be used.

Figure 20:
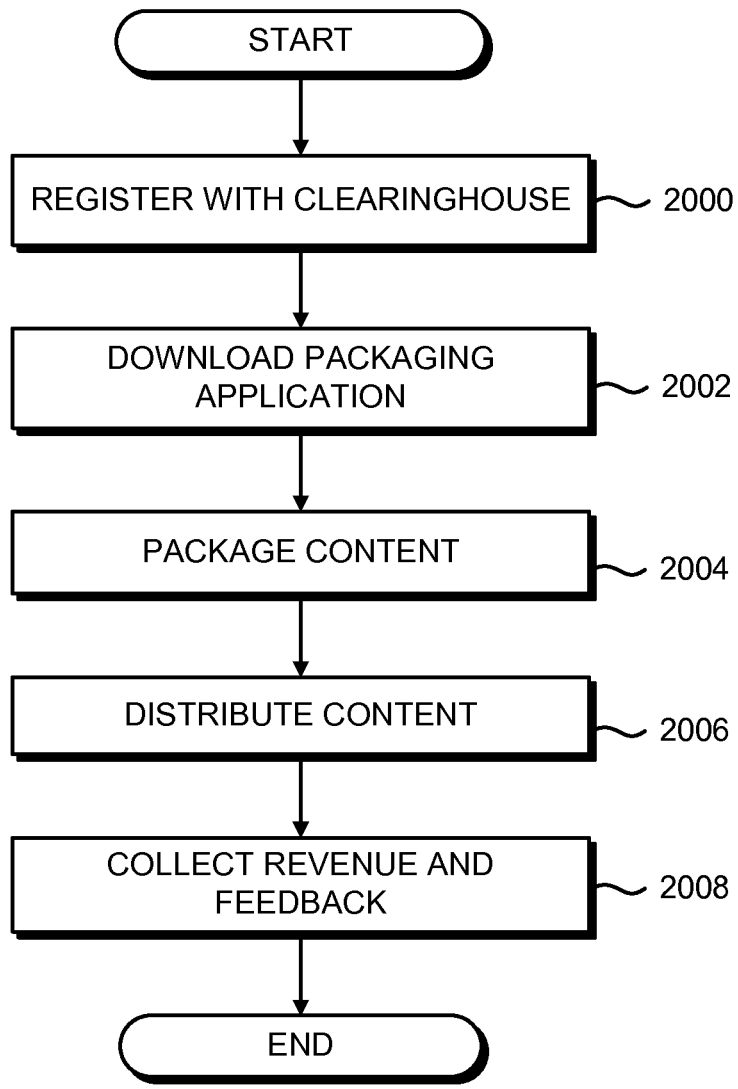
FIG. 20 shows a process for monetizing content distribution.

Preferred embodiments allow virtually any content provider to easily leverage a rich network of targeted advertising. In accordance with preferred embodiments, a content owner can monetize his or her content by simply by following a process such as that shown in FIG. 20. As shown in FIG. 20, the content provider registers with a clearinghouse (2000), e.g., using a web form, and downloads a packaging application (2002), or contracts with a packaging service (not shown). The content provider can then package its content (2004), e.g., using an automated process in which the content owner/distributor specifies choices such as the number of ad slots, minimum bids from advertisers, etc. The content can then be distributed in any way suitable manner (2006), including, without limitation:

(a) Using any content delivery service on the web, including download, progressive download, multicast, streaming, etc., using any download manager (b) Using physical media (e.g., DVDs, CDs, memory cards, USB dongles, flash memory, hard disk drives, etc.)

(c) Via data broadcasting (d) Via P2P sharing on social networks, torrents, sneakernets, SDcards, USBkeys, etc.

(e) Some or all of the above, and/or more

Once the content is distributed, the content owner can sit back and collect royalties and other information that may be provided regarding where/how its content is being used so that it can optimize its future distribution choices (2008).

The content provider can also choose to share royalties with content distributors who advertise its content and arrange for it to be hosted. Preferred embodiments of the systems and methods described herein can arrange for those distributors to be paid automatically out of the content provider's royalties, or the content provider can contract directly with those distributors.

The content provider's content will play on any supported player on a wide variety of devices, and its content can even be packaged as an application that can include and install a player or plug-in specifically for its content.

When the content is played, a number of mechanisms can be used to assure that the playback event generates the greatest amount of compensation for the content provider. For example, in preferred embodiments the player scans the local device environment for ads or ad references that will pay the most when the ad is inserted into one of the ad slots in the content. These Ads can come from a variety of sources that the user interacts with. These can include web sites, push services, and ad scanning applications that arrange to share benefits with the device maker or the consumer. Many independent services compete to both deliver ads and bid on their placement in content. The content provider need not worry about arranging for these ads or selecting the business model used for ad delivery, but can specify minimum payoffs, and can exclude certain types of ads. In some embodiments, the content provider can select from different objective functions for evaluating which ads are selected (e.g., using selection criteria other than price).

The ad network that feeds the bidding process is expected to be vast and growing, with many independent sources with special knowledge of the consumer, but one of the best sources of effective targeting is the private user data store that, as explained here, can be used by securely used by a local ad matching module to optimally match ad with content and users.

Targeting ads using the technology described herein has many advantages that can result in advertisers paying much higher CPM rates. The system can collect private data associated with the user over the user's network of devices. This user information can be collated, but kept private and never revealed to the advertiser, and used in a multi-tiered match and bid scheme. For example, when ads are packaged, they may include a bidding control that is used to make bids during content playback time. The control can interact with a user profile database on the user's playback device in order to determine the quality of the match of the ad to the user and therefore finally determine the bid. The bidding control is up to the advertiser and can be proprietary. The user data can include a count of previous impressions for the specific ad or for related ads, along with certified data about the user, objective event data, and user supplied data.

In some embodiments, when a user interacts with the Internet, one or more user agents select ads from a number of Internet-based sources. These sources make available metadata that the agent(s) employ to select ads that have a high probability of payoff when selected at playback time for the specific user. The ad sources can include vast caches of ads that can be ranked according to criteria chosen by the user agent using criteria based on specific user data (although agent's ad search criteria can reveal certain aspects of the consumer's personal information, in preferred embodiments no specific event data is revealed, other than perhaps search keywords that a consumer may be using in a concomitant search). In effect a user agent can generate a search query for a specialized web search engine that looks for ads rather than web pages, and the search engine relevance ranking is based on specific user data. In addition, ads can be proffered that are correlated with current web activity (e.g. when a user searches for information on cars, then a series of references to car ads can be delivered).

In a preferred embodiment, when a playback event occurs, all relevant ad controls are run to bid on the ad slots for the content to be played. In each client an ad database manager can weed the database of expired and non-competitive ads.

Advertisers can leverage the technology described herein to encourage consumers to passively participate in event monitoring for optimum ad matching, thereby justifying higher CPMs. Consumers can be assured that their personal information does not leave their own devices or the secure proxies that they control. Event monitoring can be activated in applications, browsers, or operating systems, on just about any device the consumer uses, including without limitation cell phones, PCs, game devices, etc. Event logs can be abstracted and securely shared among the devices that the consumer owns (e.g., a consumer's domain), including, in some embodiments, a private cloud-based proxy, so that the maximal amount of consumer information is collected and redistributed for use in ad-matching on all devices that a consumer uses for content playback. The consumer's privacy is protected, since, in preferred embodiments, the consumer's information is encrypted, and only the devices in the consumer's domain know the keys, as they are generated in the consumer's own devices, and are not shared outside the domain.

In some embodiments, certificates, vouching for consumer attributes that justify higher bids, can be delivered to the consumer's devices. In addition, in some embodiments, ad placement models can be deployed that directly reward the consumer or the consumer's choice of charity. That is, the consumer or a designate can get cash rebates from the ad proceeds.

Thus, systems and methods have been described for performing efficient ad matching. Embodiments of the systems and methods described herein can enable some or all of the following:

Dynamically delivering updated controls for ads and content. Advertisers will get real-time (or close to it) feedback on their ad campaigns. Advertisers can modify the rules associated with an ad dynamically (e.g., to increase the minimum bid price). The controls which express these rules will be delivered to the clients as soon as possible. The delivery mechanism (push or pull) and schedule of these controls will depend on the specific deployment.

Local user profile gathering. In order to conform to privacy laws and/or policies, in one embodiment, the client platform, instead of sending out private information, would gather information regarding the user viewing patterns locally, and send abstracted categorization information to the clearinghouse. This abstract information, free of private information, can be shared by the clearinghouse with partners.

Ad and Content Rules. The kinds of rules that can be expressed for each content item and for each ad are very open. The rules can be collected from the content provider or the advertiser as a simple text, namely XML. These rules can later be converted into objects of the type described in the '693 application using a virtual machine code generator and can be associated with the content or ad as already mentioned. A simple example of such a rule is when an advertiser is willing to pay 10 cents for each ad impression, but is willing to pay 5 additional cents when the ad is shown to the target demography and at a certain period of the day. Similar rules can be associated with a piece of content.

Offline ads for online devices. In some embodiments, both content and advertisements can be (but do not need to be) independently super-distributed using multiple distribution means. The choice of which advertisements to be displayed when content is rendered can be made independent of the content, and is typically negotiated at the time of content rendering on the basis of the best payoff for rendering the advertisement.

Objective function and its delivery (and updates) to the content. In one embodiment, when the consumer wishes to render content on a compliant device or application, the device executes the content item's control program that requires that Ad-slots for the content be filled according to an objective function that optimizes the content provider's objective of collecting Ad revenue from this viewing event. When the bids are computed, the Content control's objective function is used to select the Ad based on the bids. This objective function can also be expressed as a self-protected object. Different types of ad matching may apply. For example a company may have a variety of different ads for the same product, each targeted to a different customer demographic. The ad matching technology described herein, can facilitate the selection of the most appropriate ad for a given user.

Two tiers of ads matching. Some embodiments provide two tiers of user targeting, where the first tier matches Ad content to a consumer at the time when the content is delivered to a device or other user accessible delivery point, and the second tier uses more finely grained information about the time, place, environment, and recent history of the viewer. In other words, an advertisement can be both targeted to the user through distribution means, and optimally matched for rendering based on local data on the rendering device.

Express Ad slots—using DMZ. In some embodiments, the content provider will be able to describe a number of ad-slots for each content item. Ad slots required by the content are filled at the time and place of rendering by the Ads that pay the most to the content provider.

Trusted services. In preferred embodiments the system can provide trusted services for the components handling sensitive information. One component that will typically fall under this category is the clearinghouse, which collects audit reports from the consumer's devices. Other components that may host trusted services will typically include the data warehouse, packager, and registration components. The trusted components may need to meet certain predefined robustness criteria in order to be certified.

Affinity between content and ad. In some embodiments, the ads are targeted to a user, but in certain cases the advertiser may choose to pay extra money when the ad is displayed during the rendering of content matching certain criteria. A simple example would be—an advertiser pays 10 cents regularly but is willing to pay 12 cents when the ad is displayed along with content which falls under the content genre "Sports" or "Adventure". This illustrates the affinity between the content and the ad.

Delivering policies to the client. Certain policies such as the local privacy law policies and ad matching policies can be expressed as control objects. These policies expressed as controls can be delivered to the client and updated periodically.

In one embodiment, the User profile can be represented as an node object (e.g., as described in the '693 application) with attributes. As more information is learned about the user from the client, the user node is refined with the addition of more dynamic DRM 'links' (e.g., of the type described in the '693 application). These links (e.g., impulse buyer, fashion-conscious) can carry strengths on the basis of advertising viewing patterns. The Ad-Controls associated with an Ad could refer to these strength values and decide on the bid-price.

In one embodiment, an attribute aggregator node from an external entity could further refine the user profile for targeted advertising. This node is introduced into the system through the trust mechanisms, and could include any qualifying attributes of the users, like membership in organizations (e.g., AAA, Buying Club, etc.). The third party entities are compensated for this, while the ad-controls during arbitration can refer to this aggregator node and the strength/connection to the user node.

Although the foregoing has been described in some detail for purposes of clarity, it will be apparent that certain changes and modifications may be made within the scope of the appended claims. For example, while several examples have been presented in the context of providing advertisements to a user in connection with entertainment content such a movies delivered over the Internet, it will be appreciated that the systems and methods described herein are suitable for broader application, and can be used in the context of matching and/or integrating virtually any types of electronic content, delivered over virtually any type of distribution system. Similarly, while several examples have been described that make use of a DRM engine such as that described in the '693 application, it will be appreciated that embodiments of the systems and methods described herein can be implemented using any suitable software and/or hardware for matching advertisements with content in accordance with rules or policy. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method performed by an electronic device for rendering content, the method comprising:
    receiving, at an electronic device, a first content item and a first electronic content license securely associated with the first content item, the first electronic content license identifying one or more slots within the first content item at which one or more second content items may be inserted and specifying one or more criteria for selecting content items to insert into the one or more slots within the first content item;
    receiving a request to render the first content item using the electronic device;
    selecting, based on information included in the first electronic content license, at least one content item of the one or more second content items to insert into at least one of the one or more slots within the first content item, wherein the selecting comprises:
        evaluating the one or more second content items against the one or more criteria, and
        evaluating one or more bids made in association with each of the one or more second content items against at least one objective function, wherein the selected content item of the one or more second content item maximizes the objective function,
    wherein the selecting is further based on at least one technical capability associated with a permitted rendering device, the at least one technical capability comprising at least one of processing performance, network connectivity, and local storage space; and
    rendering the first content item using the electronic device, wherein rendering the first content item comprises:
        inserting, by the electronic device, the selected content item into the at least one of the one or more slots within the first content item in connection with rendering the first content item by the electronic device.

2. The method of claim 1, wherein the first electronic content license is received separately from the first content item.

3. The method of claim 1, wherein the first electronic content license is packaged with the first content item.

4. The method of claim 1, wherein the first electronic content license is cryptographically associated with the first content item.

5. The method of claim 1, wherein the one or more second content items comprise one or more advertisements.

6. The method of claim 1, wherein the at least one objective function comprises a revenue function and the selected content item of the one or more second content items yields the highest revenue out of the one or more second content items.

7. The method of claim 1, wherein the objective function is specified in the first electronic content license.

8. The method of claim 1, wherein the method further comprises transmitting, by the electronic device, an indication of the selected content item to a clearinghouse.

9. The method of claim 8, wherein the method further comprises transmitting, by the electronic device, anonymized user profile information to the clearinghouse relating to a user of the electronic device.

10. The method of claim 1, wherein the first electronic content license specifies one or more types of content items that are not permitted to be inserted into the one or more slots.

11. The method of claim 1, wherein the method further comprises receiving, by the electronic device, the one or more second content items.

12. The method of claim 11, wherein the method further comprises receiving one or more second electronic content licenses associated with the one or more second content items, each of the one or more second content items being associated with at least one of the one or more second electronic content licenses.

13. The method of claim 12, wherein each of the one or more second electronic content licenses specify one or more bid amounts that an associated content provider is willing to pay to have an associated content item of the one or more second content items rendered in connection with the first content item.

14. The method of claim 12, wherein each of the one or more second electronic content licenses specify one or more bid amounts that an associated content provider is willing to pay if one or more specified conditions are met.

15. The method of claim 14, wherein the one or more specified conditions comprise at least one condition relating to a type of the user.

16. The method of claim 14, wherein the one or more specified conditions comprise at least one condition relating to an environment of the electronic device.

17. The method of claim 14, wherein the one or more specified conditions comprise at least one condition relating to a type of the first content item.

* * * * *